United States Patent [19]
Sakai et al.

[11] Patent Number: 5,988,305
[45] Date of Patent: Nov. 23, 1999

[54] FRONT UPPER STRUCTURE OF AUTOMOTIVE VEHICLE

[75] Inventors: Akito Sakai, Kawasaki; Masanobu Yoshioka, Yokosuka, both of Japan

[73] Assignee: Nissan Motor Co., Ltd., Yokohama, Japan

[21] Appl. No.: 08/942,916

[22] Filed: Oct. 2, 1997

Related U.S. Application Data

[62] Division of application No. 08/420,770, Apr. 12, 1995, Pat. No. 5,706,908.

[30] Foreign Application Priority Data

| Apr. 18, 1994 | [JP] | Japan | 6-078897 |
| Apr. 18, 1994 | [JP] | Japan | 6-078914 |
| Apr. 18, 1994 | [JP] | Japan | 6-078922 |
| Apr. 18, 1994 | [JP] | Japan | 6-078924 |

[51] Int. Cl.$^6$ .................................................. B62D 25/02
[52] U.S. Cl. ................................... 180/69.2; 296/189
[58] Field of Search .......................... 280/784; 180/232, 180/69.2; 293/21, 107, 109, 110, 120, 123, 133; 296/189, 198

[56] References Cited

U.S. PATENT DOCUMENTS

| 1,392,889 | 10/1921 | Day | 180/69.2 |
| 3,173,826 | 3/1965 | Campbell et al. | 293/109 |
| 3,211,491 | 10/1965 | Browne et al. | 296/189 |
| 3,909,058 | 9/1975 | Krämer et al. | 296/189 |
| 4,359,120 | 11/1982 | Schmidt et al. | 180/69.2 |
| 4,623,190 | 11/1986 | Fujimori et al. | 296/198 |
| 5,124,191 | 6/1992 | Seksaria | 180/69.2 |
| 5,340,154 | 8/1994 | Scott | 296/298 |

FOREIGN PATENT DOCUMENTS

| 22 39 485 | 2/1975 | Germany | 280/784 |
| 0272442 | 10/1989 | Germany | 280/784 |
| 3940364 | 6/1991 | Germany | 296/198 |
| 0031823 | 3/1981 | Japan | 180/69.22 |
| 58-116270 | 7/1983 | Japan | 296/198 |
| 0249878 | 11/1986 | Japan | 180/69.22 |
| 5-139338 | 6/1993 | Japan | 180/69.2 |
| 5-278637 | 10/1993 | Japan | 180/69.2 |
| 2076344 | 12/1981 | United Kingdom | 296/189 |

*Primary Examiner*—J. J. Swann
*Assistant Examiner*—Frank Vanaman
*Attorney, Agent, or Firm*—Foley & Lardner

[57] ABSTRACT

A hood structure for absorbing an impact applied to a hood of an automotive vehicle at collision has: a hood outer panel for closing an engine room; at least one impact absorb body disposed under the hood outer panel, for absorbing the impact applied to the hood when deformed; and an engine disposed under the impact absorb body, for stopping the deformed impact absorb body. Here, to reduce head injury criterion (HIC) effectively at a shortest possible stoke of the hood outer panel, an impact energy absorption rate of the impact absorb body and a total hollow gap formed between the hood outer panel and the engine are both determined in such a way that an impact energy generated at collision can be absorbed in accordance with an ideal impact energy absorption waveform Cm representative of an ideal relationship between reaction force and stroke of the deformed hood outer panel. The ideal impact waveform Cm can be obtained by calculation on the basis of an amount of impact energy required to be absorbed at collision and in accordance with the HIC derivation formulae (1) and (2). Since the impact absorb body is deformed at collision at a relatively moderate energy absorption rate to generate a secondary reaction force required for the ideal impact waveform Cm, the head impact characteristics can be securely improved.

6 Claims, 45 Drawing Sheets

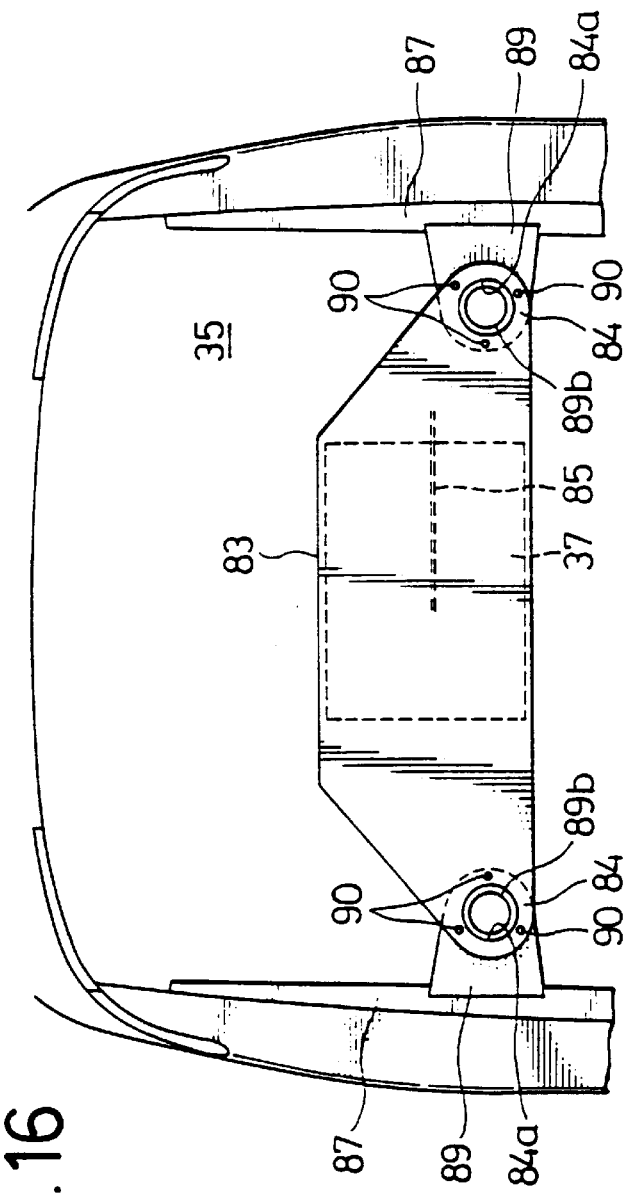
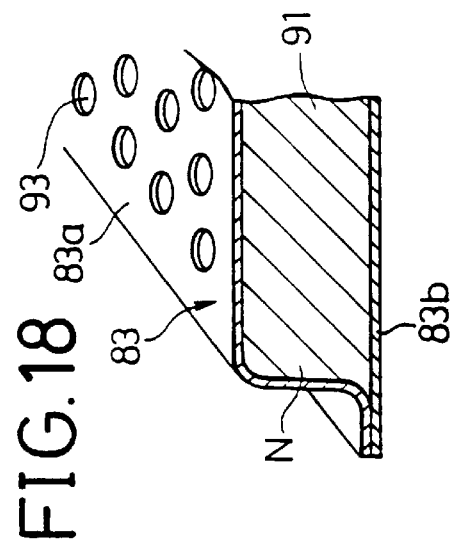
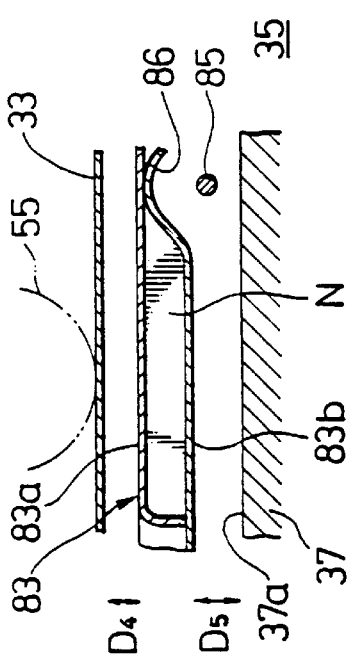
FIG. 16
FIG. 18
FIG. 17

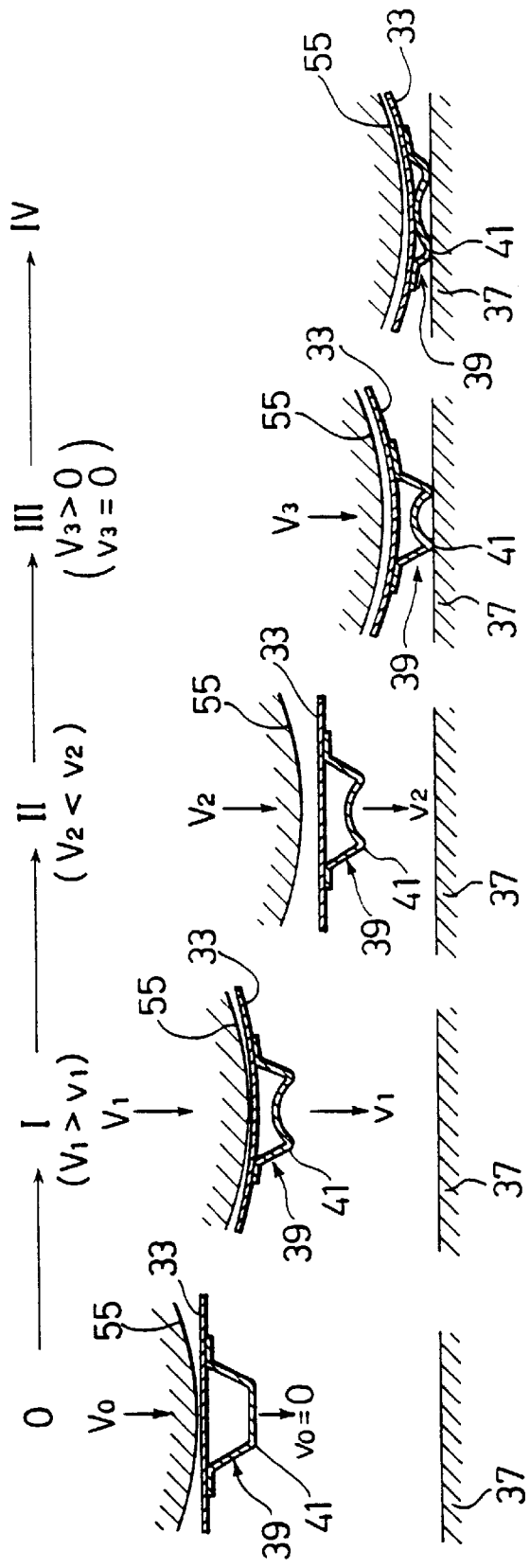

FIG. 22A  FIG. 22B  FIG. 22C  FIG. 22D  FIG. 22E

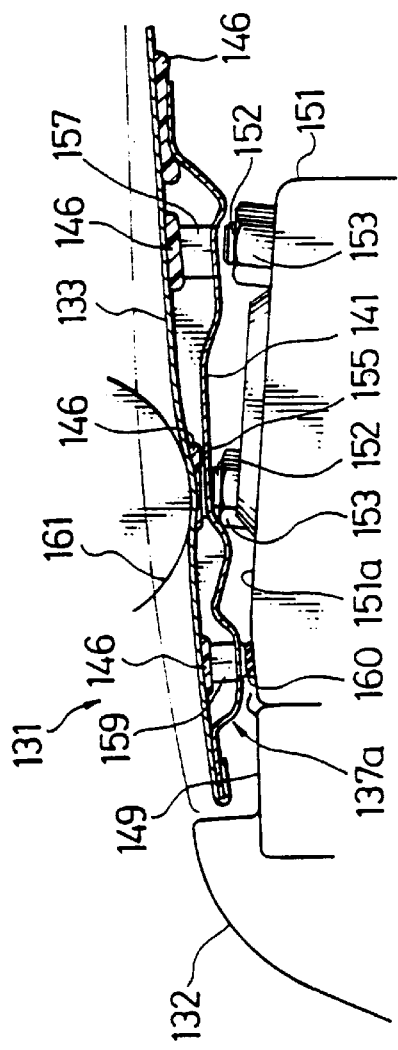
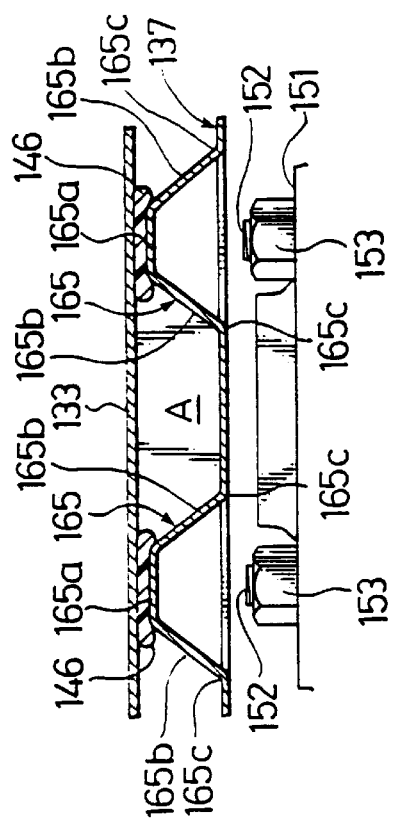
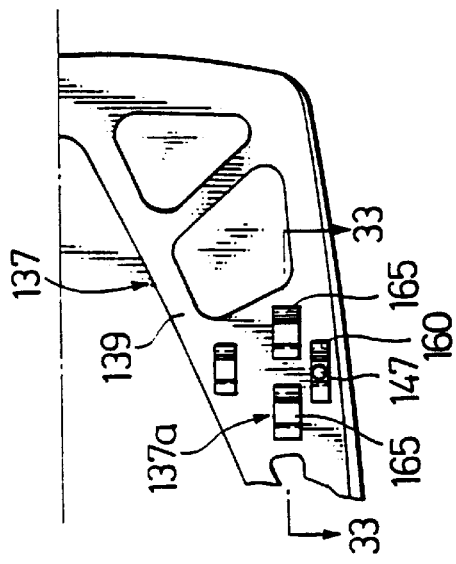

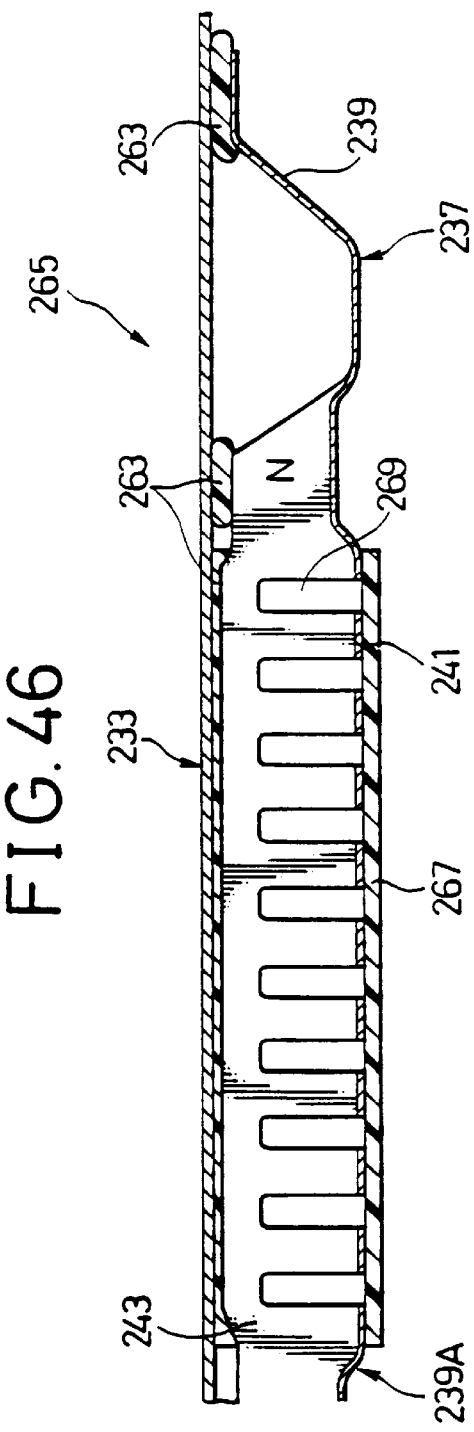
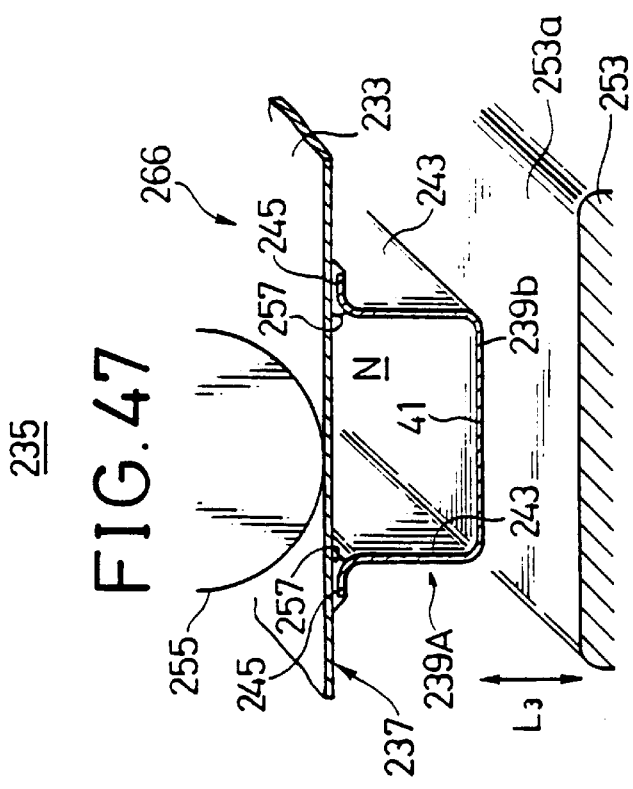

FRONT UPPER STRUCTURE OF AUTOMOTIVE VEHICLE

This application is a division, of application Ser. No. 08/420,770, filed Apr. 12, 1995, U.S. Pat. No. 5,706,908.

BACKGROUND OF THE INVENTION

1. Field of the Invention

The present invention relates to a front upper structure of an automotive vehicle, and more specifically to a front upper (e.g., hood and fender) structure of a vehicle body which can effectively absorb an impact energy applied to a front upper body of the automotive vehicle by walker's head (by a head impactor in the case of impact tests) in case the vehicle collides with a walker.

2. Description of Related Art

An example of the hood structure of an automotive vehicle of this sort is disclosed in Japanese Published Unexamined (Kokai) Patent Application No. 61-26682.

In this conventional hood structure, as shown in FIG. 1A, an inner panel 7 is attached to an inner surface (on the side of an engine room 5) of a hood outer panel 3 of a hood 1. The inner panel 7 is composed of a frame body 9 and some inner ribs 11 formed on the inner surface of the frame body 9 to reinforce the frame body 9. The frame body 9 is pivotally supported by a vehicle body via two hood hinges 13 attached on both rear sides of the frame body 9. An engine 15 is disposed within the engine room 5.

Further, as shown in FIG. 1B, a flat plate portion 17 is formed between two of the inner ribs 11 located over the engine 15, and a plurality of punch-off project pieces 19 (formed by punching out the flat plate portion 17 so that some curved pieces 19 can project downward to the engine 15) are formed in the flat plate portion. As shown in FIG. 1C, the cross-sectional shape of each of the punch-off project pieces 19 is formed into roughly circular arc shape and both ends 21 thereof are connected to the flat plate portion 17.

In the hood structure as described above, in case a head of a walker collides with an outer surface of the hood outer panel 3, since the hood outer panel 3 and the inner ribs 11 are deformed into the engine room 5, the punch-out project pieces 19 also collide with the engine 15 and deformed into crush. Accordingly, it is possible to absorb an impact energy applied onto the hood 1 over the engine 15 owing to the deformation of the punch-out project pieces 19, while reducing a movement distance (referred to as a stroke, hereinafter) of the hood 1.

Even if the impact energy can be absorbed by the hood 1 as described above, however, the impact energy applied to the walker's head cannot be necessarily reduced safely in practice.

As the experimental data with respect to the head impact characteristics, a WSTC (Wayne State Tolerance (Curve) as shown in FIG. 2 is so far well known, which is disclosed in [New Automotive Vehicle Engineering Manual <Third Edition>], Published by Japanese Automotive Technology Association on Sep. 30, 1983, pp 2 to 30 and in [Automotive Vehicle Engineering Encyclopedia) <16-volumes>], Published by Sankaido Inc. on Mar. 20, 1980, pp 201 to 203, respectively.

In this WSTC, an effective acceleration G is used as a parameter. This effective acceleration G is an average acceleration obtained by dividing an integral value of acceleration by a duration time ms. Therefore, the effective acceleration corresponds to an average reaction force received by the walker's head in case of collision.

The WSTC shown in FIG. 2 indicates that: even if the average reaction force received by a head impactor (the walker's head in case of collision) is small to some extent (e.g., the effective acceleration=G1, where the duration time is long (e.g., the duration time=T1), the impact energy applied to the head impactor reaches a dangerous region. On the other hand, even if the average reaction force received by the head impactor (the walker's head) is large to some extent (e.g., the effective acceleration=G2), where the duration time is extremely short (e.g., the duration time<T2), the impact energy does not reach the dangerous region but remains in a safe region.

In other words, since the head impact characteristics are determined on the basis of both the acceleration and the duration time, the head impact characteristics are not necessarily reduced even if a large impact energy is absorbed. In other words, there exists such a case that the head impact characteristics can be improved by increasing the initial reaction force applied to the walker's head to some extent within a predetermined short time, without maintaining a relatively small reaction force for a relatively long time.

Further, the WSTC is the experimental data obtained when the applied acceleration is assumed to be linear. In practice, however, since the actual impact energy received by the head impactor in case of collision with the hood is not of linear, but has a rather complicated acceleration waveform, it is impossible to directly apply the WSTC to the actual impact against the walker's head. Therefore, a method of adopting an HIC (Head Injury Criterion) value is so far well known as a method of evaluating the safety on the basis of the WSTC and various impact test results using an impactor.

Here, the HIC value can be derived from the following formulae:

$$a_{12} = \int_{t1}^{t2} a(t)dt/(t_2 - t_1) \quad (1)$$

$$HIC = \max_{t1,t2} [a_{12}^{2.5}(t_2 - t_1)] \quad (2)$$

where t1 and t2 denote any duration time (0<t1<t2) during which the acceleration is applied; a(t) denotes an acceleration at a center of gravity of the head. The smaller HIC value is, the higher will be the safety, and the safety limit thereof is determined as HIC=1000, in general.

In accordance with the above formulae, the HIC value can be calculated as the maximum value of those obtained (1) by first obtaining an average acceleration $a1_2$ between t1 and t2 in the duration time, (2) by raising the obtained average acceleration $a_{12}$ to 2.5-th power, and (3) by further multiplying the raised acceleration by the duration time (t2−t1). Therefore, when the impact behavior (the acceleration waveform) differs, the HIC value differs in principle, so that the magnitude of the HIC value can be decided on the basis of the average acceleration $a_{12}$ and the duration time (t2−t1). Further, since the relationship between the average acceleration $a_{12}$ and the duration time (t2−t1) can be replaced with the relationship between the hood reaction force and the hood stroke (movement distance), it is also possible to decide the magnitude of the HIC value on the basis of the reaction force and the stroke of the hood.

As described above, for the reason that a large amount of the impact energy can be absorbed, the HIC value is not necessarily reduced uniformly; that is, even if the amount of absorbed impact energy is the same, there exists the case where the HIC value differs from each other. Further, even if the HIC value is small at only a single point on the hood, there exists the case where the HIC value is large at the other points on the hood.

Accordingly, in the conventional hood structure as shown in FIG. 1A, since the reaction force for collapsing the punch-out project pieces 19 formed into circular arc shape in cross section will not rise abruptly, there exists such a possibility that a relatively high reaction force is maintained for a relatively long time. Therefore, in order to reduce the head impact characteristics, it is necessary to reduce the collapse reaction force of the punch-out project pieces 19 and further increase the stroke of the hood. In other words, in the conventional hood structure as shown in FIGS. 1A and 1B, it has been necessary to dispose the hood at a relatively high position vertically away from the engine in order to increase the stroke of the hood, thus resulting in another problem in that the front visual field of the automotive vehicle is narrowed.

SUMMARY OF THE INVENTION

With these problems in mind, therefore, it is the object of the present invention to provide a front upper (e.g., hood, fender, etc.) structure of an automotive vehicle, which can absorb impact energy sufficiently and securely in spite of a relatively short stroke of the hood or the fender; that is, which can reduce the HIC (head injury criterion) value effectively to decrease the head impact characteristics.

To achieve the above-mentioned object, the present invention provides a front upper structure for absorbing an impact applied to a front upper body of an automotive vehicle at collision, having: a front upper outer panel: impact absorbing means disposed under the front upper outer panel, for absorbing the impact applied to the front upper outer panel when deformed; and an impact interfere body disposed under the impact absorbing means, for stopping the deformed impact absorbing means, wherein an impact energy absorption rate of the impact absorbing means and a total hollow gap formed between the front upper outer panel and the impact interfere body are both determined in such a way that an impact energy generated at collision can be absorbed in accordance with an ideal impact energy absorption waveform to reduce head injury criterion effectively at a shortest possible stoke of the front upper panel.

Here, the ideal impact energy absorption waveform is an ideal relationship between reaction force and stroke of the deformed front upper panel, and obtained by calculation on the basis of an amount of impact energy required to be absorbed at collision and in accordance with head injury criterion derivation formulae:

$$a_{12} = \int_{t1}^{t2} a(t) dt / (t_2 - t_1) \quad (1)$$

$$HIC = \underset{t1,t2}{\text{max}} all[a_{12}^{2.5}(t_2 - t_1)] \quad (2)$$

where HIC denotes a head injury criterion; a(t) denotes acceleration at a center of gravity of a test impactor; t1 and t2 denote any duration time (0<t1<t2) during which the acceleration is applied; and aiL from $(t_1, t_2)$ to (max) denotes a maximum value selected from $[a_{12}^{2.5}(t2-t1)]$. Further, the impact absorbing means is deformed at collision at a relatively moderate energy absorption rate to generate a secondary reaction force required for the ideal impact energy absorption waveform.

Further, the present invention provides a hood structure for absorbing an impact applied to a hood of an automotive vehicle at collision, having: a hood outer panel for closing an engine room; impact absorbing means disposed under the hood outer panel, for absorbing the impact applied to the hood when deformed; and an impact interfere body disposed under the impact absorbing means, for stopping the deformed impact absorbing means, wherein an impact energy absorption rate of the impact absorbing means and a total hollow gap formed between the hood outer panel and the impact interfere body are both determined in such a way that an impact energy generated at collision can be absorbed in accordance with an ideal impact energy absorption waveform to reduce head injury criterion effectively at a shortest possible stoke of the hood outer panel.

Here, the ideal impact energy absorption waveform is an ideal relationship between reaction force and stroke of the deformed hood outer panel, and obtained by calculation on the basis of an amount of impact energy required to be absorbed at collision and in accordance with two head injury criterion derivation formulae; and the impact absorbing means is deformed at collision at a relatively moderate energy absorption rate to generate a secondary reaction force required for the ideal impact energy absorption waveform. Further, the predetermined total hollow gap is about 20 mm.

In the first aspect of the present invention, the impact interfere body is an engine (37), and the impact absorbing means are a plurality of impact absorb bodies (43) supported by a support bracket (45) fixed to the hood outer panel (33) under the hood outer panel so as to cover the engine.

Here, each of the impact absorb bodies (43) is an impact absorb member (43a) formed by winding a plate material (56) of roughly rectangular cross section into a coil shape. Each of the impact absorb bodies (43) is an impact absorb member (43b) composed of upper and lower plates (57) and two side plates (59) and formed into a roughly square cylindrical shape, a plurality of large holes (61) being formed in the upper and lower plates (57) and a number of small holes (63) being formed in the two side plates (59), respectively to adjust the impact energy absorption rate. Each of the impact absorb bodies (43) is an impact absorb member (43c) composed of upper and lower plates (65) and a number of vertical walls (67) formed between the upper and lower plates (65). The impact absorb body (43) is made of any one of aluminum and resin.

Further, in a modification thereof, the impact interfere body is an engine (37), and the impact absorbing means is a single impact absorb body (69) supported by a support bracket (45) fixed to the hood outer panel (33) under the hood outer panel so as to cover the engine. The impact absorb body (69) is an impact absorb member (69a) formed by punching-out a number of cutouts (73) roughly at right angles in a plate material (75) as rise-up pieces (75). The impact absorb body (69) is an impact absorb member (69b) formed by punching off a number of trapezoidal projections (77) in a plate material (71) in such a way that a bottom portion (77b) of each projection (77) is connected to two sloped portions (77a). The impact absorb body (69) is an impact absorbing member (69c) formed by punching off a number of right-angle triangular projections (77) in a plate material (71) in such a way that a sloped portion (77a) is connected to a perpendicular portion 77b.

In the second aspect of the present invention, the impact interfere body is an engine (37), and the impact absorbing means is an impact absorb body (83) provided under the hood outer panel (33) so as to cover the engine, the impact absorb body (83) being composed of an upper is plate member (83a) and a lower plate member (83b) so as to form a closed cross section (N) between the two plate members and fixed to two strut towers (89) provided on both sides of an engine room. Here, the upper and lower plate members (83a, 83b) of the impact absorb body (83) are formed with a plurality of holes (93), respectively to adjust the impact energy absorption rate of the impact absorb body (83). The lower plate member (83b) is formed with a recessed portion (86) for passing a wire member (85) iconnected to the engine. The closed cross section (N) of the impact absorb body (83) is filled with a sound absorbing material (91) to reduce engine noise. Further, the sound absorbing material is glass wool.

Further, in the third aspect of the present invention, the hood structure further comprises a hood inner panel (39) formed with hood inner ribs (41) and bonded to an inner surface of the hood outer panel (33).

Further, in the fourth aspect of the present invention, the impact interfere body is a pair of strut towers (151) provided on both sides of an engine room (135), and the impact absorbing means are an over-strut hood inner panel (137a) and a plurality of impact absorb members (157, 155, 159) disposed between the hood outer panel (133) and the over-strut hood inner panel (137a). Here, a plurality of the impact absorb members are an outside impact absorb members (159), two intermediate impact absorb members (155) and an inside impact absorb member (157) disposed on each side of the hood and formed into a hat shape in cross section, respectively and bonded between the hood outer panel (133) and the over-strut hood inner panel (137a) at such positions as to correspond to bolts (152) and nuts (153) of the strut towers (151). Further, the impact absorbing means further comprises a bumper rubber mounting member (160) formed by punching out downward the over-strut hood inner panel (137a) into a hat-shaped at the outside impact absorb member (159) projection, and a bumper rubber (147) being attached to the bumper rubber mounting member (160) over an upper surface of each strut tower (151). The two intermediate impact absorb member (165) are formed by punching out the over-strut hood inner panel (137a) into a hat-shaped projection, respectively and bonded to the hood outer panel (133). A plurality of the impact absorb members (159, 155, 157) are bonded between the hood outer panel (133) and the over-strut hood inner panel (137a) by use of gum mastic resin (146).

Further, in the fifth aspect of the present invention, the impact interfere body is a pair of strut towers (151) provided on both sides of an engine room (135), and the impact absorbing means are two impact absorb bodies (171) each attached to an upper surface (151a) of a strut tower (151) so as to cover the strut tower, the impact absorb body (171) being formed with an upper plate portion (181) and a plurality of straight leg portions (173, 175, 177) each bent inward so as to be fixed to the strut tower with bolts (152) and nuts (153). Here, the upper plate portion (181) is formed with a plurality of holes (171) for adjusting the impact energy absorption rate of the impact absorb body. The impact absorb body (171) further comprises a bumper rubber (167) formed of an elastic resin and attached to the upper plate portion (181) of the impact absorb body (171).

Further, in the sixth aspect of the present invention, the impact interfere body is an engine (253), and the impact absorbing means are an inner panel (237) formed with a long channel-shaped inner rib (239L) having an outer flange portion (245) and two short channel-shaped inner ribs (239S) each having an outer flange portion (245) and intersecting the long channel-shaped inner rib (239L) with a distance therebetween and bonded to the hood outer panel (233) at a plurality of different points so as to cover the engine, each intersect portion of the long and short channel-shaped ribs being connected through a curved portion on both sides thereof, respectively and tow parallel straight portions (249) between two intersect portions being reinforced by a reinforce plate member (251), respectively. Here, the inner panel (237) is bonded to the outer panel (233) at a plurality of points by use of a gum mastic resin.

Further, in the seventh aspect of the present invention, the impact interfere body is an engine (253), and the impact absorbing means are an inner panel (237) formed with a long channel-shaped inner rib (239L) having an outer flange portion (245) and two short channel-shaped inner ribs (239S) each having an outer flange portion (245) and intersecting the long channel-shaped inner rib (239L) with a distance therebetween and bonded to the hood outer panel (233) in all over the surfaces of the flange portions (245) of the rigs (239L, 239S) so as to cover the engine, each intersect portion of the long and short channel-shaped ribs being connected through a curved portion on both sides thereof, respectively. Here, the inner panel (237) is bonded to the-outer panel (233) in all over the surfaces of the flange portions (245) by use of a gum mastic resin.

Further, in the eighth aspect of the present invention, the impact interfere body is an engine (253), and the impact absorbing means is a straight inner rib (239A) formed in the inner panel (239) so as to cover the engine and covered with a hard brittle member (267), the inner rib covered with the hard and brittle member being brought into collision with the engine. Here, the inner rib (239A) is formed with a plurality of slits (269) on both sides thereof for adjusting the impact energy absorption rate. The cross-sectional shape of the rib (239A) is square, trapezoidal, or triangular.

Further, the present invention provides a fender structure for absorbing an impact applied to a fender of an automotive vehicle at collision, having: a fender panel (1100) formed with a vertical wall (1101) bent at an upper project portion (1110) thereof, the vertical wall being formed with a stepped portion (FA) for providing easy crush; and impact absorbing means disposed at the vertical wall of the fender, for absorbing the impact applied to the fender when deformed; and a hood ridge reinforce member (1200), for stopping the deformed impact absorbing means, wherein an impact energy absorption rate of the impact absorbing means is determined in such a way that an impact energy generated at collision can be absorbed in accordance with an ideal impact energy absorption waveform to reduce head injury criterion effectively at a shortest possible stoke of the fender panel.

Here, the ideal impact energy absorption waveform is an ideal relationship between reaction force and stroke of the deformed fender, and obtained by calculation on the basis of an amount of impact energy required to be absorbed at collision and in accordance with two head injury criterion derivation formulae; and the impact absorbing means is deformed at collision at a relatively moderate energy absorption rate to generate a secondary reaction force required for the ideal impact energy absorption waveform.

Further, the impact absorbing means is a synthetic resin layer (1002) deposited onto an inner surface of the stepped portion (FA) of the vertical wall (1101). The synthetic resin layer (1002) covers roughly a half of the stepped portion (FA) of the vertical wall (1101) or all over a surface of the stepped portion (FA) of the vertical wall (1101). Further, it is preferable that thickness of the synthetic resin layer (1002) is thin on the front side of the automotive vehicle and thick in the rear side thereof. Further, a recessed portion (1003) is further formed in the hood ridge reinforce member (1200) for accommodating the crushed synthetic resin layer (1002).

As described above, in the front upper (hood or fender) structure according to the present invention, an impact energy absorption rate of the impact absorbing means and a total hollow gap formed between the front upper outer panel (hood outer panel or fender panel) and the impact interfere body (engine or strut towers) are both determined in such a way that an impact energy generated at collision can be absorbed in accordance with an ideal impact energy absorption waveform to reduce head injury criterion effectively at a shortest possible stoke of the front upper panel. Accordingly, when the front upper outer panel is moved by a predetermined stroke, since the impact absorbing means begins to interfere with the impact interfere body, the impact absorbing means is deformed into crush, so that a desired secondary reaction force can be generated required for the ideal impact energy absorption waveform Cm. As a result, it is possible to absorb the impact energy under ideal absorption conditions, with the result that the HIC value (the head impact characteristics) can be reduced at the small possible stroke of the hood; that is, to reduce the head impact characteristics securely.

BRIEF DESCRIPTION OF THE DRAWINGS

FIGS. 8A to 8C are graphical representations showing the relationship between the hood reaction force F and the hood stroke S, in which FIG. 8A shows an impact energy absorption waveform C1 corresponding to the basic structure shown in FIG. 7A together with the ideal impact energy absorption waveform Cm; FIG. 8B shows an impact energy absorption waveform C2 corresponding to basic structure shown in FIG. 7B; and FIG. 8C shows an impact energy absorption waveform C3 corresponding to the basic structure shown in FIG. 7C;

FIG. 16 is a plan view showing the hood shown in FIG. 15;

FIG. 17 is a cross-sectional view taken along the line 17—17 shown in FIG. 15;

FIG. 18 is a perspective view showing an impact absorb body provided with a sound absorbing material;

FIGS. 21A to 21E are cross-sectional views showing the deformation sequence of the basic structure in an impact test;

FIGS. 22A to 22E are cross-sectional views showing the deformation sequence of the hood of the third embodiment during impact test;

FIG. 31 is a cross-sectional view for assistance in explaining the function of the fourth embodiment;

FIG. 32 is a plane view showing a modification of the fourth embodiment of the hood structure;

FIG. 33 is a cross-sectional view taken along the line 33—33 shown in FIG. 32;

FIG. 46 is a cross-sectional view taken along the line 46—46 in FIG. 44;

FIG. 47 is a cross-sectional view showing the basic structure of the eighth embodiment;

DETAILED DESCRIPTION OF THE PREFERRED EMBODIMENTS

The embodiments of the hood structure of an automotive vehicle according to the present invention will be described in detail hereinbelow with reference to the attached drawings.The feature of the hood or fender structure according to the present invention is to reduce the head impact characteristics by decreasing the HIC value effectively while reducing the stroke of the hood or fender of the automotive vehicle under severe condition.

To achieve the above-mentioned feature, in practice, an ideal impact energy absorption waveform Cm (referred to as ideal impact waveform Cm, hereinafter) representative of the ideal relationship between the hood or fender reaction force and the hood or fender stroke (for reducing both the deformation stroke and the HIC value together) is first previously calculated on the basis of the amount of impact energy required to be absorbed at collision and in accordance with the HIC derivation formulae (1) and (2). Secondly, the-actual (non-improved) impact energy absorption waveform (referred to as basic impact waveform, hereinafter) is obtained in the impact test effected at a predetermined hood or fender position. Thirdly, the hood or fender structure is decided in such a way that the basic impact waveform approaches the ideal impact waveform, with the result that the HIC value can be reduced effectively and securely even at a short stroke of the hood or fender.

Here, since the effective hood or fender structure for approximating the basic (non-improved) impact waveform to the ideal impact waveform is not uniform according to the various conditions such as basic hood structure for impact test, allowable hood stroke, etc., only the most effective hood or fender structure will be explained for each of various embodiments under various conditions.

This ideal impact waveform Cm indicates how to design the basic structure of the hood or fender in order that the head impact characteristics can be reduced even at a small stroke of the hood or fender. Therefore, the hood or fender structures of the embodiments of the present invention are constructed on the basis of the design concept as described above.

Figure 3:
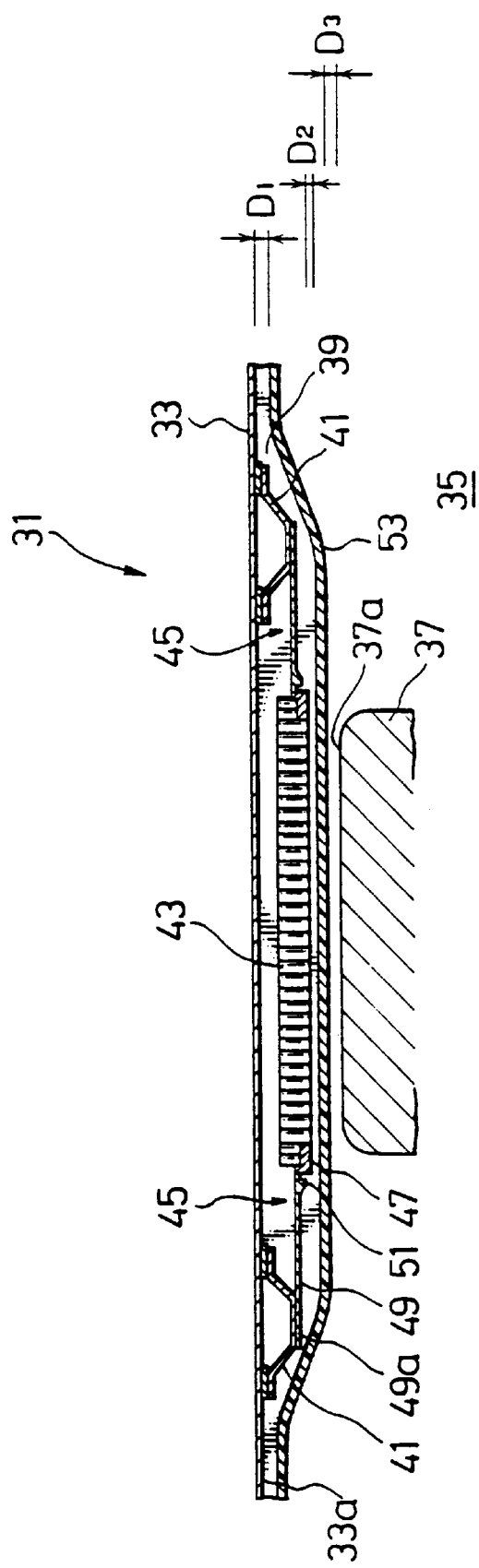
FIG. 3 is a cross-sectional view showing a first embodiment of the hood structure of an automotive vehicle according to the present invention, which is taken along the line 3—3 shown in FIG. 4.
Figure 4:
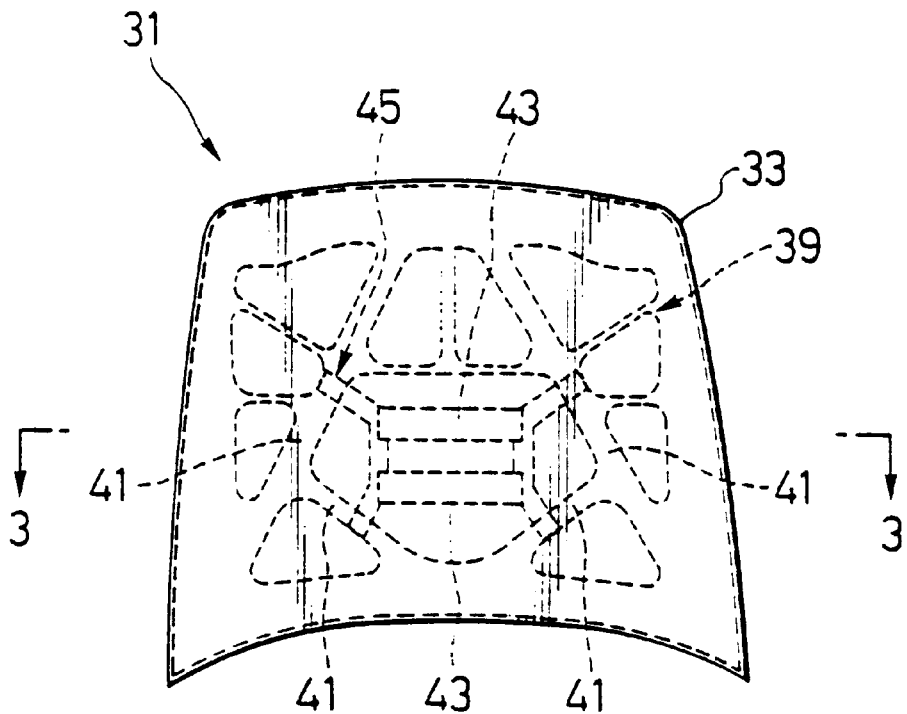
FIG. 4 is a plan view showing the hood shown in FIG. 3.

The first embodiment of the present invention will be described hereinbelow with reference to FIGS. 3 to 5. FIG. 3 is a cross-sectional view taken along the line AB—AB shown in FIG. 4; FIG. 4 is a plane view showing the hood; and FIG. 5 is an enlarged view showing the impact absorb body shown in FIG. 4.

As shown in FIGS. 3 and 4, a hood 31 is composed of an hood outer panel 33, an inner panel 39, and a hood cover 53. The hood outer panel 33 is used to close the upper surface of an engine room 35. An engine 37 is arranged (as an interfere body) at the middle portion of an engine room 35. On a lower (inner) surface 33a of the hood outer panel 33 (on the side of the engine room 35), the inner panel 39 is bonded. The inner panel 39 is formed with a plurality of hat-shaped cross-section inner ribs 41 projecting downward to the engine room 35 in such a way as to enclose the circumference of the hood outer panel 33 located over the engine 37. Further, an impact absorb body 43 is disposed between the hood outer panel 33 and the engine 37.

Figure 5:
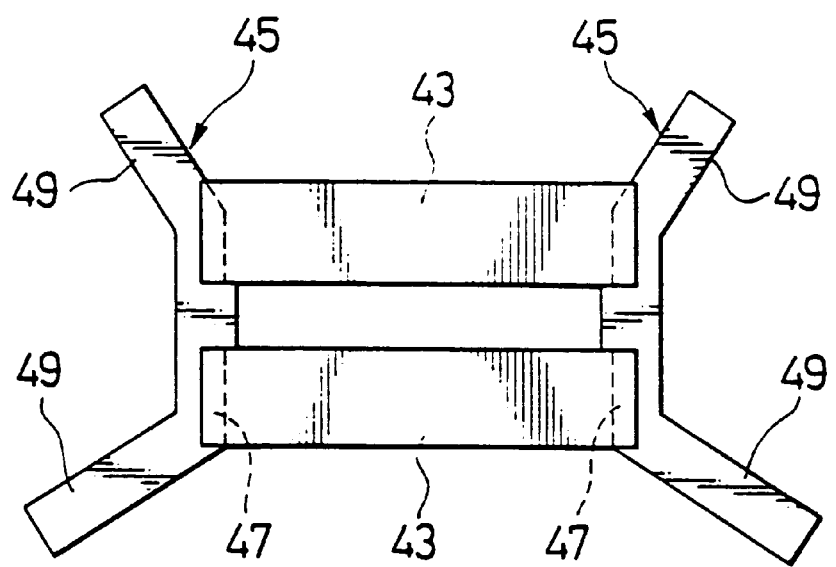
FIG. 5 is an enlarged plane view showing an impact absorb body.

As shown in FIGS. 4 and 5, the impact absorb body 43 is composed of two impact absorb members 43a, 43b or 43c (shown in FIG. 11A to 11C) arranged on the side of the hood outer panel 33 in parallel to each other along the vehicle width direction, in such a way as that both ends of each impact absorb members are bridged between two support brackets 45. As shown in FIG. 5, each support bracket 45 is formed with an impact absorb member fixing portion 47 for mounting and fixing the impact absorb members 43a, 43b or 43c and with two arm portions 49 each extending radially from the end of each of the impact absorb members. As shown in FIG. 3, an end 49a of each arm portion 49 of the support bracket 45 is connected to the inner rib 41. Further, each arm portion 49 is formed with an easy-deformable portion 51 for allowing the impact absorb body 43 to be deformed downward of the vehicle body.

On the other hand, the cover 53 is disposed between the impact absorb body 43 and the engine 37 so as to cover the lower surface of the impact absorb body 43. Further, a gap of a predetermined distance is formed between the hood outer panel 33 and the engine 37 so that when the hood outer panel 33 is deformed downward of the vehicle body by a predetermined distance, the impact absorb body 43 starts to interfere with the engine 37. In other words, the above-mentioned predetermined distance is a sum total of a gap D1 between the hood outer panel 33 and the impact absorb body 43, a gap D2 between the impact absorb body 43 and the cover 53 and a gap D3 between the cover 53 and the engine 37, which is about 20 mm in this first embodiment.

Figure 11A:
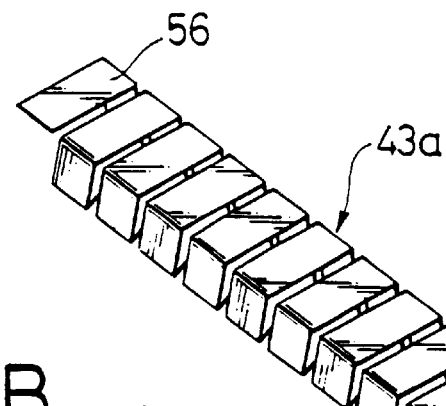
FIGS. 11A to 11C are perspective views showing a practical impact absorb body, respectively.
Figure 11B:
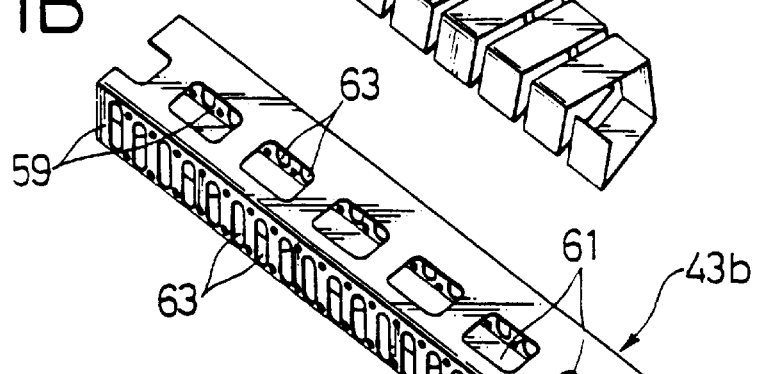
Figure 11C:
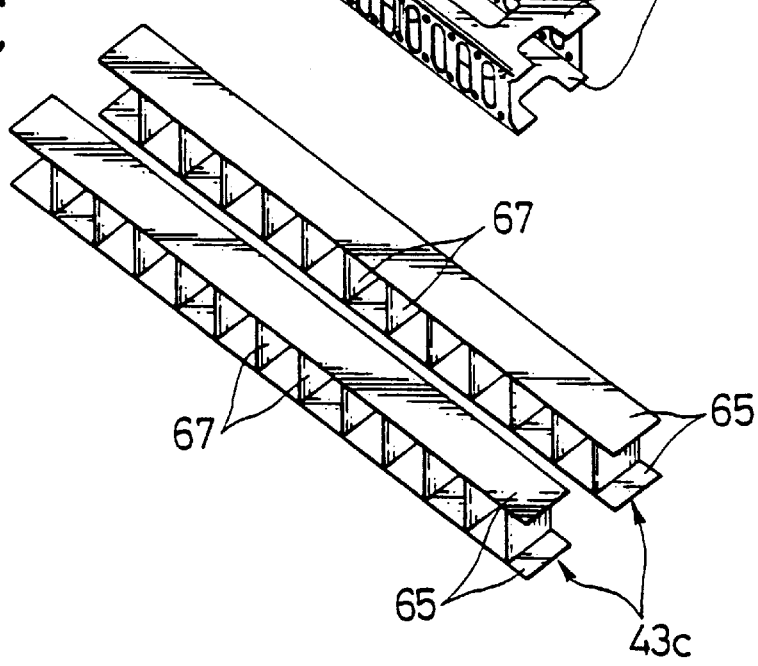
Figure 12:
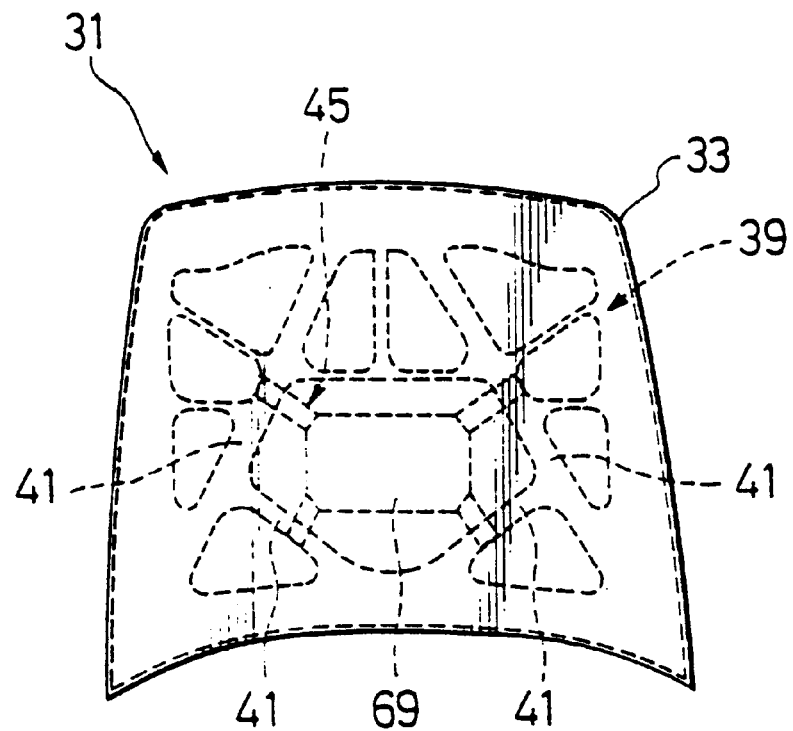
FIG. 12 is a plan view showing a modification of the first embodiment of the hood structure.

With reference to FIGS. 11A to 11C, practical shapes of the impact absorb members 43a to 43c used for the first embodiment will be explained in more detail.

The impact absorb member 43a shown in FIG. 11A is formed by winding a plate material 56 of roughly rectangular cross section into a coil shape. The impact absorb member 43b shown in FIG. 11B is composed of upper and lower plates 57 and two side plates 59 and formed into a roughly square cylindrical shape. Further, a plurality of large square holes 61 are formed in the upper and lower plates 57 and a number of small slits 63 are formed in the two side plates 59, respectively. Further, the impact absorb member 43c shown in FIG. 11C is composed of upper and lower plates 65 and a number of vertical walls 67 connected between the upper and lower plates 65. These impact absorb members 43a to 43c are made of a metallic material (e.g., aluminum) or a resin.

The function of the hood structure as described above will be explained hereinbelow with reference to FIGS. 6 to 10.

The hood of this embodiment is constructed in such a way that when an impact is applied onto the hood 31 located over the engine 37 and thereby the hood outer panel 33 interferes with the engine 37, the HIC value at the above-mentioned position can be reduced to relax the head impact characteristics of the hood 31 at the shortest possible stroke of the hood outer panel 33. For this purpose, the structure is so decided as to obtain an impact waveform approximate to an ideal impact waveform Cm. Here, the ideal impact waveform Cm implies the ideal relationship between the hood reaction force (F) and the hood stroke (S) due to hood deformation, which can reduce the HIC value effectively in spite of a short stroke in the impact test. Further, the ideal impact waveform Cm can be calculated on the basis of the amount of impact energy required to be absorbed at collision and in accordance with the formulae (1) and (2), as already explained.

Figure 6:
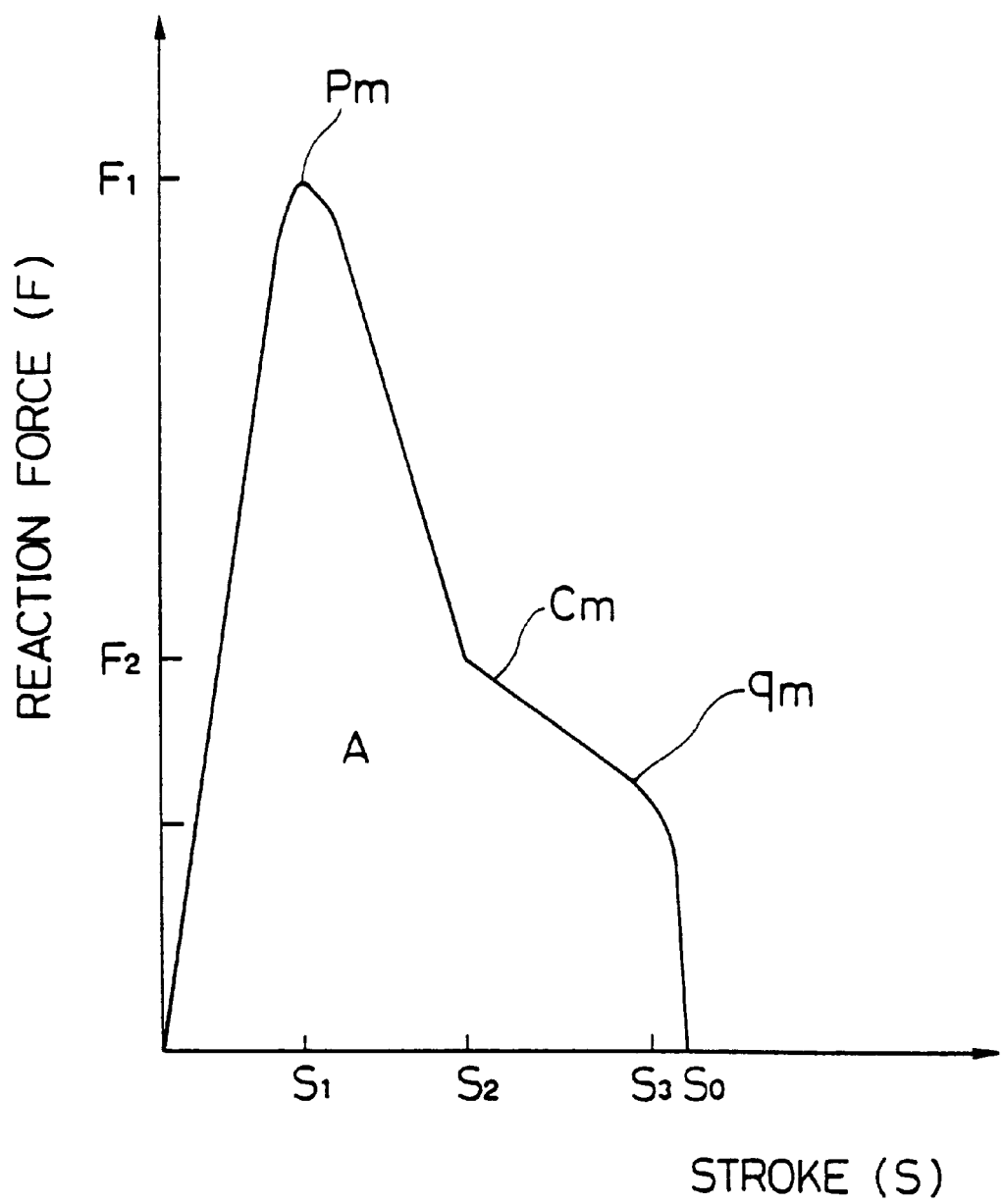
FIG. 6 is a graphical representation showing an ideal impact energy absorption waveform Cm.
Figure 7A:
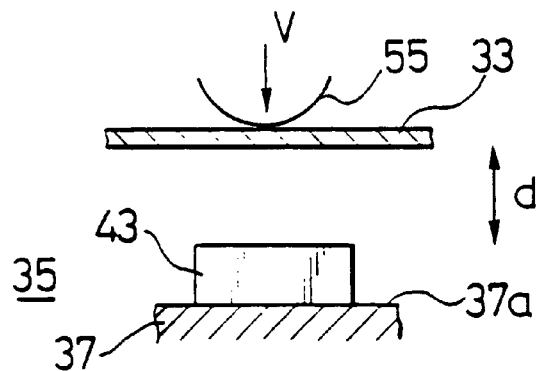
FIGS. 7A to 7C are cross-sectional views showing three basic structures for assistance in explaining the first embodiment of the hood structure according to the present invention, respectively.
Figure 7B:
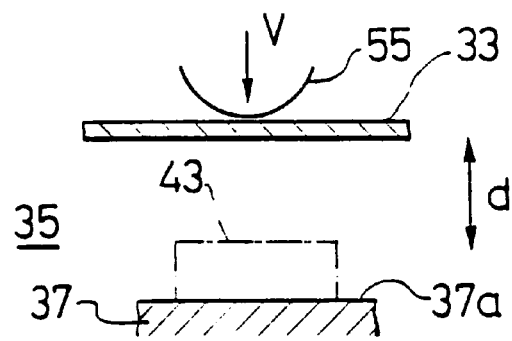
Figure 7C:
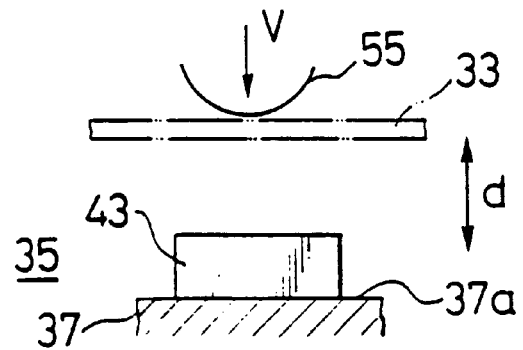
Figure 8A:
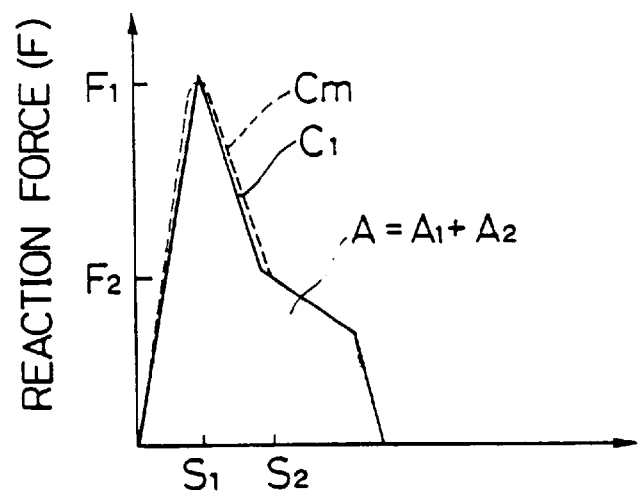
Figure 8B:
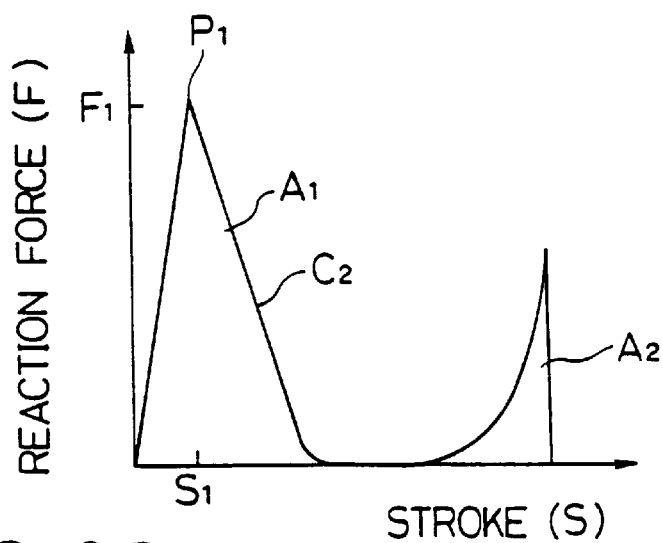
Figure 8C:
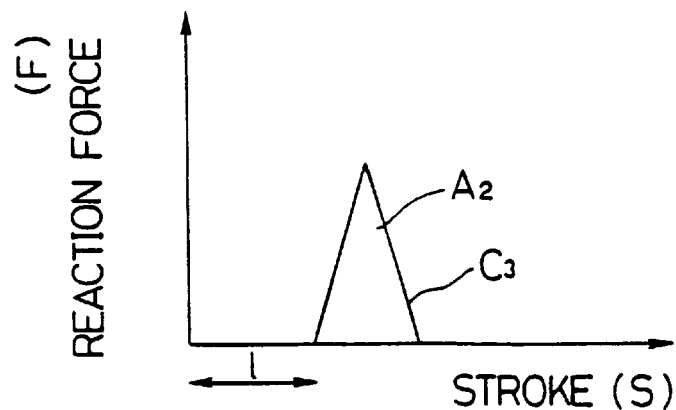

FIG. 6 shows an ideal impact waveform Cm; FIGS. 7A to 7C show basic structure models for the impact tests; and FIGS. 8A to 8C show basic impact waveforms C1, C2 and C3 obtained by use of the basic structure models, respectively together with the ideal impact waveform Cm.

The ideal impact waveform Cm will be explained in further detail with reference to FIG. 6 (the ideal impact waveform Cm), FIGS. 7A to 7C (the basic structure models) and FIGS. 8A to 8C (the basic impact waveforms C1, C2 and C3).

FIG. 6 shows an ideal impact waveform Cm representative of the ideal relationship between the reaction force F and the hood stroke S, which can reduce both the stroke (movement distance) of the hood 59 and the HIC value when the basic structure is used. In FIG. 6 an inner area A partitioned by the ideal impact waveform Cm and the stroke S (abscissa) represents an impact energy to be absorbed. Therefore, this inner area A is decided so as to become equal to the amount of impact energy required to be absorbed. Further, the amount of impact energy required to be absorbed at collision can be obtained on the basis of various impact tests and some calculations.

In the ideal impact waveform Cm shown in FIG. 6, an initial reaction force F due to the initial deformation of the hood outer panel 33 increases sharply at a relatively small stroke S and reaches the maximum reaction force F1 (Pm) at the stroke S1. After that, the reaction force F drops sharply down to F2 at a stroke S2. In the second half of the deformation after the stroke S2, since a secondary reaction force (described later) is generated, the reduction rate (gradient) of the reaction force F is lowered, so that a shoulder portion (qm) appears. Further, when the stroke reaches S3, the reaction force F decreases abruptly, and further reaches roughly zero at the stroke S0 at which the impact energy can be perfectly absorbed.

Some basic structures for impact tests will be explained with reference to FIGS. 7A to 7C.

In the basic structure as shown in FIG. 7A, an impact absorb body 43 is provided between the hood outer panel 33 and the engine 37. The impact absorb body 43 is mounted on the upper surface 37a of the engine 37, and a predetermined gap d is formed between the hood outer panel 33 and the upper surface of the impact absorb body 43. In the impact test, an impactor 55 is brought into a collision with the hood outer panel 33 over the impact absorb body 43, and the acceleration and the stroke (the movement distance) of the impactor 55 are both measured. These measured the acceleration and stroke of the impactor 55 correspond to the reaction force F (the ordinate) and the stroke S (the abscissa) of the hood outer panel 33 due to the hood deformation, which are both shown in FIG. 8A. Accordingly, the basic impact waveform C1 approximate to the ideal impact waveform Cm can be obtained as shown in FIG. 8A.

On the other hand, FIG. 7B shows the basic structure in which no impact absorb body 43 is provided. In this case, the impact waveform C2 as shown in FIG. 8B can be obtained. Further, FIG. 7C shows the basic structure in which only the impact absorb body 43 is provided without providing the hood outer panel 33. In this case, the impact waveform C3 as shown in FIG. 8C can be obtained.

Therefore, it is understood that the impact waveform C1 shown in FIG. 8A can be obtained conceptually by a combination of those C2 and C3 shown in FIGS. 8B and 8C, respectively.

In more detail, in the case of the impact test at which only the hood outer panel 33 is provided without providing the impact absorb body 43 as shown in FIG. 7B, the impact waveform C2 as shown in FIG. 8B can be obtained. In the initial deformation immediately after the collision, since the hood outer panel 33 deforms locally along the outer shape of the impactor 55, the initial reaction force F increases abruptly due to the tension of the hood outer panel 33, and reaches the maximum reaction force F1 (P1) at the stroke S1. After the maximum reaction force F1, since the hood outer panel 33 begins to deform deep from the surface thereof at a wider area due to the inertial force of the impactor 55, the reaction force F decreases abruptly with increasing stroke S down to the zero reaction force. In this case, in general, since it is impossible to obtain a sufficient amount of absorbed impact energy (the area A1 in FIG. 8A) till this step, the hood outer panel 33 is further deformed and then stopped after having interfered with the upper surface 37a of the engine 37. In this interference of the hood outer panel 33 with the engine 37, another amount of impact energy (the area A2 in FIG. 8A) is to be absorbed. Therefore, it can be understood that this amount of impact energy (the area A2) must be absorbed by the impact absorb body 43 to reduce the deformation stroke S.

In the case of the impact test at which only the impact absorb body 43 is provided without providing the hood outer panel 33 as shown in FIG. 7C, the impact waveform C3 as shown in FIG. 8C can be obtained. In this case, since the hood outer panel 33 interferes with the impact absorb body 43 being delayed due to a gap d between the hood outer panel 33 and the upper surface of the impact absorb body 43, the impact absorb body 43 begins to deform later, and the amount of the absorbed impact energy corresponds to the area A2.

Accordingly, when the gap d between the hood outer panel 33 and the impact absorb body 43 is determined to a predetermined gap, it is possible to obtain the impact waveform C1 by combination of both the impact waveforms C1 and C2, as shown in FIG. 8A, which is approximated to the ideal impact waveform Cm. Further, in FIG. 8A, the area A enclosed by the waveform C1 and the abscissa is an addition of the areas A1 and A2, which corresponds to the amount of the absorbed impact energy. Further, FIG. 8A indicates that the impact energy must be absorbed by the impact absorb body 43 almost perfectly, before the hood outer panel 33 interferes with the engine 37. Further, FIG. 8A indicates that the impact absorb body 43 can absorb the impact energy at a relatively small reduction rate (a small negative gradient) with respect to the stroke S, so that it is possible to generate the secondary reaction force and thereby to formed the shoulder portion in the impact waveform C1.

Figure 9:
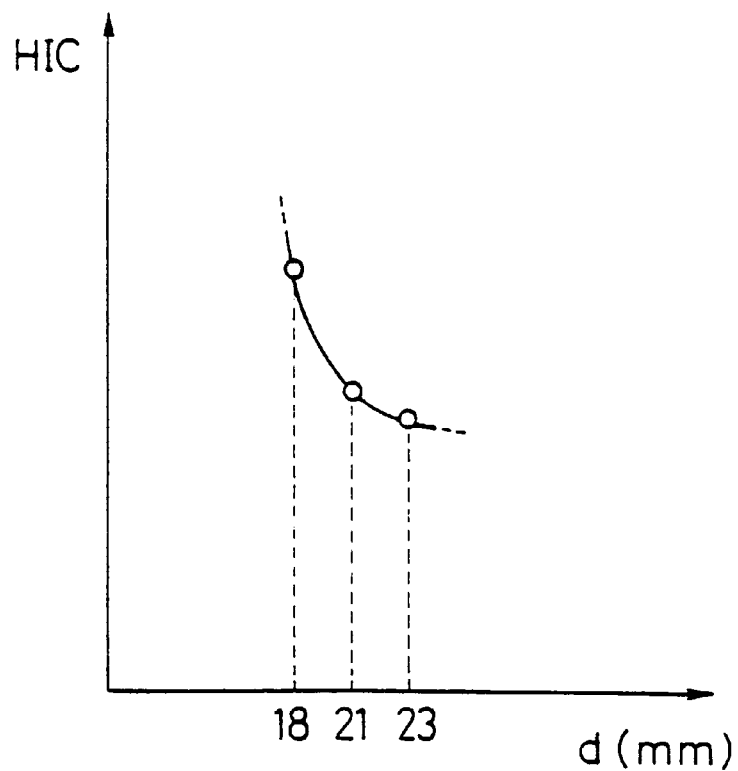
FIG. 9 is a graphical representation showing the relationship between a gap (between the hood outer panel and the engine) and the HIC value.

FIG. 9 shows the HIC values obtained by the various impact tests, in which the gap d between the hood outer panel 33 and the upper surface of the impact absorb body 43 is changed in FIG. 7A. FIG. 9 indicates that the HIC value decreases with increasing gap d or increases with decreasing gap d. Further, it is understood that the HIC value decreases relatively sharp until the gap d increases up to about 20 mm, but relatively gentle after the gap d increases beyond 20 mm. On the other hand, it is desirable that the gap d between the hood outer panel 33 and the impact absorb body 43 as small as possible in order to secure the frontward visual field (visibility range) of the driver. Therefore, it can be understood that the gap d must be determined about 20 mm in order to reduce both the HIC value and the hood stroke.

Figures 10A, 10B:
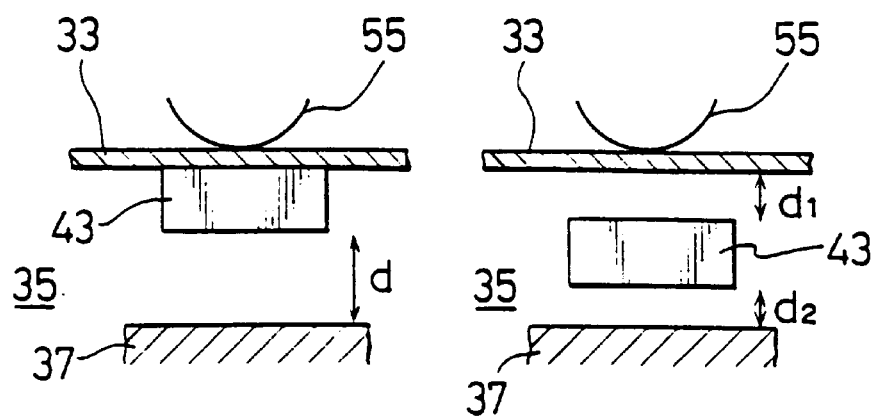
FIGS. 10A and 10B are cross-sectional views showing the other basic structures.

Further, FIG. 10A shows the case where the impact absorb body 43 is provided on the inner surface of the hood outer panel 33, so that the gap d is formed between the lower surface of the impact absorb body 43 and the engine 37. FIG. 10B shows the case where the impact absorb body 43 is provided midway between the hood outer panel 33 and the engine 37, so that the gap d is an addition of a gap d1 above the impact absorb body 43 and a gap d2 below the impact absorb body 43. In these two cases shown in FIGS. 10A and 10B, it is possible to obtain the same impact test results as with the case as shown in FIG. 7A (the gap d is provided between the hood outer panel 33 and the upper surface of the impact absorb body 43). In summary, it is preferable that a sum total gap of gaps formed between the two adjacent elements of all the elements intervening between the hood outer panel 33 and the engine 37 is determined to be d=20 mm.

As described above, in the present embodiment, since the hood 31 (See FIG. 3) is so provided that the gap between the hood outer panel 33 and the engine 37 becomes (D1+D2+D3=20 mm), when an impact test is applied, it is possible to obtain an impact waveform C1 (as shown in FIG. 8A) which approximates to the ideal impact waveform Cm (as shown in FIG. 6) as follows: In the initial deformation, since the hood outer panel 33 is deformed locally along the outer shape of the impactor 55, the initial reaction force F increases abruptly up to the maximum reaction force (about F1) at the stroke (about S2). After the maximum reaction force F1, since the hood outer panel 33 begins to deform deep from the surface thereof at a wide area due to an inertial force of the impactor 55, the reaction force F decreases abruptly down to about F2 at the stoke S2. After that, since the hood outer panel 33 interferes with the impact absorb body 43, the desirable secondary reaction force can be generated by the impact absorb body 43, so that a clear shoulder portion qm can be obtained in the impact waveform C1. Further, when the impact absorb body 43 is crushed sufficiently to absorb the impact energy perfectly, the reaction force F decreases abruptly again down to roughly zero. Therefore, in the present embodiment, an impact waveform C1 approximating to the ideal impact waveform Cm can be obtained, with the result that it is possible to reduce the HIC (Head Injury Criterion) value effectively in spite of a relatively short stroke of the hood outer panel 33, that is, to relax the head impact against the walker in case of collision.

In addition, since the impact absorb body 43 is provided on the hood side (without providing the impact absorb body 43 on the engine room (35) side), there exists an additional effect that the engine room 35 can be simplified and thereby the freedom of design can be improved.

Figure 13:
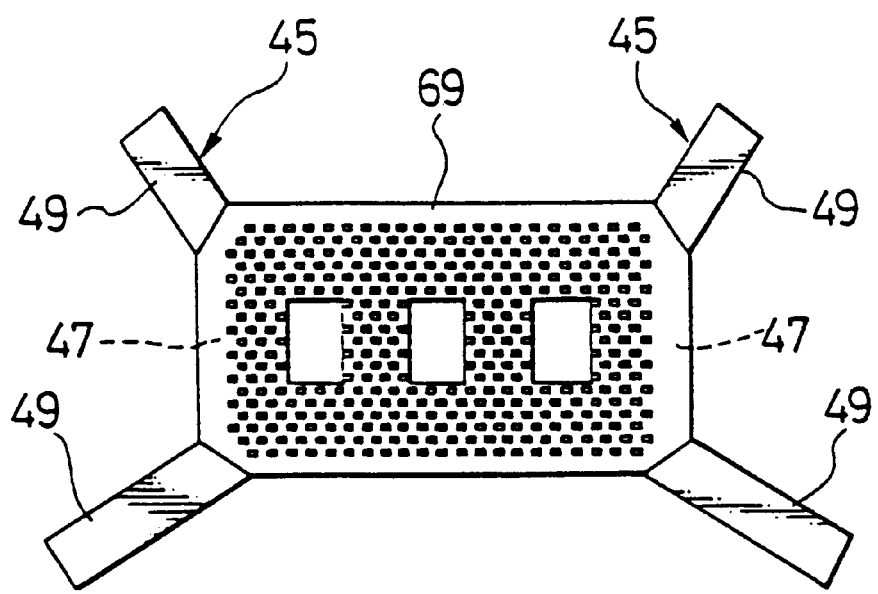
FIG. 13 is an enlarged plane view showing the impact absorb body shown in FIG. 12.

A modification of the first embodiment of the hood structure according to the present invention will be described with reference to FIGS. 12 to 14A to 14C. In this modification, a plate-shaped impact absorb body 69 is provided so as to cover the upper surface 37a of the engine 37 as shown in FIG. 13, instead of the two shock absorb members 43a, 43b or 43c as shown in FIGS. 11A to 11C. This impact absorb body 69 is also supported by the support brackets 45 in the same way as with the case of the impact absorb body 43.

Figure 14A:
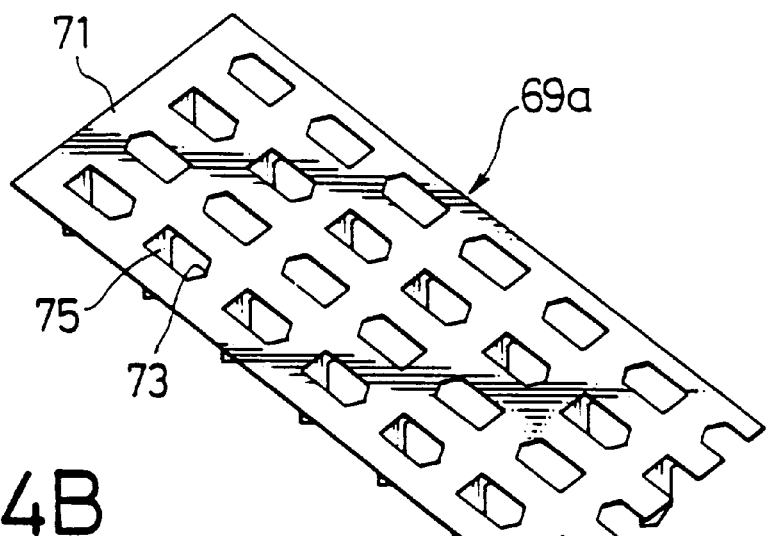
FIGS. 14A to 14C are perspective views showing a practical impact absorb body, respectively.
Figure 14B:
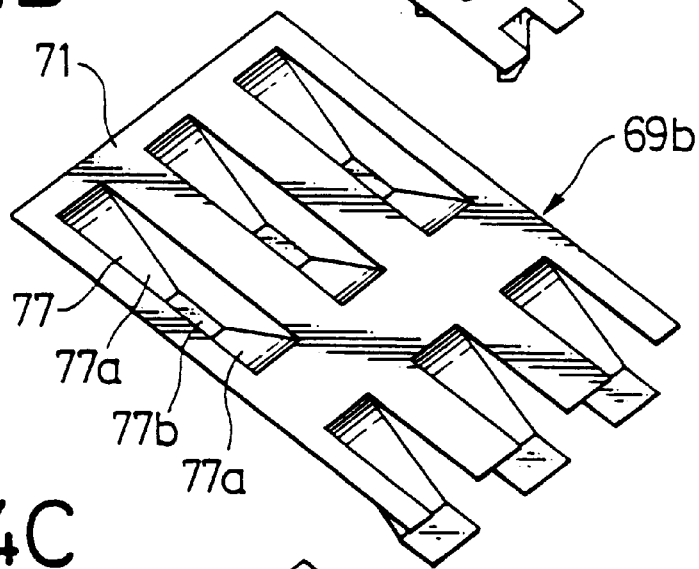
Figure 14C:
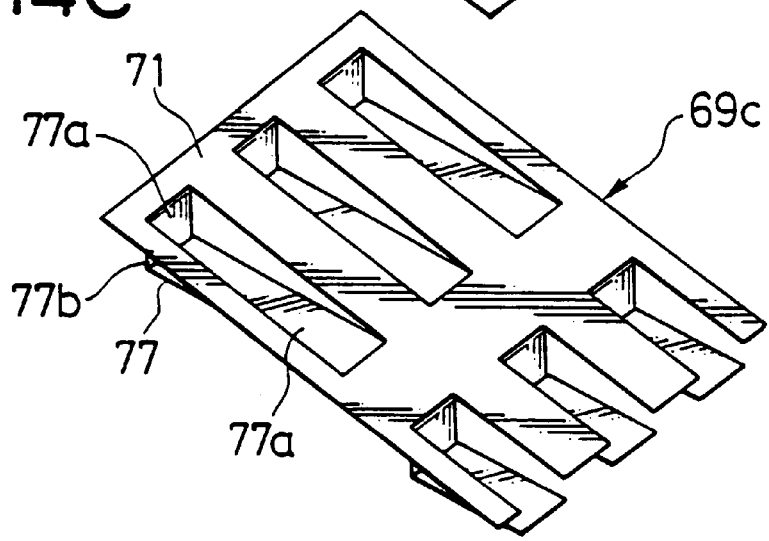

FIGS. 14A to 14C show practical shapes of the shock absorb members 69a to 69c, respectively. In the case shown in FIG. 14A, the impact absorb member 69a is formed by cutting off a number of cutouts 73 on a plate material 71 and further the cutouts 73 are bent into punch-out vertical pieces 75. In the case shown in FIG. 14B, the impact absorb member 69b is formed by punching out a number of trapezoidal projections 77 on a plate material 71 in such a way that a bottom portion 77b of each projection 77 is formed between two sloped portions 77a. In the case shown in FIG. 14C, the impact absorb member 69c is formed by punching out a number of right-angle triangular projections 77 on a plate material 71 in such a way that a sloped portion 77a is connected to a perpendicular portion 77b.

When the impact absorb body 69 as described above is provided so as to cover the upper surface 37a of the engine 37, it is possible to obtain the impact waveform C1 approximating to the ideal impact waveform Cm almost all over the range of the hood outer panel 33 located over the engine 37, so that it is possible to reduce the HIC (Head Injury Criterion) value effectively in spite of a relatively short stroke of the hood outer panel 33, that is, to relax the head impact characteristics against the walker's head in case of collision.

A second embodiment of the hood structure according to the present invention will be described hereinbelow with reference to FIGS. 15 to 18. In this second embodiment, an impact absorb body 83 is provided on the engine room (35) side. Further, in FIGS. 15 to 18, the same reference numerals have been retained for the similar parts which have the same functions as with the case of the first embodiment.

Figure 15:
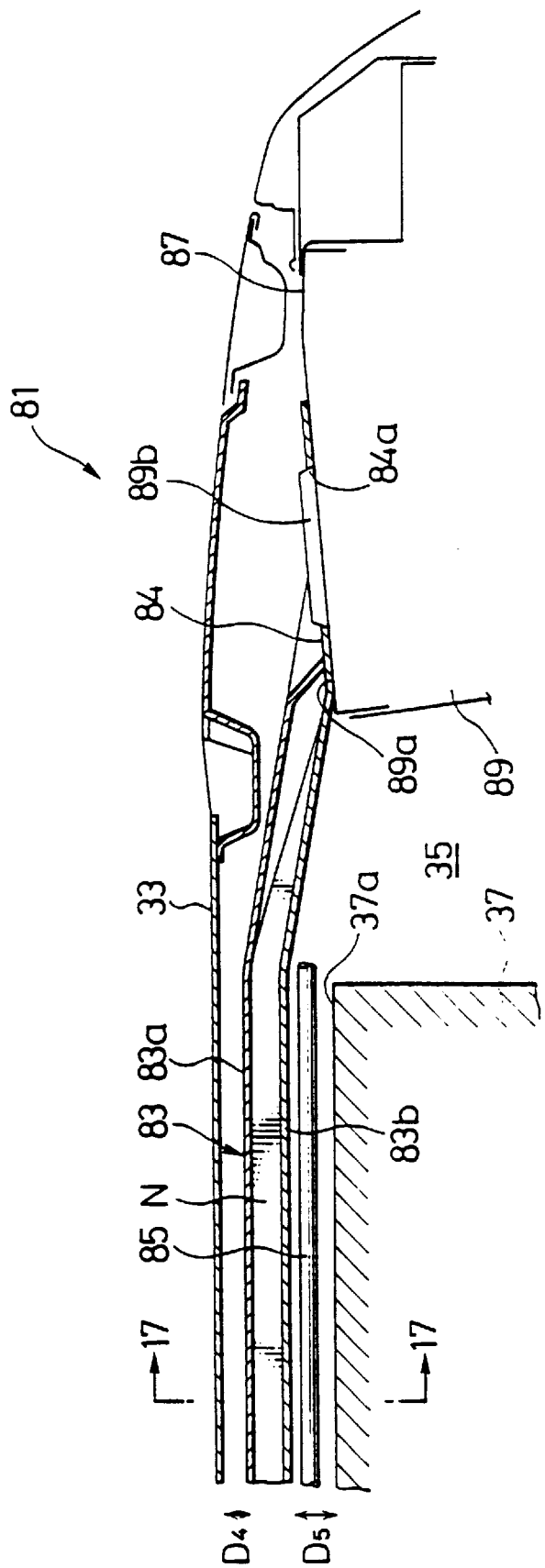
FIG. 15 is a cross-sectional view showing a second embodiment of the hood structure of an automotive vehicle according to the present invention.

FIG. 15 is a cross-sectional view showing a hood structure of the vehicle body; FIG. 16 is a plane view showing the same; and FIG. 17 is a cross-sectional view taken along the line 17—17 in FIG. 15.

As shown, the impact absorb body 83 is provided between the hood outer panel 33 of the hood 81 and the engine 37. The gap between the hood outer panel 33 and the engine 37 is an addition of a gap D4 between the hood outer panel 33 and the upper surface 83a of the impact absorb body 83 and a gap D5 between the lower surface 83b of the impact absorb body 83 and the engine 37, which is determined about 20 mm in the same way as with the case of the first embodiment.

On both sides of the engine room 35 in the vehicle width direction, two strut towers 89 are provided in such a way as to be inclined inward of the vehicle from a hood ridge portion 87 of the hood 81. A cylindrical portion 89b is formed on each upper surface 89a of the strut tower 89, and three bolts and nuts 90 are arranged around the circumference of the cylindrical portion 89b.

On the other hand, the impact absorb body 89 is formed by Joining an upper plate body 83a and a lower plate body 83b in such a way that a closed cross section N can be formed between the upper and lower plate bodies 83a and 83b. The impact absorb body 83 is joined to the upper surface 89a of the strut tower 89 on both end portions 84 thereof in such a way as to cover the engine 37 from above. In more detail, the impact absorb body 83 is formed with two holes 84a fitted to the cylindrical portions 89b of the upper surfaces 89a of the two strut towers 89, on both side portions 84 thereof. Therefore, after both the end portions 84 of the impact absorb body 83 have been fitted to the cylindrical portions 89b of the two strut towers 89 on both the sides in the vehicle width direction, the impact absorb body 83 is fastened to the strut towers 89, respectively with the bolt and nuts 90. Therefore, when the impact absorb body 83 is fixed and supported by the strut towers 89, the strut towers 89 can be prevented from being fallen inward; that is, the impact absorb body 83 is used as strut tower reinforcing members.

Further, since a wire member (e.g., acceleration wire) 85 connected to the engine 37 is usually provided over the engine 37, the lower plate body 83b of the impact absorb body 83 is formed with a curved recessed portion 86 as shown in FIG. 17, so that a predetermined space can be maintained away from the wire member 85, that is, to prevent the impact absorb body 83 from interfering with the wire member 85.

In the second embodiment as described above, since the total gap (D4+D5) between the hood outer panel 33 and the engine 37 is determined about 20 mm in the same way as with the case of the first embodiment, it is possible to obtain the impact waveform approximating to the ideal impact waveform Cm, so that it is possible to reduce the HIC (Head Injury Criterion) value effectively in spite of a relatively short stroke of the hood outer panel 33, that is, to relax the head impact characteristics against the walker's head in case of collision.

Further, since the impact absorb body 83 is provided within the engine room 35, it is possible to reduce the weight of the hood 81, and thereby the hood 81 can be opened or closed easily.

Further, since the impact absorb body 83 is joined to and supported by the strut towers 89, it is possible to prevent the strut towers 89 from being fallen without providing additional parts (e.g., strut tower bars), while increasing the rigidity of the strut towers 89, thus improving the vehicle travel stability.

Further, since the impact absorb body 83 is provided so as to cover the engine 37, it is possible to relax the head impact characteristics all over the surface of the hood outer panel 33 located over the engine 37 in the same way as with the first embodiment.

Further, it is also preferable to fill the closed cross section N of the impact absorb body 83 with a sound absorbing material 91 (e.g., glass wool). In this case, since the engine 37 can be covered with the sound absorbing material 91, engine noise can be reduced. In addition, when a plurality of holes 93 are formed in the upper plate body 83a and the lower plate body 83b, it is possible to securely adjust the collapse reaction force or the impact energy absorption rate of the impact absorb body 83, and additionally it is possible to further improve the sound absorbing effect by the sound absorbing material 91.

Figure 19:
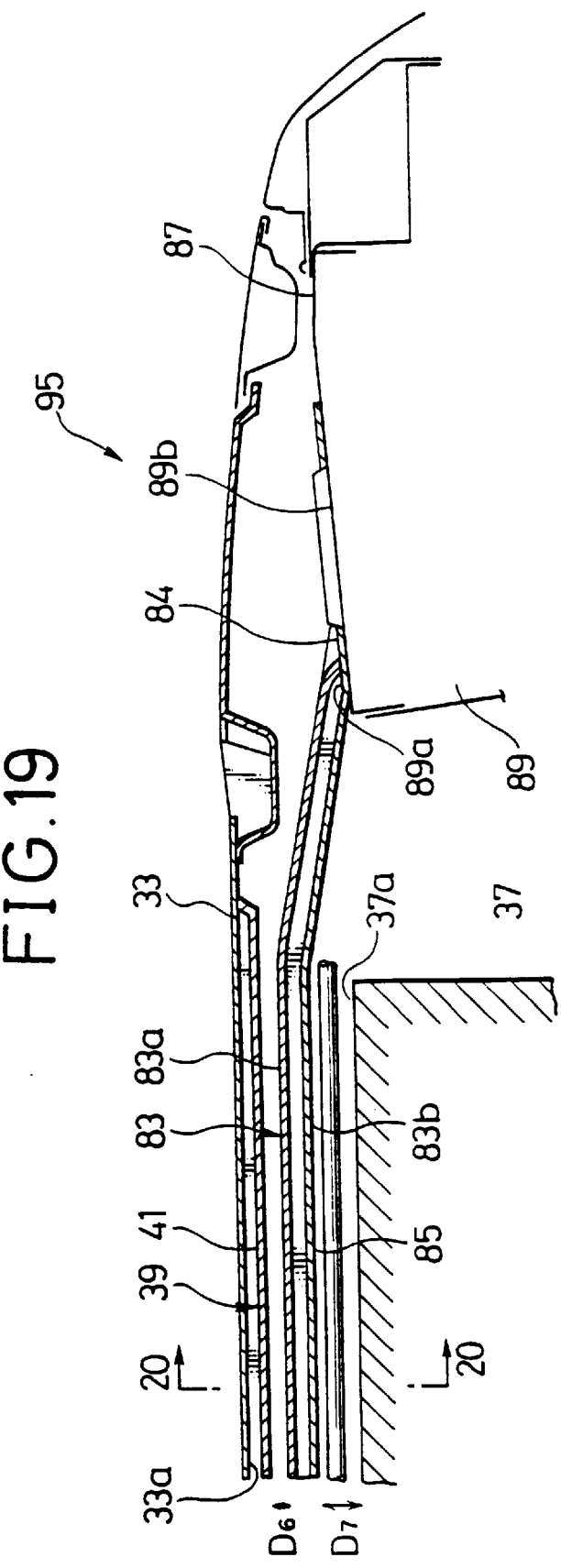
FIG. 19 is a cross-sectional view showing a third embodiment of the hood structure of an automotive vehicle according to the present invention.

A third embodiment of the hood structure according to the present invention will described hereinbelow with reference to FIGS. 19 to 20, in which some inner ribs 41 are additionally provided between the hood outer panel 33 and the impact absorb body 83. FIG. 19 is a cross-sectional view showing the hood structure; and FIG. 20 is a cross-sectional view taken along the line 20—20 show in FIG. 19.

Figure 20:
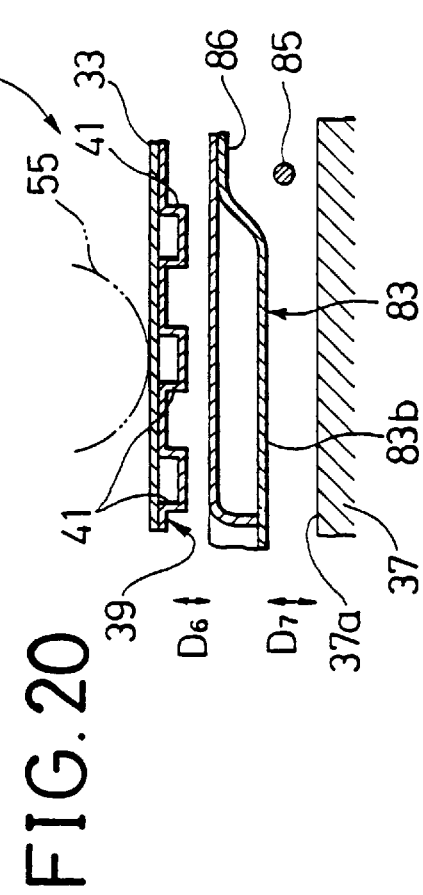
FIG. 20 is a cross-sectional view taken along the line 20—20 shown in FIG. 19.

As shown in FIGS. 19 and 20, a hood 95 of this embodiment is composed of the hood outer panel 33 and a hood inner panel 39 formed with a plurality of hood inner ribs 41. The hood inner panel 39 is bonded to the hood outer panel 33. The total gap between the hood outer panel 33 and the engine 37 is an addition of a gap D6 between the hood inner ribs 41 and the upper surface 83a of the impact absorb body 83 and a gap D7 between the lower surface 83b of the impact absorb body 83 and the engine 37, which is determined about 20 mm in the same way as with the case of the first and second embodiments. Further, the gap G6 (between the impact absorb body 83 and the hood outer panel 33) is set to a predetermined value in such a way that when the hood outer panel 33 is deformed downward by a predetermined distance and thereby the hood reaction force reaches the maximum value, the inner ribs 41 begin to interfere with the impact absorb body 83, as described later in further detail.

Further, in the same way as with the case of the second embodiment, the impact absorb body 83 is provided so as to cover the engine 37 from above and further the both end portions 84 thereof are joined to the upper surfaces 89a of the strut towers 89. Therefore, since the impact absorb body 83 can be connected to and supported by the two strut towers 89, it is possible to prevent the strut towers 89 from being fallen. Further, since the wire member 85 is usually disposed over the engine 37, the lower plate body 83b of the impact absorb body 83 is formed with a curved recessed portion 86 for providing a predetermined space away from the wire member 85, as shown in FIG. 20.

The function of the third embodiment will be described hereinbelow with reference to FIGS. 21A to 23.

In the same way as with the case of the first embodiment, the hood 95 is formed in such a way that an impact waveform approximating to an ideal impact waveform Cm can be obtained in the impact test.

Figures 22A, 22B, 22C, 22D, 22E:
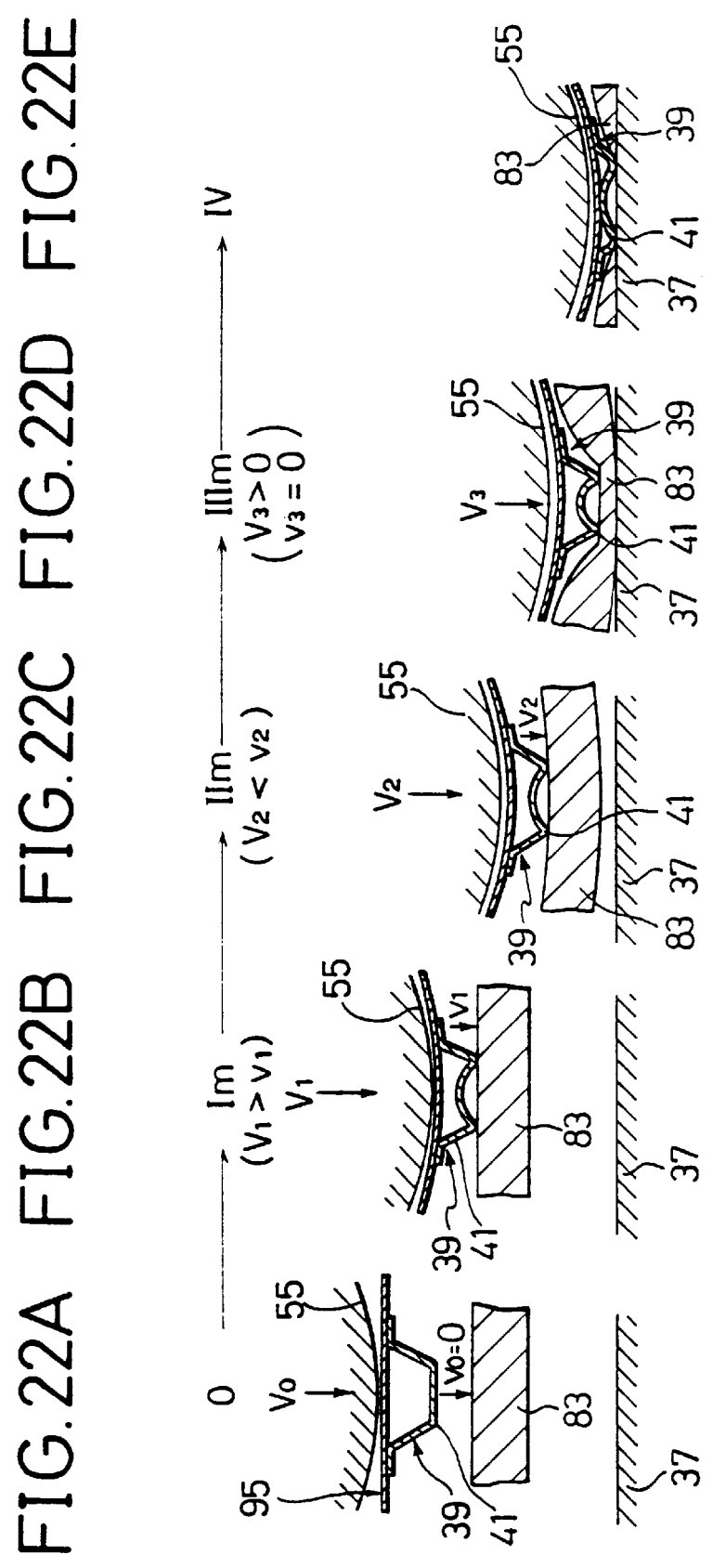
Figure 23:
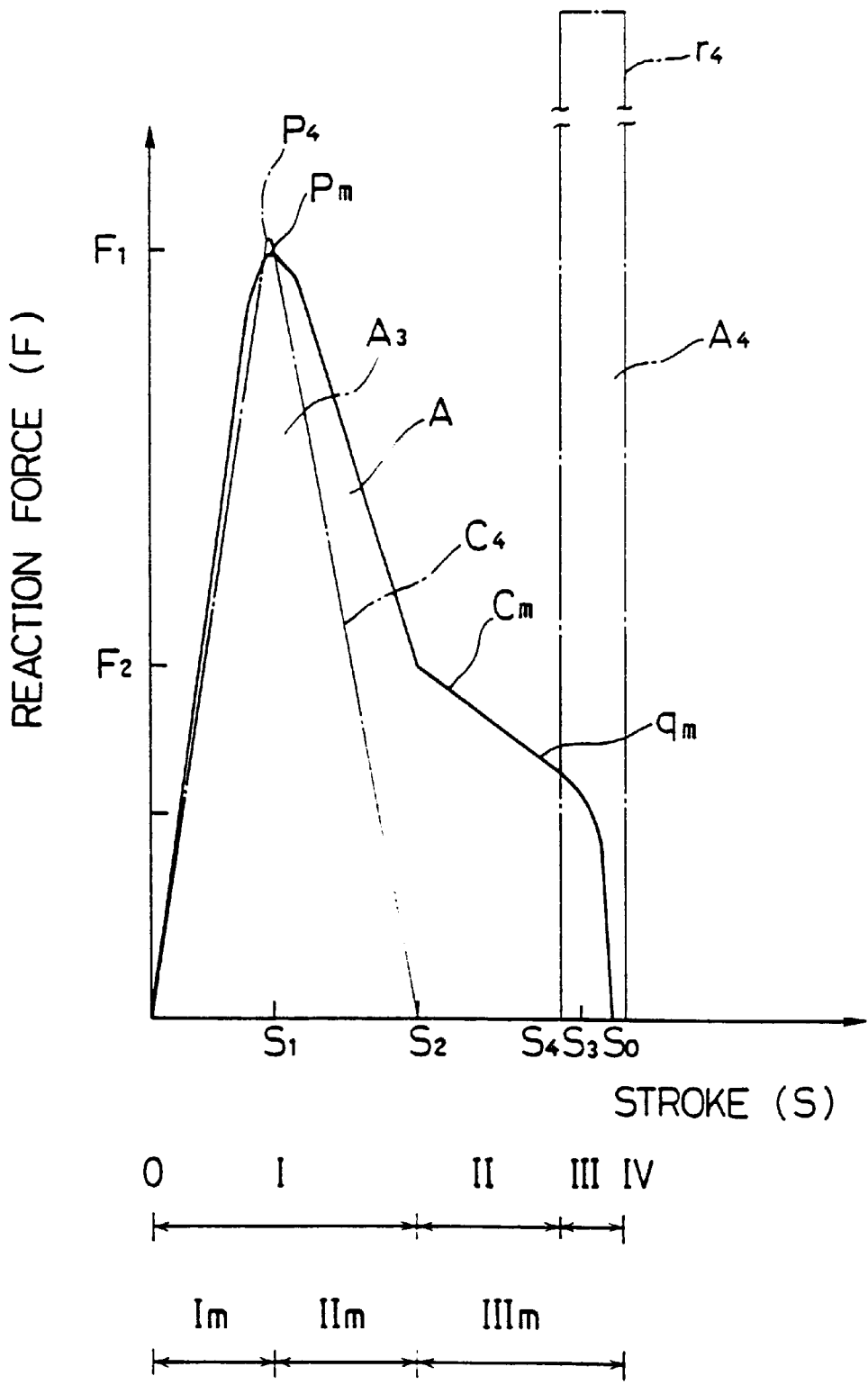
FIG. 23 is a graphical representation showing the basic impact energy absorption waveform C4 and the ideal impact energy absorption waveform Cm of the third embodiment.

FIGS. 21A to 21E show the deformation states of the basic (non-improved) structure (having no impact absorb is body 83) in the impact test; FIGS. 22A to 22E show the deformation states of the hood 95 of the present embodiment in the impact test; and FIG. 23 shows the impact waveform C4 of the basic (non-improved) structure together with the ideal impact waveform Cm. Further in FIG. 23, the impact waveform obtained by the hood 95 of the present embodiment in the impact test is omitted, because being approximated to the ideal impact waveform Cm.

The basic hood structure shown in FIGS. 21A to 21E is basically the same as that of this third embodiment, except that no impact absorb body 83 is provided. The deformation states of the basic structure having no impact absorb body 83 in the impact test and the relationship between the reaction force F and the hood deformation stroke S will be explained with reference to FIGS. 21A to 21E and 23.

As shown in FIG. 21A, when an impactor 55 (the initial speed thereof $V_\theta$>0) begins to interfere with the hood outer panel 33 at an initial stop state (the initial speed thereof $v_\theta$=0), since a force is applied from the impactor 55 to the hood outer panel 33, the hood outer panel 33 is accelerated as shown in FIG. 21B. At this time interval, since the speed $V_1$ of the impactor 55 is higher than that $v_1$ of the inner ribs 41 ($V_1$>$v_1$), the hood outer panel 33 is deformed locally along the outer shape of the impactor 55. Accordingly, as shown by a range I in FIG. 23, the initial reaction force increases up to the maximum reaction force (F1) at point $P_4$. After that, the hood outer panel 33 begins to deform deep downward due to an inertia force of the impactor 55 at a wide area, so that the reaction force F begins to decrease abruptly.

As shown in FIG. 21C, when the hood outer panel 33 is accelerated sufficiently and thereby the speed $V_2$ of the impactor 55 is lower than that $v_2$ of the inner ribs 41 ($V_2$<v2), the hood reaction force F reaches zero at the stroke S2, as shown by the range II in FIG. 23.

As shown in FIG. 21D, when the hood outer panel 33 further moves and the inner ribs 41 begin to interfere with the engine 37, since the speed $V_3$ of the impactor 55 is not zero but only the speed $v_3$ of the inner ribs 41 reaches zero ($V_3$>0, $v_3$=0), SO that the inner ribs 41 absorb the impact energy and thereby is deformed into crush. Therefore, a high reaction force F is generated as shown by the range III in FIG. 23.

After the inner ribs 41 deform sufficiently and the impact energy is absorbed perfectly, as shown in FIG. 21E, since the hood 95 stops, the reaction force F reaches zero as shown by the position IV in FIG. 23.

As described above, the impact waveform C4 of the basic (non-improved) structure approximates to the ideal impact waveform Cm only from when the initial reaction force F of the hood outer panel 33 increases abruptly at the initial deformation to when reaching the maximum reaction force ($P_4$).

However, in the impact waveform C4 of the basic (non-improved) structure, since the reaction force F decreases more abruptly after the maximum reaction force F1 than that of the ideal impact waveform Cm and further since the reaction force decreases directly to zero after the reaction force F reaches F2, the reaction force F is not relaxed after F2 and therefore the shoulder portion (qm) is not formed (because the secondary reaction force by the impact absorb body 83 is not generated), with the result that the impact waveform C4 differs largely from the ideal impact waveform Cm. In other words, it is impossible to obtain a sufficient amount of impact energy required to be absorbed only by the absorbed impact energy (the area A3 in FIG. 23) obtained before the inner ribs 41 interfere with the engine 37. In addition, when the inner ribs 41 interfere with the engine 37, since a large amount of impact energy (the area A4 in FIG. 23) is absorbed, a high reaction force F is generated after a relatively long time has elapsed after the impact start (as shown by r4 in FIG. 23), thus resulting in a harmful influence upon the head impact characteristics. is In contrast with this, in this third embodiment having the impact absorb body 83, as shown in FIG. 22A, when an impactor 55 (the initial speed thereof $V_\theta$>0) interferes with the hood outer panel 33 at an initial stop state (the initial speed thereof $v_\theta$=0), since a force is applied from the impactor 55 to the hood outer panel 33, the hood outer panel 33 is accelerated as shown in FIG. 22B. At this time interval, since the speed $V_1$ of the impactor 55 is higher than that $v_1$ of the inner ribs 41 ($V_1$>$v_1$), the hood outer panel 33 is deformed locally along the outer shape of the impactor 55, so that the initial reaction force F rises up to the maximum reaction force F1 at a point Pm in the range Im shown in FIG. 23, in the same way as with the case of the basic structure.

After the maximum reaction force, the hood outer panel 33 begins to deform deep downward due to an inertia force of the impactor 55 at a wide area. At this time, as shown in FIG. 22B, since the inner ribs 41 begin to interfere with the impact absorb body 83, a reaction force is generated by the interfere between the inner ribs 41 and the impact absorb body 83, so that it is possible to prevent the reaction force F from being decreased abruptly. As a result the reaction force F decreases in roughly the same way as with the case of the ideal impact waveform Cm in the range IIm shown in FIG. 23.

When the hood stroke S reaches a predetermined distance, as shown in FIG. 22D, since the impact absorb body 83 begins to interfere with the engine 37, the inner ribs 41 interfere with the engine 37 via the impact absorb body 83. At this time, since the speed $V_3$ of the impactor 55 is not zero but only the speed $V_3$ of the inner ribs 41 reaches zero ($V_3>0$, $v_3=0$), so that the inner ribs 41 and the impact absorb body 83 both absorb the impact energy and thereby are deformed into crush. Therefore, a desirable secondary reaction force can be generated by the impact absorb body 83. That is, since the total reduction rate of the reaction force F can be relaxed, it is possible to obtain a shoulder portion (qm) in the same way as with the ideal waveform Cm in the range III in FIG. 23. After the inner ribs 41 are deformed sufficiently and the impact energy is absorbed perfectly, as shown in FIG. 22E, since the hood 95 stops, the reaction force F reaches zero at the stroke S0, as shown by the position IV in FIG. 23.

As described above, in the impact test of the hood 95 according to the present invention, at the initial deformation, since the hood outer panel 33 is deformed locally along the outer shape of the impactor 55, the initial reaction force Increase sharply. Therefore, at the stroke S1, the maximum reaction force F1 can be obtained. After that, the hood outer panel 33 begins to deform deep at a wide area by an inertia force of the impactor 55. In this case, since the inner ribs 41 interfere with the impact absorb body 83, the reaction force F decreases at an appropriate reduction rate. When the stroke S reaches S2, the reaction force decreases down to F2. After that, since the inner ribs 41 and the impact absorb body 83 both interfere with the engine 37 and thereby are deformed, the desirable secondary reaction force can be generated, so that the shoulder portion qm can be obtained in the impact waveform. Further, after the inner ribs 41 and the impact absorb body 83 are sufficiently crashed, since the reaction force decreases abruptly again down to zero, the hood 95 stops. Accordingly, in the present embodiment, it is possible to obtain the impact waveform approximate to the ideal impact waveform Cm in the same way as with the case of the first embodiment.

Further, in the third embodiment, since the gap (D6 and D7) between the hood outer panel 33 and the engine 37 is determined about 20 mm in the same way as in the first embodiment, and further since the gape D6 between the hood outer panel 33 and the impact absorb body 83 is determined to a predetermined value, it is possible to reduce the reaction force after the maximum value at an appropriate reduction rate and further to increase the secondary reaction force securely in the hood structure of an automotive vehicle. Therefore, the impact waveform approximate to the ideal impact waveform Cm can be obtained and further the HIC value can be reduced effectively at a short stroke, thus relaxing the head impact characteristics.

Further, in the third embodiment, since the impact absorb body 83 is provided on the engine room side, the weight of the hood 81 can be reduced and thereby the hood 81 can be opened and closed easily. Further, since the impact absorb body 83 is fastened to and supported by the strut towers 89, it is possible to improve the vehicle travel stability. Further, since the impact absorb body 83 is provided so as to cover all the upper surface of the engine 37, it is possible to relax the head impact characteristics securely almost all over the surface of the hood outer panel 33 over the engine 37.

Furthermore, when a sound absorbing material is provided in the closed cross section of the impact absorb body 83, it is possible to reduce the engine noise in the same way as in the second embodiment.

A fourth embodiment of the hood structure of an automotive vehicle according to the present invention will be described herein below with reference to FIGS. 24 to 28. The feature of this fourth embodiment is to reduce the HIC value effectively over strut towers 151.

Figure 24:
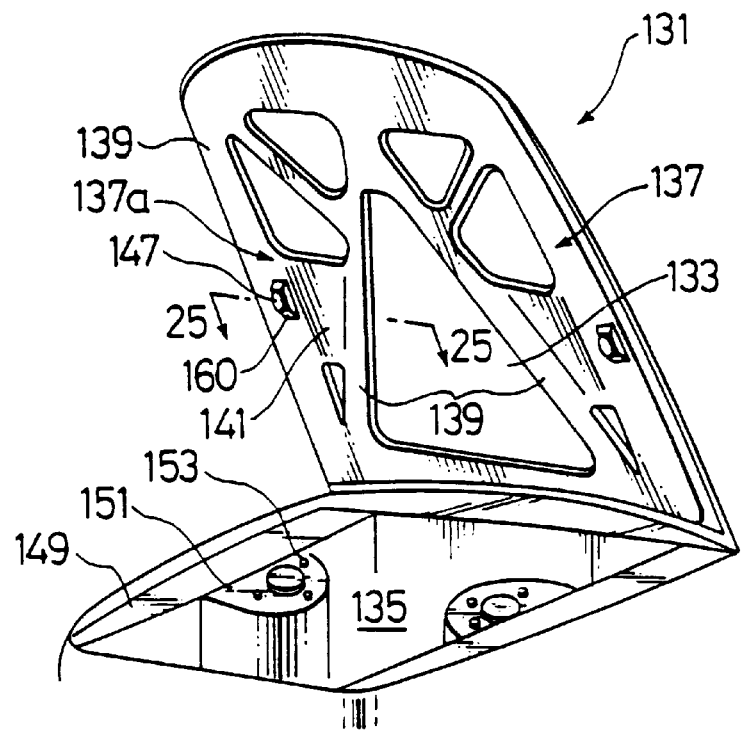
FIG. 24 is a perspective view showing a fourth embodiment of the hood structure according to the present invention.
Figure 25:
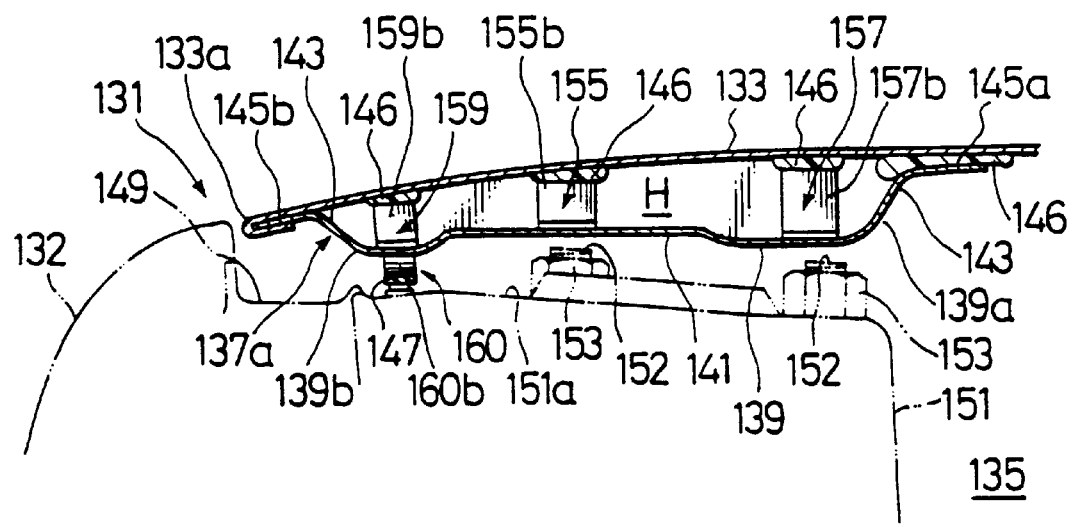
FIG. 25 is a cross-sectional view taken along the line 25—25 shown in FIG. 24.
Figure 26:
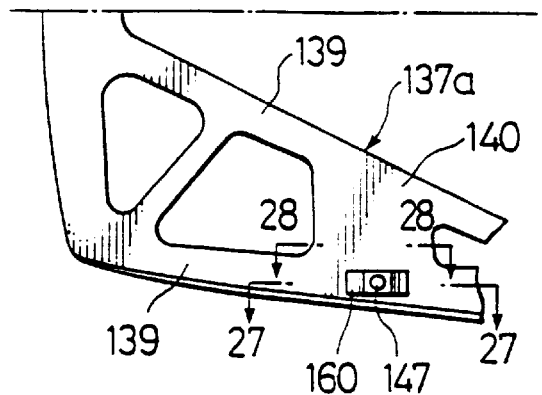
FIG. 26 is a plane view showing only the essential portion of the fourth embodiment of the hood structure shown in FIG. 24.
Figure 27:
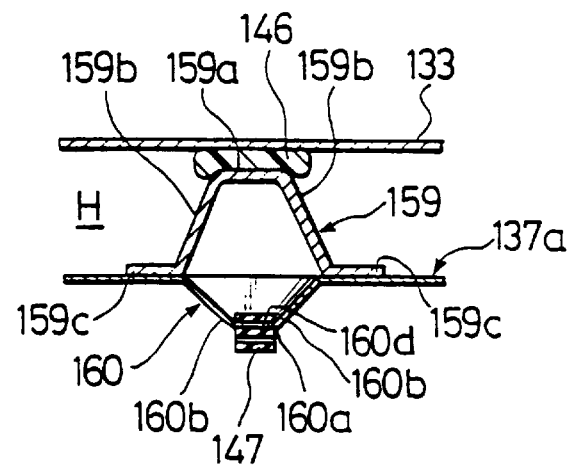
FIG. 27 is a cross-sectional view taken along the line 27—27 shown in FIG. 26.
Figure 28:
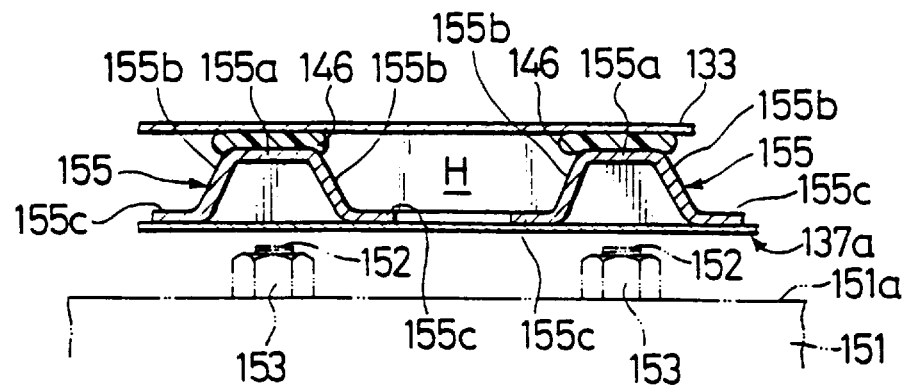
FIG. 28 is a cross-sectional view taken along the line 28—28 shown in FIG. 26.

FIG. 24 is a perspective view showing the hood structure; FIG. 25 is a cross-sectional view taken along the line 25—25 in FIG. 24. FIG. 26 is a plane view showing the essential portion of the hood inner panel 137*a*; FIG. 27 is a cross-sectional view taken along the line 27—27 in FIG. 26; and FIG. 28 is a cross-sectional view taken along the line 28—28 in FIG. 26.

As shown in FIGS. 24 and 25, a hood outer panel 133 of a hood 131 closes an upper surface of an engine room 135, and a hood inner panel 137 is attached to the inner surface of the hood outer panel 133 (on the engine room (135) side). The hood inner panel 137 is formed with a plurality of hat-shaped inner ribs 139 along and inside the circumference portion of the hood outer panel 133 to increase the rigidity of the hood inner panel 137.

A strut tower 151 is provided on both sides of the engine room 135, respectively in such a way as to project from a hood ridge 149 inward of the engine room 135. Three bolts 152 are provided vertically to an upper surface 151*a* of each strut tower 151, and a nut 153 is engaged with each bolt 152.

A hollow portion H is formed between the hood outer panel 133 and the hood inner panel 137*a* located over the strut tower 151 (referred to as the over-strut hood inner panel 137*a*). A flat plate portion 141 is formed integral with the hood inner panel 137 extending from the over-strut hood inner panel 137*a* to the inside of the inner rib 139. The over-strut hood inner panel 137*a* is formed in the vicinity of the bolts 152 and the nuts 153 disposed on the upper portion of the strut tower 151. The inner side 145*a* (See FIG. 25) of the inner rib 139*a* extending from the flat plate portion 141 is bonded to the hood outer panel 133 with an elastic resin 146 (e.g., gum mastic), and the outer side 145*b* (See FIG. 25) of the inner rib 139*b* extending from the flat plate portion 141 is pressure fitted into a bent portion formed along an outer circumference 133*a* of the hood outer panel 133.

In the hollow portion H formed between the over-strut hood inner panel 137*a* and the hood outer panel 133 near the bolts 152 and the nuts 153, a plurality (four in this embodiment) of impact absorb members 155, 157 and 159 are arranged as an impact absorb body. The over-strut hood inner panel 137*a* and the impact absorb members 155, 157 and 159 constitute an impact absorb body. These impact absorb members 155, 157 and 159 are arranged in such a way that two intermediate impact absorb members 155 are arranged at an intermediate portion of the flat plate portion 141, and one inside impact absorb member 157 and one outside impact absorb member 159 are arranged one by one on both the inside and outside of the flat plate portion 141 in the vehicle width direction. Further, the two intermediate impact absorb members 155 are located over the two bolts 152 and the nuts 153, respectively and the inside impact absorb member 157 is located over one of the bolt 152 and the nut 153 of the strut tower 151.

As shown in FIG. 27 (taken along the line 27—27 in FIG. 26), the outside impact absorb member 159 is formed into a rectangular or a trapezoidal (hat-shaped) cross section, which is composed of an upper connect portion 159*a* bonded to the hood outer panel 133, two straight leg portions 159b extending from both ends of the upper connect portion 159a obliquely downward (which serve as an outer support portion, respectively), and two lower connect portions 159c bent outward from both lower ends of the straight leg portions 159b and welded to the over-strut hood inner panel 137a, respectively.

Further, the over-strut hood inner panel 137a is formed with a bumper rubber attach member 160 for constituting the impact absorb body under the outside impact absorb member 159. The bumper rubber attach member 160 is formed by punching out the over-strut hood inner panel 137a obliquely downward into a rectangular or trapezoidal (hat-shaped) cross section. The bumper rubber attach member 160 is composed of two leg portions 160b extending obliquely downward from the over-strut hood inner panel 137a (which serve as outer support portions, respectively) and a bumper rubber fit portion 160a formed between the two leg portions 160b. The bumper rubber fit portion 160a is formed with a hole 160d, into which a bumper rubber 147 made of an elastic resin is fitted so as to be brought into contact with an upper surface 151a of the strut tower 151. Therefore, when the bumper rubber 147 is in contact with the upper surface 151a of the strut tower 151, the hood outer panel 133 is closed, so that both the outside ends of the hood outer panel 133 can be is supported by the strut towers 151 via the bumper rubbers 147, respectively.

As shown in FIG. 28 (taken along the line 28—28 in FIG. 26), the two intermediate impact absorb members 155 are disposed so as to be opposed to the two bolts 152 and the nuts 153 projecting from the upper surface 151a of the strut tower 151. In the same way as with the case of the outside impact absorb member 159, the intermediate impact absorb member 155 is composed of an upper side connect portion 155a, two straight leg portions 155b, and a lower side connect portion 155c. Further, the inside impact absorb member 157 is roughly the same as the intermediate impact absorb member 155 in shape.

The straight leg portions 155b and 157c of the intermediate impact absorb members 155 and the inside impact absorb member 157 are all connected between the hood outer panel 133 and the over-strut hood inner panel 137a at both the ends thereof with the use of a resin (e.g., gum mastic) 146 or by welding. Further, the over-strut hood inner panel 137a is provided in the vicinity of the bolts 152 and the nuts 153 of the strut towers 151 (which server as the impact interfere body). Therefore, the vertical gap between the strut towers 151 and the hood outer panel 133 can be reduced by the straight leg portions 155b and 157c of the intermediate and inside impact absorb members 155 and 157 and the over-strut hood inner panel 137a at the strut towers 151.

Further, the straight leg portion 159b of the outside impact absorb member 156 is connected between the hood outer panel 133 and the over-strut hood inner panel 137a at both the ends thereof with the use of a resin (e.g., a gum mastic) 146 or by welding. Further, the leg portion 160b of the bumper rubber mount portion 160 having the bumper rubber 147 is disposed vertically on the over-strut hood inner panel 137a. Therefore, the vertical gap between the strut towers 151 and the hood outer panel 133 can be reduced by the straight leg portion 159b of the outside impact absorb member 159, the over-strut hood inner panel 137a and the leg portion 160b of the outside impact absorb member 159 at the strut towers 151.

The function of the hood structure as described above will be explained hereinbelow with reference to FIGS. 29 and 30.

The hood 131 of this embodiment is constructed in such a way that when an impact is applied onto the hood 131, it is possible to obtain an impact waveform approximate to the ideal impact waveform Cm which can reduce the HIC value effectively at a relatively short stroke.

Figure 29:
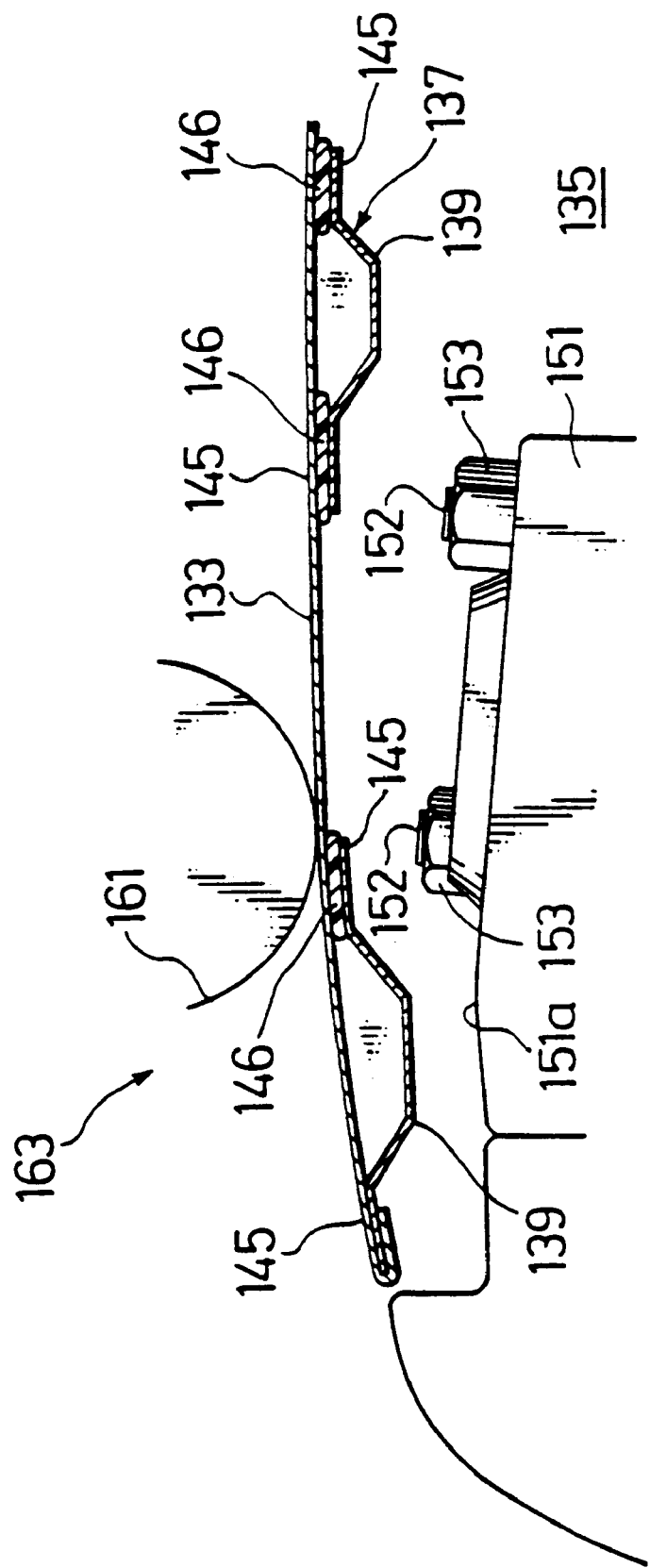
FIG. 29 is a cross-sectional view showing a basic structure of the fourth embodiment.
Figure 30:
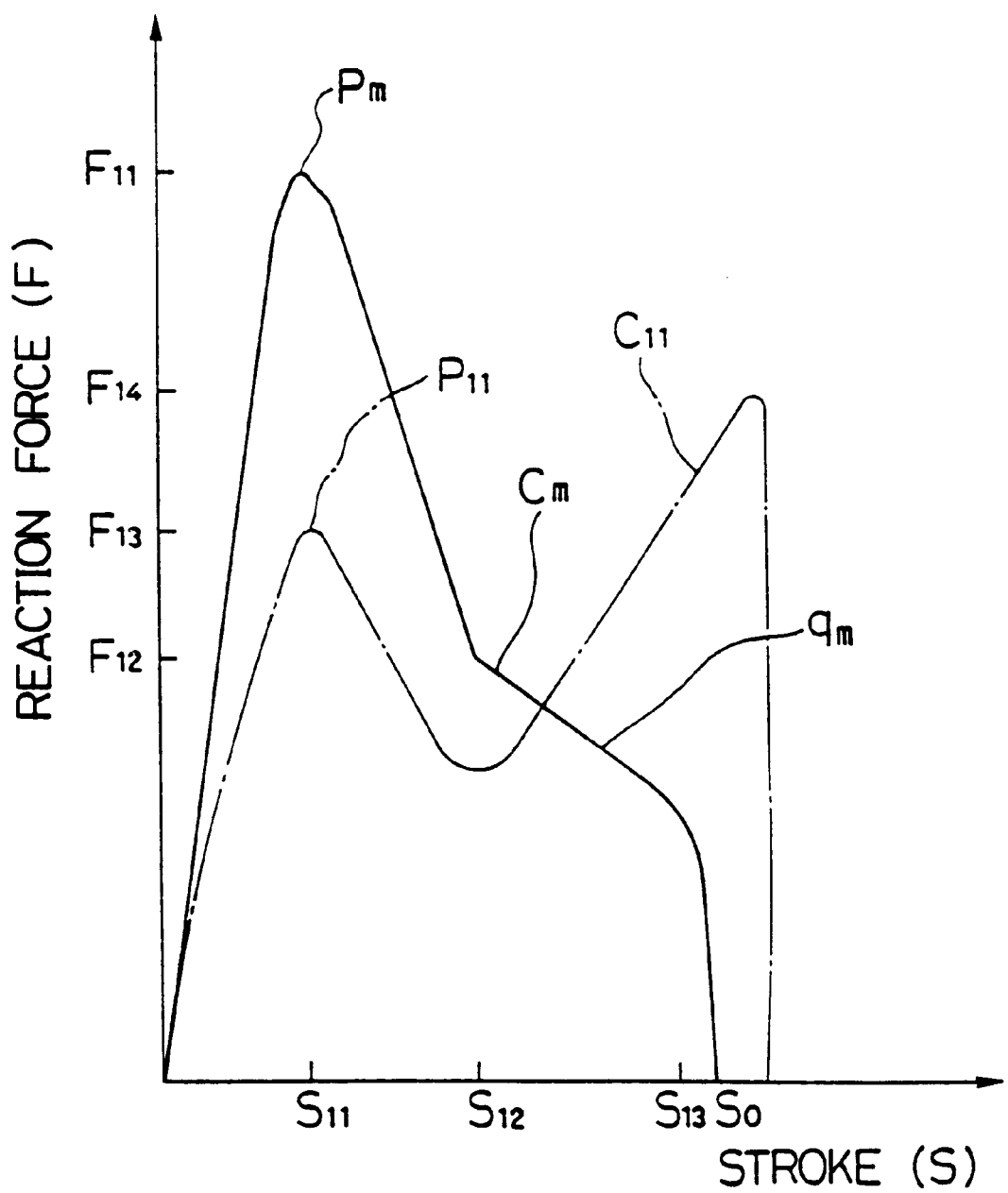
FIG. 30 is a graphical representation showing the basic impact energy absorption waveform C11 together with the ideal impact energy absorption waveform Cm.

FIG. 29 shows a basic (non-improved) structure (having no impact absorb body) in the impact test, and FIG. 30 shows a basic impact waveform C11 together with an ideal impact waveform Cm.

Here, the hood 163 of the basic structure shown in FIG. 29 is almost the same as that shown in FIG. 24, except the impact absorb body (i.e., the impact absorb members 155, 157 and 159) is not provided. Further, the bolts 152 and the nuts 153 are provided so as to face the hood outer panel 133.

In the impact test by use of the basic structure as shown in FIG. 29, an impactor 161 is brought into collision with the upper surface of the hood outer panel 133 at a position where the bolts 152 and the nuts 153 are arranged, and further the acceleration and the stroke of the impactor 161 are measured. The acceleration of the impactor 161 corresponds to the reaction force F of the hood 163 on the ordinate in FIG. 30, and the stroke of the impactor 161 corresponds to the stroke S (the movement distance of the hood outer panel 133) on the abscissa in FIG. 30. On the basis of the impact test by use of the basic structure as shown in FIG. 29, the basic impact waveform C11 as shown in FIG. 30 can be obtained.

The ideal waveform Cm can be calculated on the basis of the amount of impact energy required to be absorbed in collision and in accordance with the HIC derivation formulae (1) and (2) as already explained. In FIG. 30, the inner area partitioned by the ideal impact waveform Cm and the stroke S on the abscissa represents the amount of impact energy to be absorbed, and this inner area is so determined so as to be equal to the amount of impact energy required to be absorbed at collision. Further, the amount of impact energy required to be absorbed at collision can be obtained on the basis of the impact test and calculations.

In the ideal waveform Cm shown in FIG. 30, an initial reaction force due to the initial deformation at a small stroke S increases sharply and reaches the maximum reaction force F11 (Pm) at the stroke S11. The reaction force drops sharply down to F12 at the stroke S12. In the second half of the deformation after the stroke S12, since a secondary reaction force is generated, the reduction rate of the reaction force is relaxed, so that a shoulder portion (qm) appears. Further, when the stroke reaches S13, the reaction force F decreases abruptly, and further reaches roughly zero at the stroke S0 at which the impact energy can be perfectly absorbed. With reference to FIG. 30, in the case of the basic impact waveform C11, the initial deformation immediately after the collision is such that the hood outer panel 133 is deformed locally along the outer shape of the impactor 161 and therefore the initial reaction force increases mainly on the basis of the tension of the hood outer panel 133. However, at the both ends of the hood outer panel 133, since the hood outer panel 133 tends to be deformed or broken, a sufficient tension cannot be obtained immediately. Therefore, the increase rate of the initial reaction force of the basic impact waveform C11 is smaller than that of the ideal impact waveform Cm, so that the obtainable maximum reaction force F13 (P1) is smaller than the maximum reaction force F11 of the ideal impact waveform Cm. After the maximum reaction force F13, the hood outer panel 133 begins to deform deep at a wider area due to the inertia force of the impactor 161, so that the reaction force F decreases abruptly with increasing stroke S, so that the reaction force decreases lower than F12. Further, when the inner ribs 139 interfere with the bolts 152 and the nuts 153, the reaction force increases again up to F14, so that the hood 163 stops.

As described above, in the case of the basic structure of the hood 163, the initial reaction force is small, and further the reaction force increases again after the stroke further increases. As a result, the shoulder portion (qm) of the ideal impact waveform Cm cannot be obtained. In other words, since the reaction force F increases again when a predetermined time has elapsed after the impact start, this is not preferable to the head impact characteristics. In addition, when the hood outer panel 133 interferes with the bolts 152 and the nuts 153 and stops, the impact energy cannot be absorbed sufficiently.

In contrast with this, in the case of the hood 131 of the present embodiment, at the initial deformation, since the hood outer panel 133 is deformed locally along the outer shape of the impactor 161, the initial reaction force rises abruptly. In this case, since the vertical gap between the hood outer panel 133 and the bolts 152 and the nuts 153 is reduced by the straight leg portions 155b of the intermediate impact absorb members 155, the deformed hood outer panel 133 is supported immediately by the straight leg portions 155b, so that the deformation of the hood outer panel 133 can be suppressed immediately. Therefore, a sufficient initial reaction force can be obtained at the small stroke, that is, the maximum reaction force F11 can be obtained at the stroke S11. Further, since the bumper rubber 146 can prevent the outer end portion of the hood outer panel 133 from being broken, it is possible to increase the initial reaction force securely.

After the initial reaction force has been obtained, since the hood outer panel 133 begins to deform deep at a wider area due to the inertia force of the impactor 161, the reaction force decreases abruptly. In this case, however, since the hood outer panel 133 is still supported by the straight leg portions 155b of the intermediate impact absorb members 155 and in addition since the impact force to the hood outer panel 133 can be scattered to the over-strut hood inner panel 137a by the straight leg portions 155b, the reaction force F does not decrease extremely, so that the decrease rate of the reaction force F is maintained at a desired value. Further, when the stroke S reaches S12, the reaction force F drops down to F12. After that, since the straight leg portions 155b begin to be deformed, a desirable secondary reaction force can be generated, so that a shoulder portion qm is generated. After the straight leg portions 155b are crushed sufficiently, since a sufficient impact energy can be absorbed perfectly before the hood outer panel 133 interferes directly with the bolts 152 and the nuts 153, the reaction force F decreases again abruptly down to zero, so that the hood 131 stops.

Further, the same function and the effect can be obtained at the hood outer panel 133 over the inside and outside impact absorb members 157 and 159, respectively.

As a result, in the present invention, since an impact waveform approximate to the ideal impact waveform Cm can be obtained, it is possible to reduce the HIC value effectively in spite of the small stroke of the hood outer panel 133, so that the head impact characteristics can be relaxed.

A modification of the fourth embodiment of the hood structure according to the present invention will be described hereinbelow with reference to FIGS. 32 and 33. FIG. 32 is a plane view showing the essential portion of the hood structure; and FIG. 33 is a cross section view taken along the line 33—33 in FIG. 32.

In this modification, two intermediate impact absorb members 165 are formed by punching out the over-strut hood outer panel 137a and therefore formed integral with the over-strut hood outer panel 137a. In the same way as with the case of the intermediate impact absorb members 155, each intermediate impact absorb member 165 is composed of an upper side connect portion 165a, two straight leg portions 165b and two lower side connect portions 165c all bent from the over-strut hood inner panel 137a.

In this modification, since the impact absorb members 165 are formed integral with the over-strut hood inner panel 137a, the number of parts can be reduced and further the assembling workability can be improved.

Figure 34:
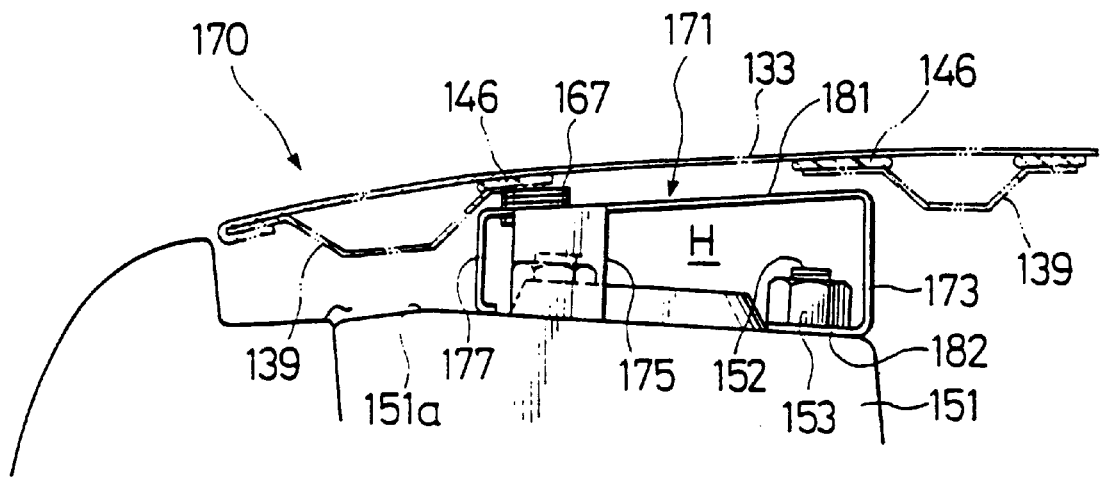
FIG. 34 is a cross-sectional view showing only the essential portion of a fifth embodiment of the hood structure according to the present invention.
Figure 35:
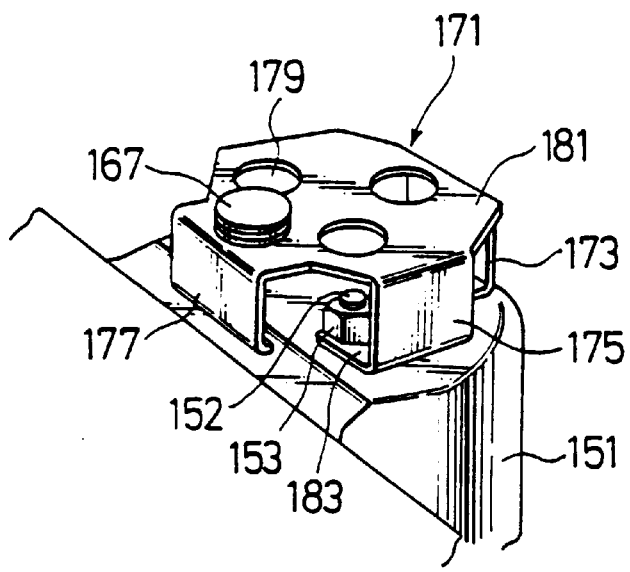
FIG. 35 is a perspective view showing the fifth embodiment shown in FIG. 34.

A fifth embodiment of the hood structure according to the present invention will be described hereinbelow with reference to FIGS. 34 and 35. The feature of this embodiment is to provide an impact absorb body 171 additionally on the upper surface 151a of each of the strut towers 151.

The impact absorb body 171 is composed of an upper plate portion 181 and a plurality of straight leg (support) portions 173, 175 and 177. The upper plate portion 181 is disposed in the vicinity of the hood outer panel 133. Each of the straight leg portions 173, 175 and 177 is bent downward and further inward from the edge portions of the upper plate portion 181 so as to extend vertically from the hood outer panel (133) side to the strut tower (151) side. Further, the upper plate portion 181 is fixed to the strut tower 151 so as to cover the three bolts 152 and the nuts 153. The upper plate portion 181 is formed with three holes 179 to adjust the collapse reaction force of the impact absorb body 171 to a predetermined desirable value. These holes 179 are formed preferably over the bolts 152 and the nuts 153 so that the impact absorb body 171 can be fixed with the use of the bolts 152 and nuts 153. Further, the lower end portions 182 and 183 of the two straight leg portions 173 and 175 are bent toward the bolts 172 and the nuts 153, and these lower end portions 182 and 183 are fastened to the upper surface 151a of the strut tower 151 to fix the impact absorb body 171 thereto.

Further, a bumper rubber 167 made of an elastic resin is attached to the outside of the upper plate portion 181 in such a way as to support the outside end of the closed hood outer panel 133.

In this fifth embodiment, the same function and effect can be obtained in the same way as with the case of the fourth embodiment.

In more detail, at the initial deformation, since the hood outer panel 133 is deformed locally along the outer shape of the impactor 161, the initial reaction force rises abruptly. In this case, since the hood outer panel 133 is supported immediately by the straight leg portions 173, 175 and 177, the deformation of the hood outer panel 133 is suppressed, so that a sufficient initial reaction force can be obtained at the small stroke, that is, the maximum reaction force F11 can be obtained at the stroke S11. Further, since the bumper rubber 167 can prevent the outer end portion of the hood outer panel 133 from being broken, it is possible to increase the initial reaction force securely.

After the initial reaction force has been obtained, since the hood outer panel 133 begins to deform deep at a wider area due to the inertia force of the impactor 161, the reaction force decreases abruptly. In this case, however, since the impact force to the hood outer panel 133 is still kept supported by the straight leg portions 173, 175 and 177 of the impact absorb body 171, the reaction force F does not decrease extremely, so that the decrease rate of the reaction force F can be maintained at a desired value. Further, when the stroke S reaches S12, the reaction force F drops down to F12. After that, since the straight leg portions 173, 175 and 177 begin to be deformed, a desirable secondary reaction force can be generated, so that a shoulder portion qm is generated. After the straight leg portions 173, 175 and 177 are crushed sufficiently, since a sufficient impact energy can be absorbed perfectly before the hood outer panel 133 interferes directly with the bolts 152 and the nuts 153, the reaction force F decreases again abruptly down to zero, so that the hood 131 stops.

As a result, in the present invention, since an impact waveform approximate to the ideal impact waveform Cm can be obtained, it is possible to reduce the HIC value effectively in spite of the small stroke of the hood outer panel 133, so that the head impact characteristics can be relaxed.

Further, since the impact absorb body 171 is provided on the strut tower 151, the weight of the hood 170 can be reduced, so that the hood 170 can be opened and closed easily.

Further, since the impact absorb body 172 can be fixed to the strut tower 151 by use of the already provided bolts 152 and the nuts 153, the construction can be simplified.

Figure 36:
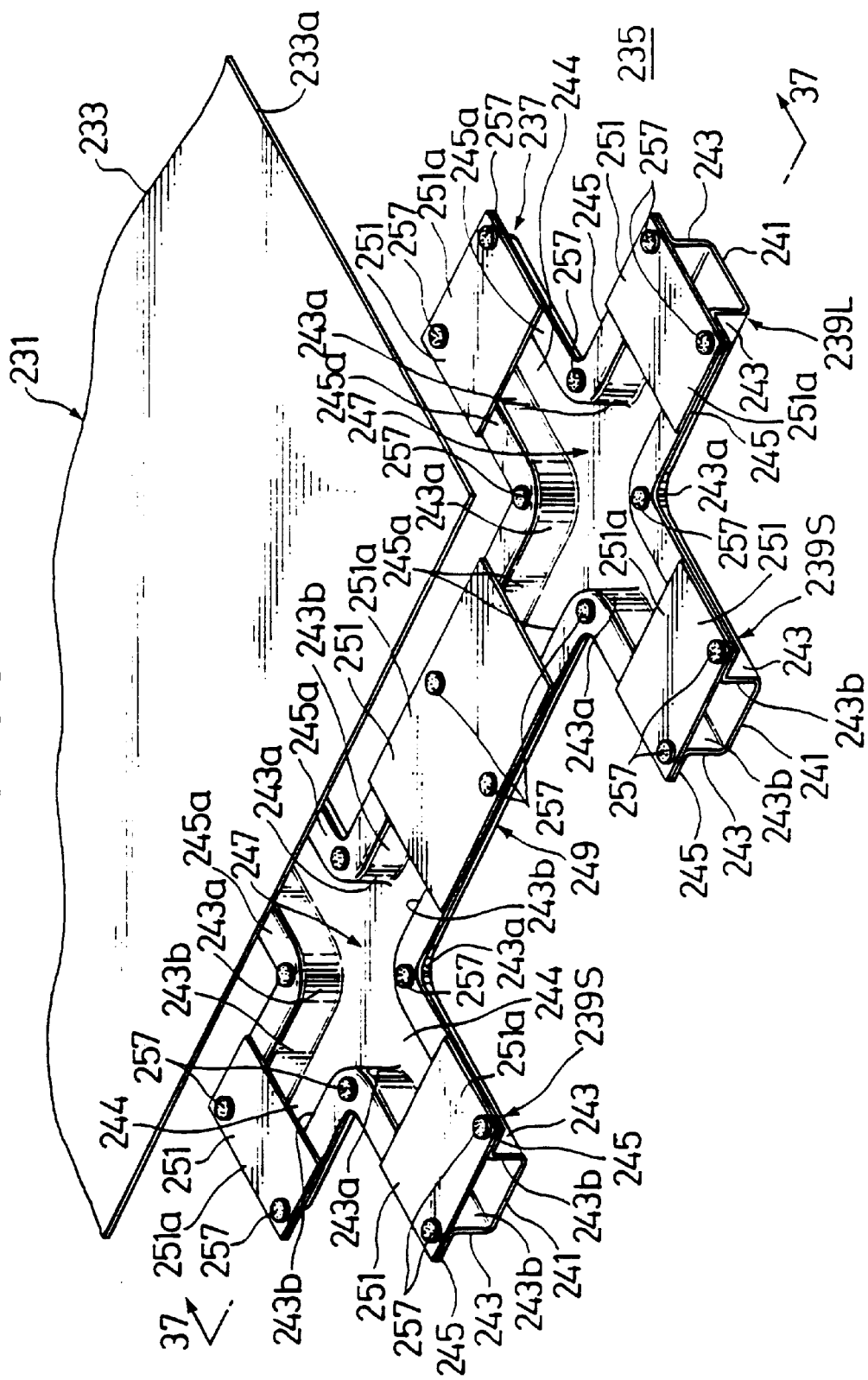
FIG. 36 is a perspective view showing an essential portion of a sixth embodiment of the hood structure of an automotive vehicle according to the present invention.
Figure 37:
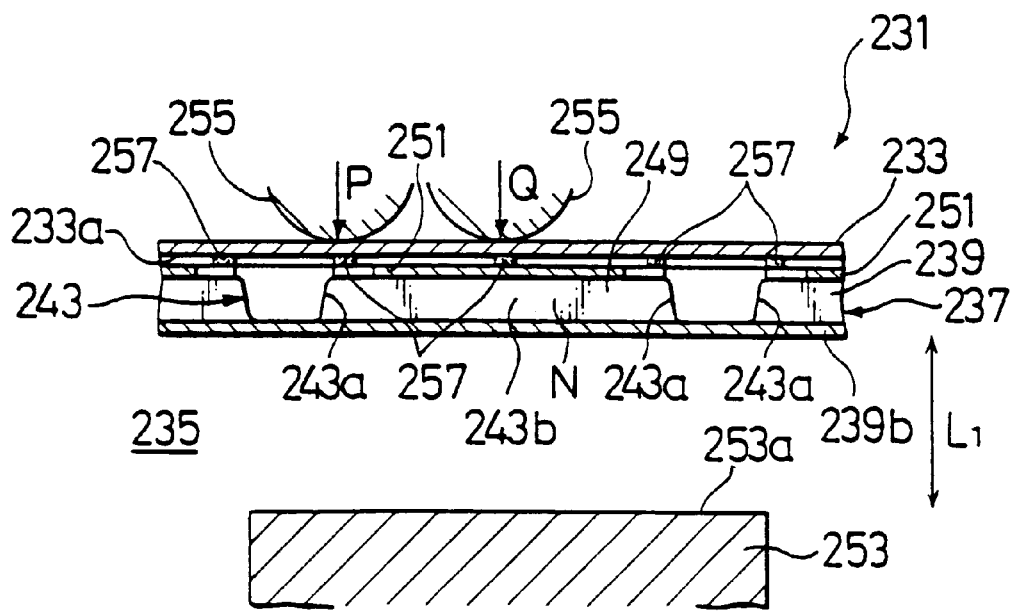
FIG. 37 is a cross-sectional view taken along the line 37—37 in FIG. 36.
Figure 38:
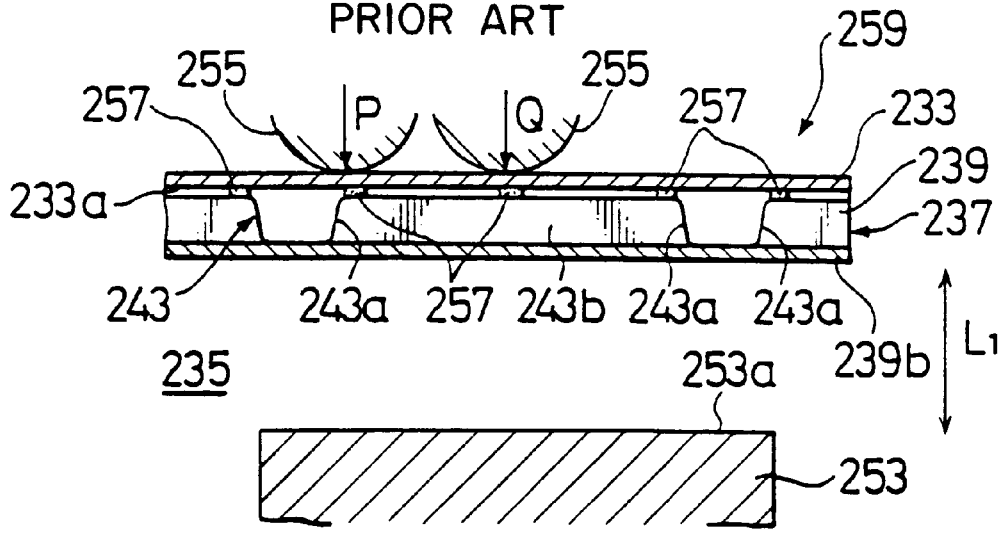
FIG. 38 is a cross-sectional view showing the basic structure of the sixth embodiment.

A sixth embodiment of the hood structure according to the present invention will be described hereinbelow with reference to FIGS. 36 to 38. FIG. 36 is a perspective view showing the hood structure; FIG. 37 is a cross-sectional view taken along the line 37—37 in FIG. 36, and FIG. 38 is a cross-sectional view showing the basic (non-improved) hood structure of this embodiment.

In FIG. 36, an hood outer panel 233 of a hood 231 closes an upper surface of an engine room 235. A hood inner panel 237 is bonded on a lower surface 233 (on an engine room (235) side) of the hood outer panel 233. The hood inner panel 237 is formed with a plurality of inner ribs 239 of channel-shaped cross section so disposed as to intersect each other. The inner ribs 239 is composed of a single long inner rib 239L and two short inner ribs 239S intersecting the single long inner rib 239L at right angles. Each inner rib 239 is deformed to absorb an impact applied to the hood outer panel 233. Each inner rib 239 is formed with a bottom plate 241 parallel to the hood outer panel 233, two opposing side walls 243 bent from the both sides of the bottom plate 241, an opening portion 244 formed between the two side walls 243, and two flange portions 245 bent from both ends of the two side walls 243 in two opposite directions in parallel to the hood outer panel 233. At each intersection portion 247 of the inner ribs 239, the adjacent bottom plates 241 and the adjacent flange portion 245s are formed integral with each other in the same plane, respectively. The side wall 243a is formed into a curved shape at each intersection point 247, but into a straight at the position away from the intersection point 247 when seen from the lower surface 233a of the hood outer panel 233. In other words, the side walls 243b of each inner rib 239 are each formed with the two opposing straight portions 249 when seen from above.

A reinforce plate member 251 is fixed to the upper surfaces 245a of the flange portions 245 at each straight portion 249 of the inner ribs 239 in such a way as to form a closed cross sectional space N enclosed between the reinforce plate member 251 and the inner rib 237. The upper surfaces 245a and 251a of the flange portion 245 and the reinforce plate member 251 are bonded to the lower surface 233a of the hood outer panel 233 with a resin (e.g., gum mastic sealer) 257 at various positions at regular intervals, as shown in FIG. 37, so that the inner rib 239 can be Jointed to the hood outer panel 233.

Further, as shown in FIG. 37, an engine 253 is disposed as an impact interfere body at the middle portion of an engine room 235. The inner ribs 239 are located away from the upper surface 253a of the engine 253 in such a way as not to interfere with the engine 253 after having deformed for impact absorption. In other words, a distance L1 between the upper surface 253a of the engine 253 and the lower surface 239a of the inner ribs 239 is determined larger than the stroke S0 of the ideal impact waveform Cm shown in FIG. 39.

The function of this embodiment will be described hereinbelow.

In this embodiment, the head impact characteristics of the hood 231 over the inner ribs 239 can be relaxed without interfering the inner ribs 239 with the engine 253; that is, the HIC value can be reduced at the hood 231 over the inner ribs 239. In other words, the hood 231 is so constructed that an impact waveform approximate to the ideal impact waveform Cm can be obtained.

Figure 39:
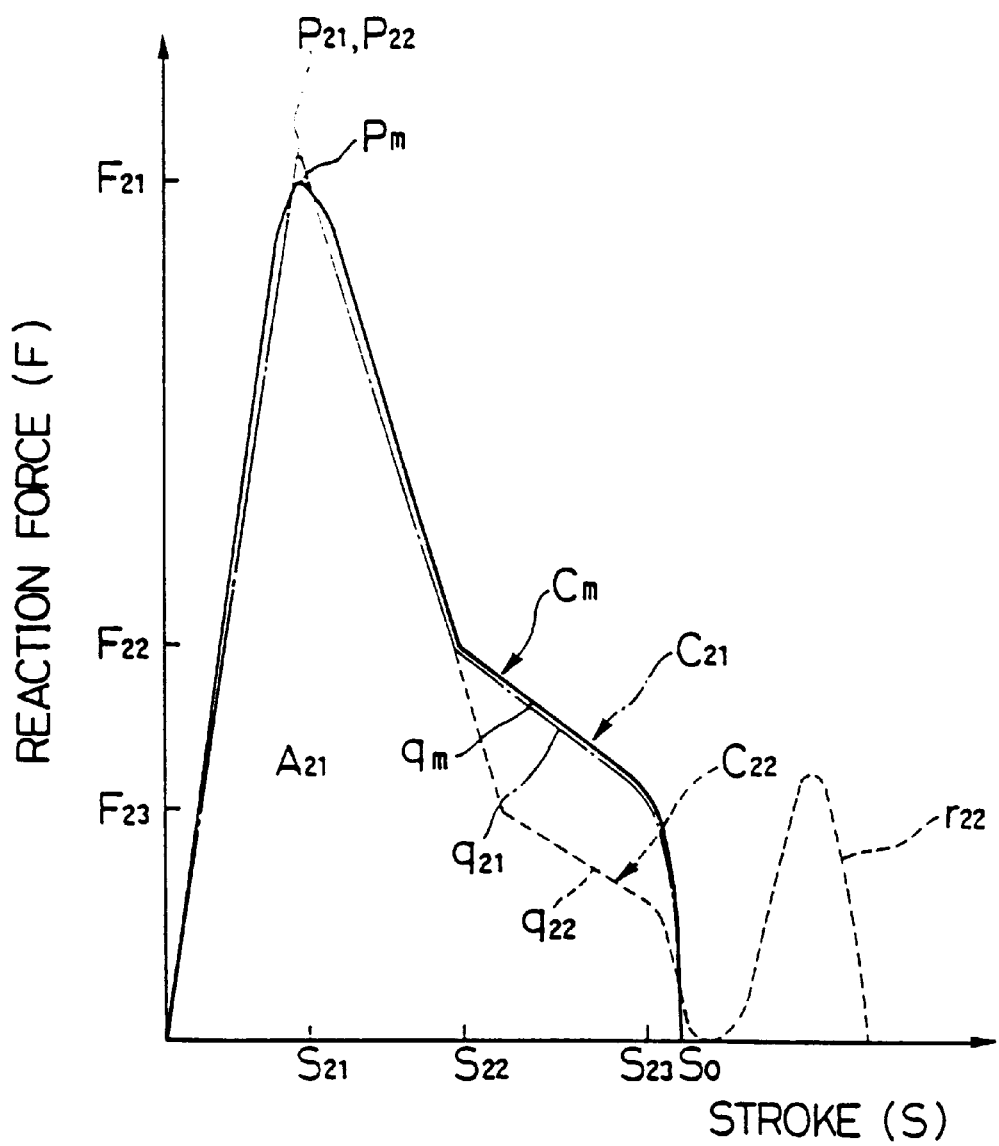
FIG. 39 is a graphical representation showing the basic impact energy absorption waveforms C21 and C22 together with the ideal impact energy absorption waveform Cm.

FIG. 38 shows a basic (non-improved) hood structure for the impact test, and FIG. 39 shows the basic impact waveforms C21 and C22 together with the ideal impact waveform Cm.

The basic hood structure shown in FIG. 38 is the same as that of the present embodiment shown in FIGS. 36 and 37, except that the reinforce plate members 251 are not disposed. Therefore, the upper surface 245a of only the flange portions 245 of the inner ribs 239 are bonded to the lower surface 233a of the hood outer panel 233 at regular intervals.

In the impact test by use of the basic structure as shown in FIG. 38, an impactor 255 is brought into collision with the upper surface of the hood outer panel 133 at a position P over the intersection point 247 of the inner rib 239 and a position Q over the straight portion 249 of the inner rib 239, respectively, and further the acceleration and the stroke of the impactor 255 are both measured. The acceleration of the impactor 255 corresponds to the reaction force F of the hood 259 on the ordinate in FIG. 39, and the stroke of the impactor 255 corresponds to the stroke S (the movement distance of the hood outer panel 233) on the abscissa in FIG. 39. On the basis of the impact test by use of the basic structure as shown in FIG. 38, the basic impact waveforms C21 and C22 as shown in FIG. 39 can be obtained. The basic impact waveform C11 at the impact position P is shown by the dot-dot-dashed line, and the basic impact waveform C22 at the impact position Q is shown by the dashed line, in FIG. 39, respectively.

The ideal impact waveform Cm is an ideal relationship between the reaction force and the stroke (the movement distance) of the hood outer panel 233 of the hood structure, which can reduce both the hood stroke and the HIC value. The ideal impact waveform Cm can be obtained on the basis of the amount of impact energy required to be absorbed at collision and in accordance with the HIC derivation formulae (1) and (2) as already explained. In FIG. 39, the inner area A21 partitioned by the ideal impact waveform Cm and the stroke S on the abscissa represents the amount of absorbed impact energy U, and this inner area A21 is so determined as to become equal to the amount of impact energy required to be absorbed at collision. Further, the amount of impact energy required to be absorbed at collision can be obtained on the basis of the impact test and calculations.

In the ideal impact waveform Cm shown in FIG. 39, an initial reaction force due to the initial deformation increases sharply at a small stroke S and reaches the maximum reaction force F21 (Pm) at the stroke S21. However, the reaction force drops sharply down to F22 at the stroke S22. In the second half of the deformation after the stroke S22, since a secondary reaction force is generated, the reduction rate of the reaction force is relaxed, so that a shoulder portion (qm) can be generated. Further, when the stroke reaches S23, the reaction force F decreases abruptly, and further reaches roughly zero at the stroke S0 at which the impact energy can be perfectly absorbed.

With reference to FIG. 38, the basic impact waveform C21 at the position P will be explained. In the initial deformation immediately after the collision, since the hood outer panel 233 is deformed locally along the outer shape of the impactor 255, the initial reaction force increases sharply on the basis of the tension of the hood outer panel 233, and reaches the maximum reaction force F21 (P21). After the maximum reaction force F21, since the hood outer panel 233 begins to deform deep at a wider area due to the inertia force of the impactor 255, the reaction force F decreases abruptly with increasing stroke S, so that the reaction force decreases down to F22 at the stroke S22. Further, after the stroke S22, since the inner ribs 239 are deformed largely and crushed, the desirable secondary reaction force can be generated, so that a shoulder portion q21 (at which the reduction rate of the reaction force F is relaxed) is generated. Further, when the inner rib 239 is crushed perfectly, since the impact energy can be absorbed perfectly before the inner ribs 239 interfere with the engine 235, the reaction force F decreases again abruptly down to zero, so that the hood stops. As described above, at the position P, it is possible to obtain the impact waveform approximate to the ideal impact waveform Cm.

On the other hand, in the case of the basic impact waveform C22 at the position Q, although the reaction force F decreases abruptly after the maximum reaction force F21 in roughly the same way as with the case of the basic impact waveform C21, after the reaction force F reaches F22, the reaction force F decreases down to F23 below F22. Therefore, the reduction rate of the reaction force is largely different from that of the ideal impact waveform Cm. In other words, the shoulder portion q22 of the basic impact waveform C22 is lower than that of the ideal impact waveform Cm.

The reason why a difference exists between the two positions P and Q is that the deformation rate of the side walls 243 of each inner rib 239 is different from each other. In more detail, since the intersecting side walls 243 of each inner rib 237 are curved at the position P, the side walls 243 are not deformed easily outward at collision, so that each inner rib 239 is deformed securely and thereby the high secondary reaction force can be generated. On the other hand, since the side walls 243 of each inner rib 237 are formed straight at the position Q, the side walls 243 are deformed easily outward at collision, so that the high secondary reaction force cannot be generated.

As described above, when the secondary reaction force is insufficient and the shoulder portion is lower than that of the ideal impact waveform Cm, since the inner area of the basic impact waveform C22 is reduced, a sufficient amount of absorbed impact energy cannot be obtained. As a result, the lower surface 239a of the inner ribs 239 collides with the upper surface 253a of the engine 253, so that the inner ribs 239 are deformed and crushed to absorb the impact energy. Consequently, the reaction force increases again after a relatively long time has elapsed after the collision, as shown by r22 in FIG. 39.

In contrast with this, in the present invention, since the reinforce plate members 251 are provided at the straight portions 249 of the inner ribs 239 as shown, a closed cross section N can be formed at each intersection. Accordingly, since the side walls 243b of the inner ribs 239 are not deformed easily outward due to the deformation of the hood 231 at the straight portions 249 of the inner ribs 239, the inner ribs 239 can be deformed securely, so that the desirable secondary reaction force can be generated and thereby a preferable shoulder portion qm can be generated. As a result, before the inner ribs 239 are crushed perfectly and interfere with the engine 253, the impact energy can be absorbed perfectly, so that it is possible to obtain an impact waveform C21 approximate to the ideal impact waveform Cm.

That is, when an impact is applied to the straight portion 249 (position Q) of the hood 231, since the hood outer panel 233 is deformed locally along the outer shape of the impactor 255 in the initial deformation, the initial reaction force increases abruptly up to the maximum reaction force F1 at the stroke S22. After the maximum reaction force F1, since the hood outer panel 233 begins to deform deep at a wider area due to the inertial force of the impactor 255, the reaction force F decreases abruptly down to F22 at the stroke S22. After that, since the reinforce plate members 251 of the hood inner ribs 239 begin to deform, the desired secondary reaction force can be generated securely and thereby the shoulder portion qm is generated. When the inner ribs 239 are crushed sufficiently, since the impact energy can be absorbed perfectly before the inner ribs 239 interfere with the engine 253, the reaction force F decreases again sharply to zero. Accordingly, in the present invention, it is possible to obtain the impact waveform C21 approximate to the ideal impact waveform Cm, so that the head impact characteristics can be relaxed by effectively reducing the HIC value even at a short stroke.

On the other hand, when an impact is applied to the intersection portion 247 (the position P), since the impact waveform C22 is roughly the same as the ideal impact waveform Cm, in spite of the fact that no reinforce plate member 251 is provided.

As described above, in the sixth embodiment, the impact waveform C21 approximate to the ideal impact waveform Cm can be obtained at the hood outer panel 233 over the intersection portions 247 (the position P) of the inner ribs 239, because the two adjacent side walls 243a of the inner ribs 239 are connected to each other along the curved shape and therefore strong. On the other hand, the impact waveform approximate to the ideal impact waveform Cm can be also obtained at the hood outer panel 233 over the straight portions 249 (the position Q) of the inner ribs 239, because the reinforce plate members 251 are provided and therefore strong. In summary, it is possible to obtain the impact waveform approximate to the ideal impact waveform Cm at any positions P and Q of the inner ribs 239, that is, the hood outer panel 233.

Figure 40:
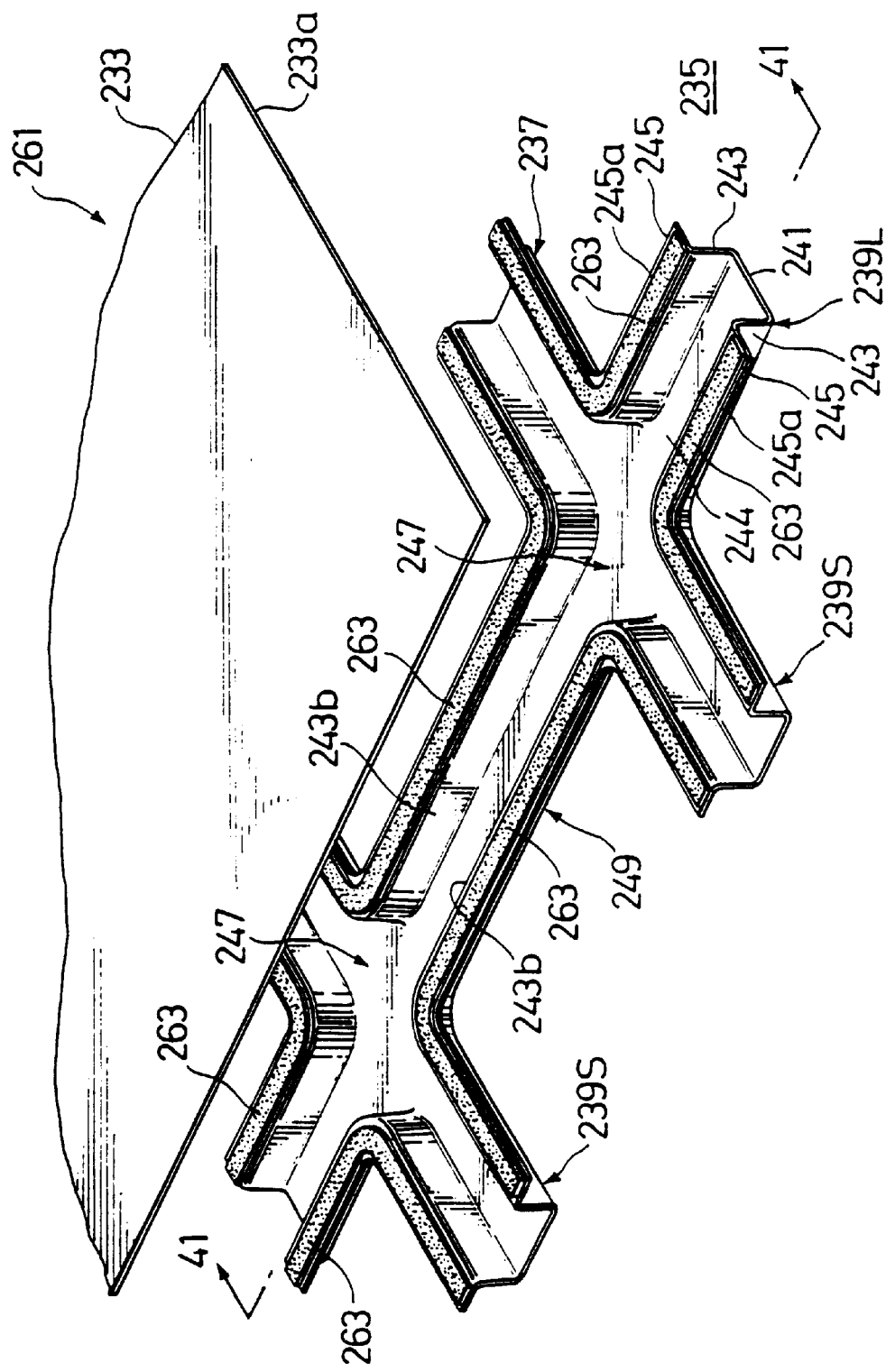
FIG. 40 is a perspective view showing an essential portion of a seventh embodiment of the hood structure of an automotive vehicle according to the present invention.
Figure 41:
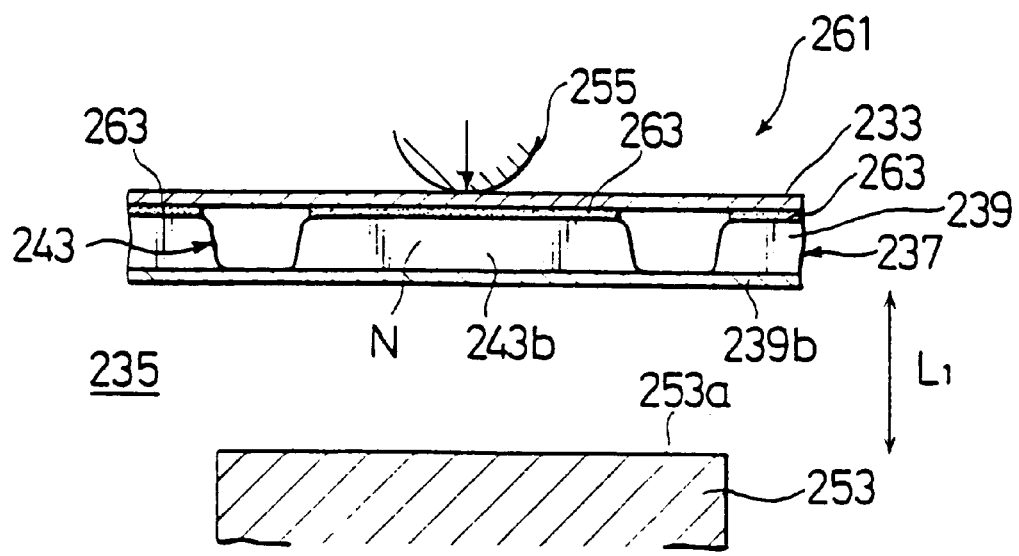
FIG. 41 is a cross-sectional view taken along the line 41—41 in FIG. 40.

A seventh embodiment of the hood structure according to the present invention will be described hereinbelow with reference to FIGS. 40 to 42. FIG. 40 is a perspective view showing the hood structure thereof; FIG. 41 is a cross-sectional view taken along the line 41—41 in FIG. 40, and FIG. 38 is a cross-sectional view showing the basic (non-improved) hood structure of this embodiment.

The feature of this embodiment is to increase the secondary reaction force by forming a closed cross sections in the inner ribs 239, without providing the reinforce plate members 251 of the sixth embodiment.

In more detail, as shown in FIGS. 40 and 41, the inner ribs 239 are bonded to the hood outer panel 233 so as to form a closed space N therebetween. That is, all over the upper surface 245a of the flange portion 245 of the inner ribs 239 are bonded to the lower surface 233a of the hood outer panel 233 (not bonded at several positions at regular intervals). The used bonding agent is an elastic gum mastic sealer, for instance.

Further, although an engine 253 is disposed at the middle portion of the engine room 235 as the impact interfere body, the inner ribs 239 are provided at a distance L1 away from the upper surface 253a of the engine 253, so as not to interfere with the engine 253 after impact absorption. This distance L1 between the lower surface 239b of the inner ribs 239 and the upper surface 253a of the engine 253 is determined larger than the stroke S0 of the ideal impact waveform Cm. in the same way as with the case of the sixth embodiment.

The function of this seventh embodiment will be described hereinbelow.

Figure 42:
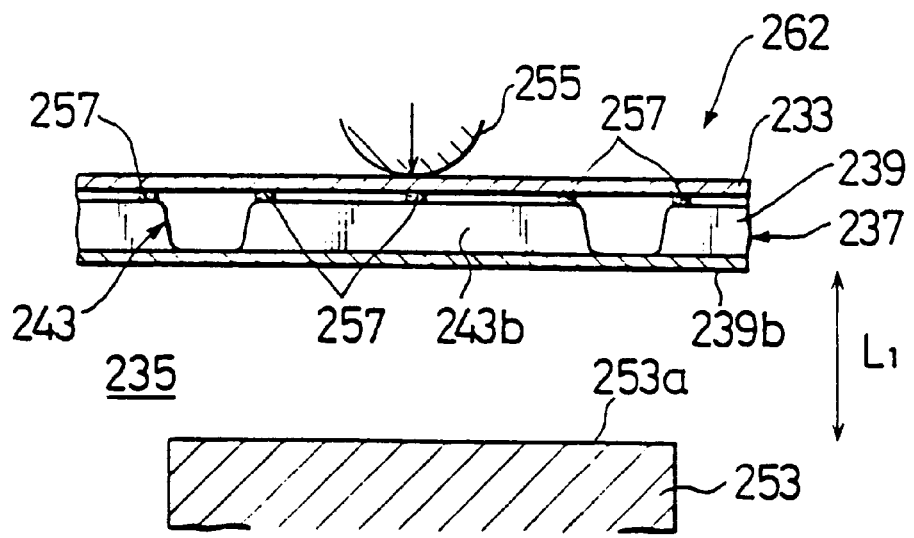
FIG. 42 is a cross-sectional view showing the basic structure of the seventh embodiment.
Figure 43:
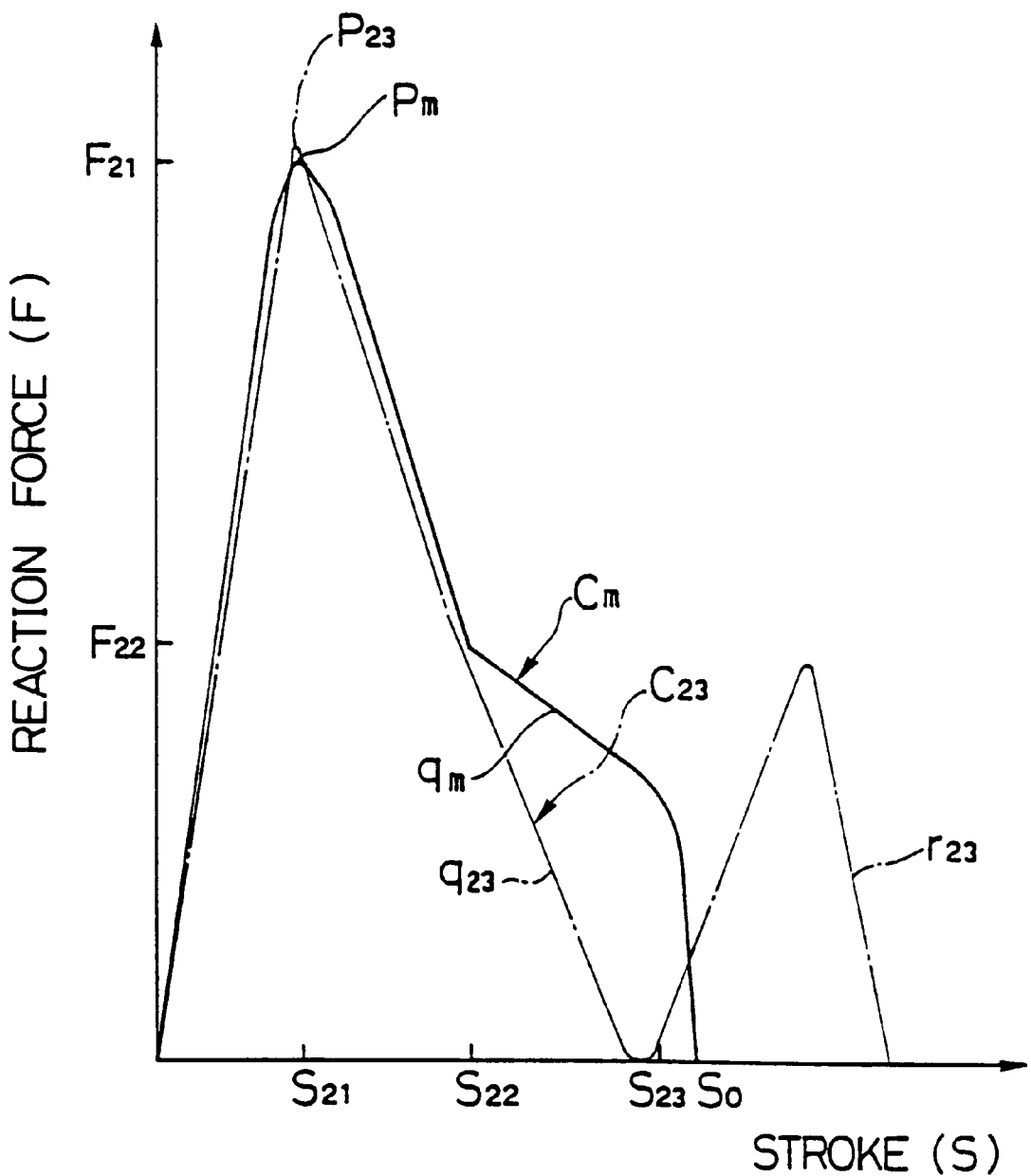
FIG. 43 is a graphical representation showing the basic impact energy waveform C23 together with the ideal impact energy absorption waveform Cm.

FIG. 42 shows a basic hood structure (point bonding) for the impact test, and FIG. 43 shows the basic impact waveform C23 together with the ideal impact waveform Cm.

Here, although the basic hood structure shown in FIG. 42 is the same as that of the sixth embodiment shown in FIG. 38, since the structure and the material of the hood outer panel 233, the hood inner panel 237 and the inner ribs 239 are different from each other, even if the same impact test as with the case of the sixth embodiment is effected, the impact test results are different from each other. The impact waveform C23 obtained by this seventh embodiment is shown by the dot-dot-dashed line in FIG. 43 together with the ideal impact waveform Cm.

In this basic impact waveform C23, although the reaction force F decreases abruptly after the maximum reaction force F21 in roughly the same way as with the case of the ideal impact waveform Cm, after the reaction force F reaches F22, the reaction force F decreases straight down to zero as shown by q23, without being relaxed. Therefore, the reduction rate of the reaction force is largely different from that of the ideal impact waveform Cm. In other words, the shoulder portion qm of the ideal impact waveform Cm is not generated.

As described above, since no shoulder portion is generated, the inner area of the basic impact waveform C23 is small, so that it is impossible to obtain a sufficient amount of absorbed impact energy. As a result, the inner ribs 239 are brought into collision with the upper surface 253a of the engine 253, so that the inner ribs 239 are deformed into crush to absorb the impact energy. Consequently, the reaction force increases again after a relatively long time has elapsed after the collision, as shown by r23 in FIG. 43.

The reason why a sufficient absorption impact energy cannot be obtained is that in the case of the basic structure as shown in FIG. 42, since the space between the hood outer panel 233 and the hood inner panel 235 (the inner ribs 239) is opened, even if the hood outer panel 233 is deformed largely, the inner ribs 239 are not deformed together with the deformed hood outer panel 233.

In contrast with this, in the present embodiment, since the inner ribs 239 are bonded to the hood outer panel 233 all over the surface of the flange portions 245 of the inner ribs 239 so as to form an enclosed space N between the two, when the hood outer panel 233 is deformed largely, the side walls 243b of the inner ribs 239 will not be opened outward, so that the inner ribs 239 can be deformed securely together with the hood outer panel 233. Therefore, the desirable secondary reaction force can be generated and thereby a preferable shoulder portion qm can be generated. As a result, before the inner ribs 239 are crushed perfectly into interference with the engine 253, the impact energy can be absorbed perfectly, so that it is possible to obtain an impact waveform approximate to the ideal impact waveform Cm.

That is, when an impact is applied to the hood 261, since the hood outer panel 233 is deformed locally along the outer shape of the impactor 255 in the initial deformation, the initial reaction force increases abruptly up to the maximum reaction force F21 at the stroke S21. After the maximum reaction force F21, since the hood outer panel 233 begins to deform deep at a wider area due to the inertial force of the impactor 255, the reaction force F decreases abruptly down to F22 at the stroke S22. After that, since the hood inner ribs 239 begin to deform, the desired secondary reaction force can be generated securely and thereby the shoulder portion qm can be generated. When the inner ribs 239 are crushed sufficiently, since the impact energy can be absorbed perfectly before the inner ribs 239 interfere with the engine 253, the reaction force F decreases again sharply to zero. Accordingly, in the present invention, it is possible to obtain the impact waveform approximate to the ideal impact waveform Cm, so that the head impact characteristics can be relaxed by effectively reducing the HIC value even at a short stroke.

As described above, in the seventh embodiment, since the inner ribs 239 are bonded to the hood outer panel 233 all over the surface of the inner ribs 239, it is possible to securely increase the secondary reaction force and thereby to allow the impact waveform to be approximate to the ideal impact waveform Cm.

Further, when the secondary reaction force at the straight portions 249 of the inner ribs 239 is not sufficient as compared with that at the intersection portion 247 of the inner ribs 239, it is also possible to provide the reinforce plate members 251 at the straight portions 247 thereof to increase the secondary reaction force at only the straight portions 247 thereof.

Figure 44:
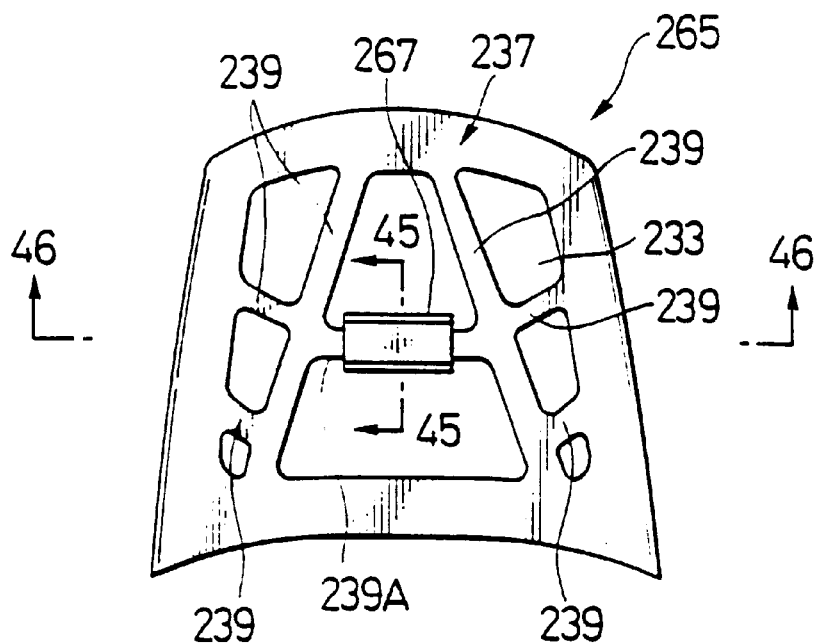
FIG. 44 is a perspective view showing an essential portion of an eighth embodiment of the hood structure of an automotive vehicle according to the present invention.
Figure 45:
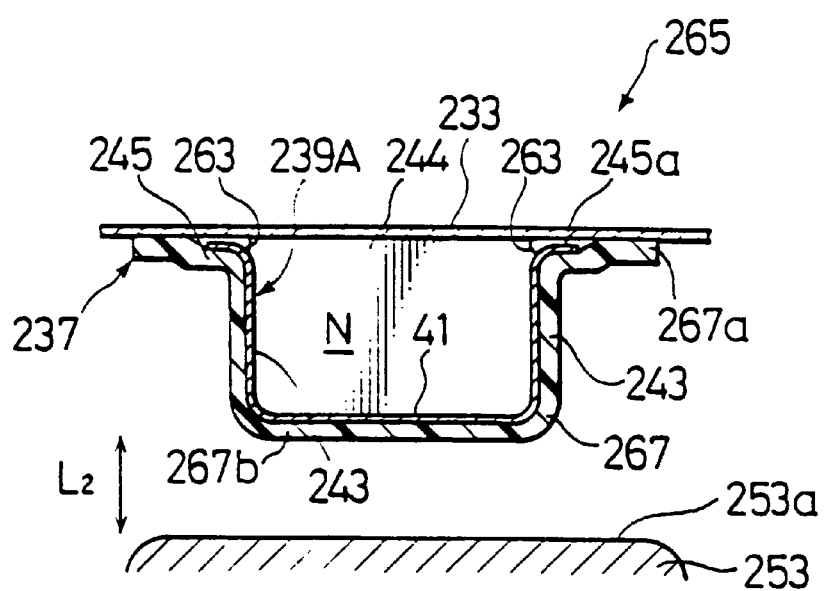
FIG. 45 is a cross-sectional view taken along the line 45—45 in FIG. 44.

An eighth embodiment of the hood structure according to the present invention will be described hereinbelow with reference to FIGS. 44 to 46. FIG. 44 is a plane view showing the hood structure: FIG. 45 is a cross-sectional view taken along the line 45—45 in FIG. 44, and FIG. 46 is a cross-sectional view taken along the line 46—46 in FIG. 44.

The feature of the hood structure 265 of this embodiment is to bring an inner rib 239A covered with a hard and brittle member 267 into interference with the engine 235 to increase the secondary reaction force.

As shown in FIGS. 44 to 46, the inner panel 37 is formed with a plurality of inner ribs 239. The outer surface of a straight inner rib 239A extending over the engine 253 (which is one of a plurality of the inner ribs 239) is covered with a hard and brittle member 267, in order to increase the reaction force of the inner rib 239A at the initial deformation. The hard and brittle member 267 is made of a hard resin or a hard resin covered with a metallic thin film, and bonded onto the outer surface of the inner rib 239A in a channel-shape cross section. Further, both ends 267a of the hard and brittle member 267 are bonded onto the inner surface of the hood outer panel 233. The two side walls 243 of the inner rib 239A is formed with a plurality of slots 269 extending vertically, as shown in FIG. 46, in order to allow the inner rib 239A to be easily deformed into crush, that is, to reduce the collapse reaction force of the side walls 243 themselves.

Further, the collapse reaction force of the side walls 243 can be adjusted freely according to the number, the shape and the size of the vertical slots 269.

Further, all over the upper surface 245a of two flange portions 245 of the hard and brittle member 267 are bonded to the lower surface 233a of the hood outer panel 233 with a resin 263 (e.g., elastic gum mastic) so as to form a closed space therebetween.

The height position of the lower surface 267b of the hard and brittle member 267 is so determined as to interfere with the upper surface 253a of the engine 253 at the end of the deformation of the hood outer panel 233 in case of collision. In other words, the gap distance L2 between the upper surface 253a of the engine 253 and the lower surface 267b of the hard and brittle member 267 is determined smaller than the stroke S0 of the ideal impact waveform Cm shown in FIG. 48.

Figure 49:
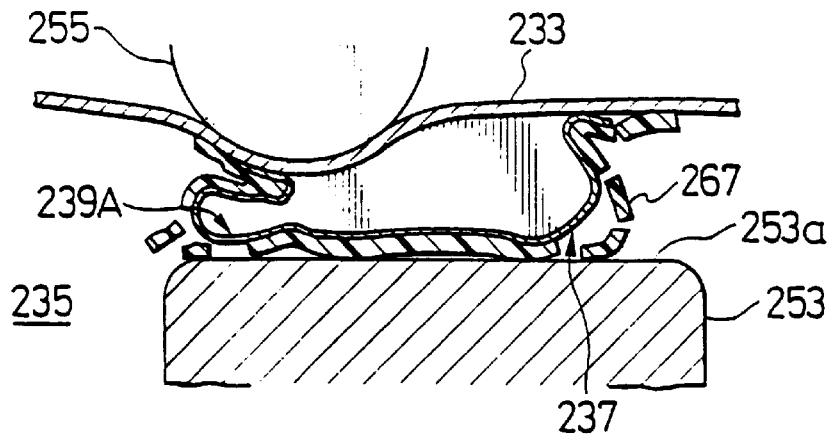
FIG. 49 is a cross-sectional view for assistance in explaining the function of the eighth embodiment.

When brought into interference with the upper surface 253a of the engine 253, the hard and brittle member 267 is broken as shown in FIG. 49 after having generated a predetermined reaction force. Further, after the hard and brittle member 267 has been broken as shown in FIG. 49, the inner ribs 239A is deformed largely by the interference with the engine 253.

The function of this eighth embodiment will be described hereinbelow.

Figure 48:
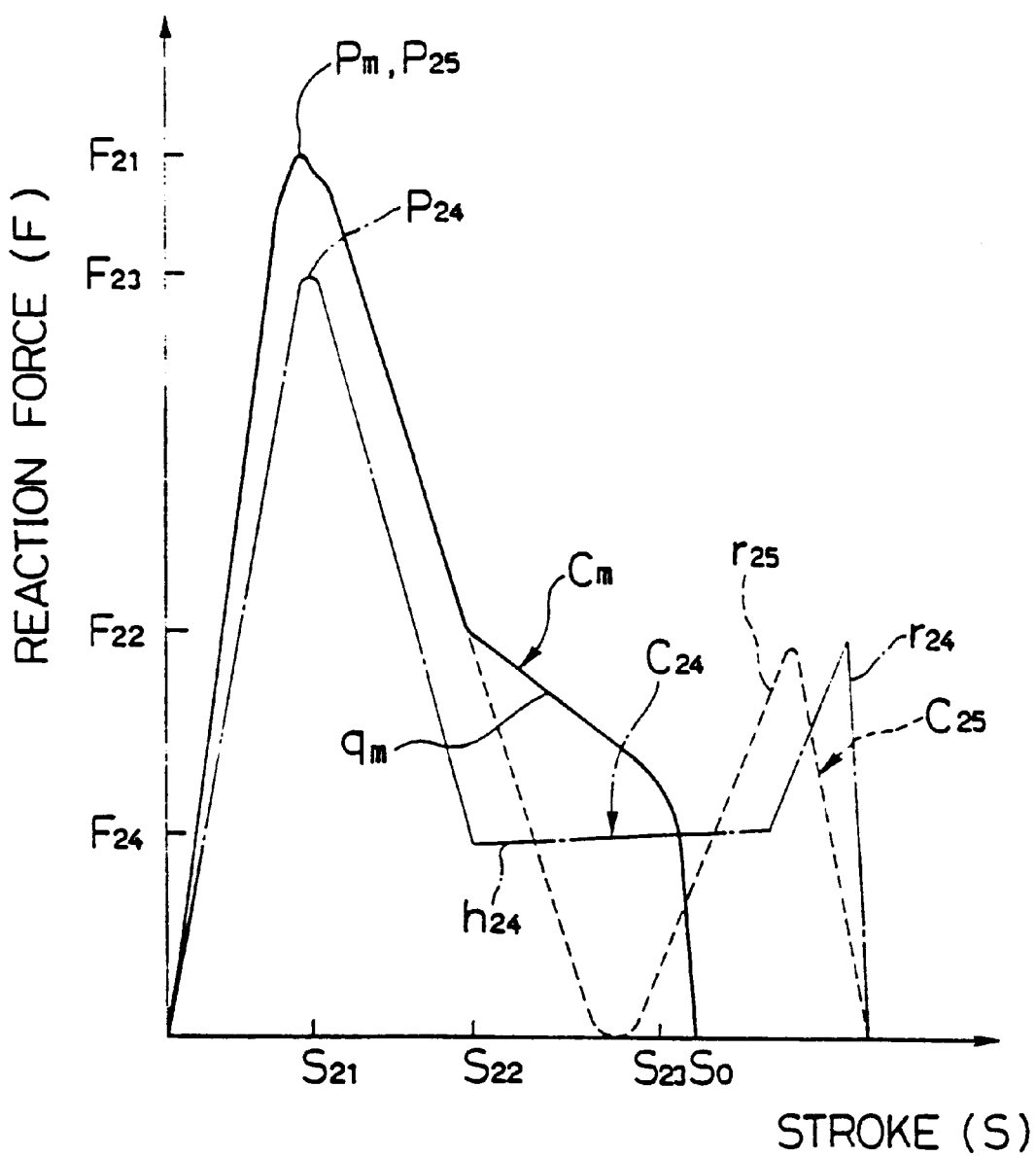
FIG. 48 is a graphical representation showing the basic impact energy absorption waveform C24 together with the ideal impact energy absorption waveform Cm.

FIG. 47 shows a basic hood structure having no hard and brittle member 267 for the impact test, and FIG. 48 shows the basic impact waveform C24 thereof together with the ideal impact waveform Cm.

Here, although the basic hood structure of the eighth embodiment shown in FIG. 47 is the roughly same as that of the sixth embodiment shown in FIG. 38, since there exist differences between the two in the basic hood structure, in the material of the hood outer panel 233 and the inner panel 237, in the dimensions and the material of the inner rib 239A, and in the gap distance (L3>L2) between the lower surface 239a of the inner rib 239A and the upper surface 253a of the engine 253, even if the same impact test as with the case of the sixth embodiment is effected, the impact test results are different from each other. The impact waveform C24 obtained by this seventh embodiment is shown by the dot-dot-dashed line together with the ideal impact waveform Cm in FIG. 48.

In comparison with the ideal impact waveform Cm, in the case of the basic impact waveform C24, the initial reaction force of the hood outer panel 233 is slightly small, and also the maximum reaction force F23 (P24) and the reaction force F24 after the maximum reaction force are both low. In addition, in the later half of the deformation of the hood outer panel 233, since the inner rib 239A begin to be deformed gradually, the reaction force increases slightly (h24), and further when the inner rib 239A interfere with the engine 253, since the inner rib 239A is deformed into crush. the reaction force F increases sharply (r24). Therefore, the basic impact waveform C24 is largely different from the ideal impact waveform. The reason is as follows: in the basic structure hood 262, since the initial reaction force is slightly small and further drops largely at the later half of the initial deformation, the shoulder portion (qm) is not generated. In addition, since the interference with the engine 253 begins late, the reaction force F increases abruptly after the stroke S exceeds S0 (r24). As a result, the reaction force F rises after a relatively long time has elapsed after the collision.

In contrast with this, in the hood 265 of the present embodiment, as shown in FIG. 45 and 46, since the surface of the inner rib 239A is covered with the hard and brittle member 267, when the hood outer panel 233 begins to be deformed deep at the initial deformation, the hard and brittle member 267 suppresses the deformation rate of the hood outer panel 233, so that it is possible to obtain an initial reaction force higher than that of the basic structure. In this deformation, since the all over the surface of the inner rib 239A is bonded to the hood outer panel 233, the deformation rate of the hood outer panel 233 can be reduced securely.

After that, when the hard and brittle member 267 begins to interfere with the upper surface 253a of the engine 253, although the secondary reaction force is first generated, since the hard and brittle member 267 is then broken as shown in FIG. 49, so the inner rib 239A is deformed largely into crush, so that the secondary reaction force decreases. In this case, since the gap between the inner rib 239A and the engine 253 is determined to a predetermined distance L2, it is possible to obtain the secondary reaction force from the stroke S22 in the same way as in the ideal impact waveform Cm. Further, since the collapse reaction force of the inner rib 239A itself can be determined to any desired value according to the number and the size of the slits 269, it is possible to securely decrease the secondary reaction force at any decrease rate.

Therefore, in the impact test of the hood 265 of the present embodiment, when an impact is applied to the hood 265, since the hood outer panel 233 is deformed locally along the outer shape of the impactor 255 in the initial deformation, the initial reaction force increases abruptly. In this case, the initial reaction force is increased by the hard and brittle member 267, so that the initial reaction force increases abruptly up to the maximum reaction force F21 at the stroke S21. After the maximum reaction force F21, since the hood outer panel 233 begins to be deformed deep at a wider area due to the inertia force of the impactor 255, the reaction force F decreases abruptly down to F22 at the stroke S22. After that, since the hard and brittle member 267 interfere with the upper surface 253a of the engine 253, the secondary reaction force can be generated. Further, when the hard and brittle member 267 is broken as shown in FIG. 49, since the inner rib 239A is deformed largely, the secondary reaction force decreases, so that the desired secondary reaction force is generated and thereby the shoulder portion can be generated. After that, when the inner rib 239A is crushed sufficiently, the impact energy can be absorbed perfectly, so that the reaction force decreases abruptly again down to zero. Accordingly, in the present embodiment, it is possible to obtain the impact waveform approximate to the ideal impact waveform Cm, so that the head impact characteristics can be relaxed by effectively reducing the HIC value even at a short stroke.

As described above, in the eighth embodiment, since the inner rib 239A is covered with the hard and brittle member 267, it is possible to securely increase the secondary reaction force and thereby to allow the impact waveform to be approximate to the ideal impact waveform Cm.

Figure 50A:
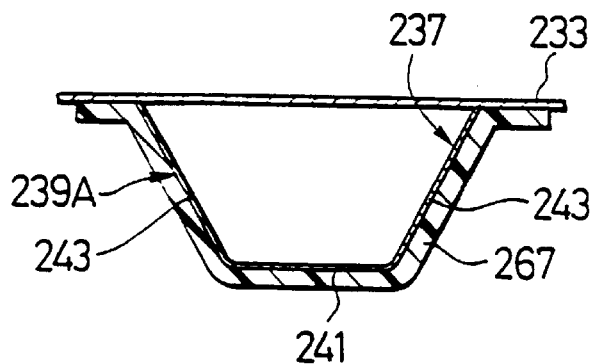
FIG. 50A is a cross-sectional view showing another inner rib of trapezoidal cross section.
Figure 50B:
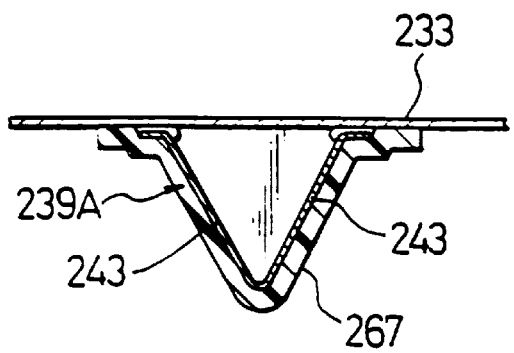
FIG. 50B is a cross-sectional view showing the other inner rib of triangular cross section.

Further, in the eighth embodiment, although the inner rib of rectangular cross section (channel shape) has been explained, it is possible to obtain the same effect as above by use of the inner rib 239A formed into trapezoidal (hat shape) or triangular cross section and covered with the hard and brittle member 267, as shown in FIGS. 50A and 50B, respectively.

Figure 51:
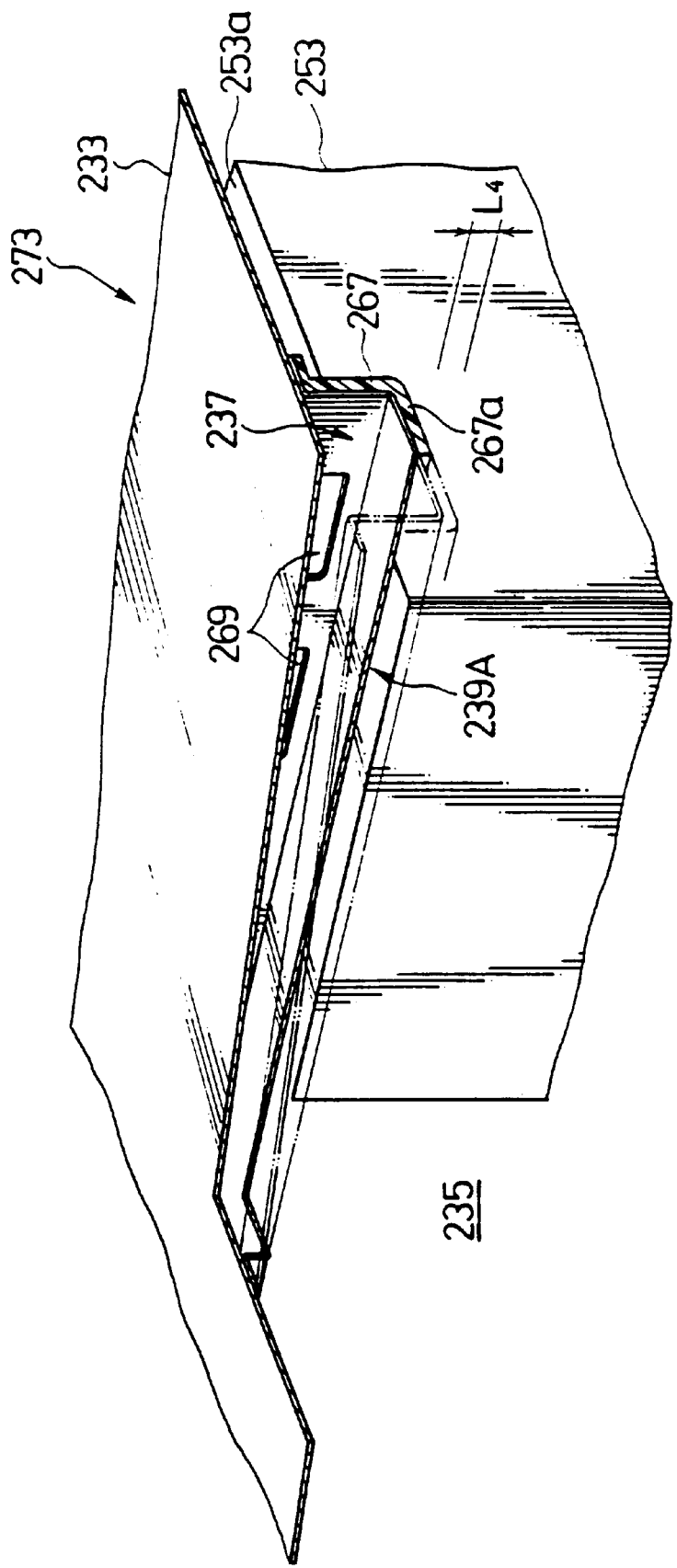
FIG. 51 is a perspective view showing a hood structure in which the distance between the hood outer panel and the engine is not uniform.

Further, even if the distance between the hood outer panel 233 and the engine 253 is not uniform as with the case of a hood 273 shown in FIG. 51, it is possible to obtain the same effect as above, as far as the inner rib 239A is formed in such a way that the distance L4 between the lower surface 267a of the hard and brittle member 267 and the upper surface 253a of the engine 253 is determined to a predetermined value.

A ninth embodiment of the present invention will be described hereinbelow, in which the basic concept of the present invention is applied to the fender structure of an automotive vehicle.

Figure 52:
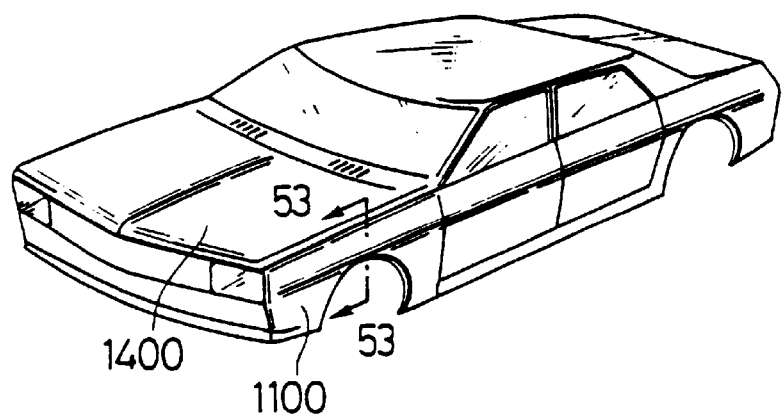
FIG. 52 is a perspective view showing the upper front structure of an automotive vehicle.
Figure 53:
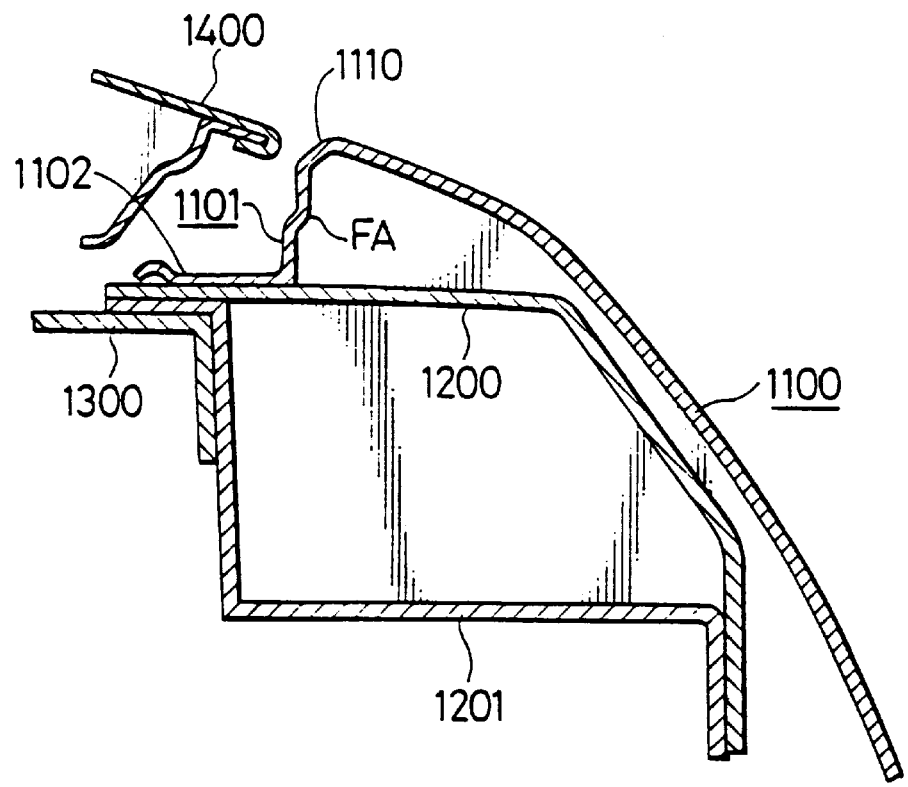
FIG. 53 is a cross-sectional view showing a comparison fender structure, taken along the line 53—53 in FIG. 52.

FIGS. 52 and 53 show the comparison fender structure, and FIG. 53 is a cross-sectional view taken along the line 53—53 in FIG. 52.

As shown, in the comparison fender structure, the upper edge portion of a fender 1100 is formed with a vertical wall 1101 having an upper project portion 1110 and a stepped portion FA. Further, a joint flange portion 1102 formed at the lower end portion of the vertical wall 1101 is joined to a hood ridge reinforce portion 1200 provided on both sides of the vehicle front so as to extend in the vehicle front and rear direction. Further, in FIG. 53, the reference numeral 1201 denotes a hood ridge upper portion joined to the hood ridge reinforce portion 1200 so as to form a closed cross section; 1300 denotes a strut housing joined to the closed cross-sectional structure; and 1400 denotes a hood for opening and closing the engine room.

In the comparison fender structure as described above, in case a head impactor is brought into collision with the outer surface near the upper project portion 1110 of the fender 1100, since the vertical wall 1101 is deformed beginning from the stepped portion FA in the initial deformation, the fender 1100 near the upper project portion 1110 is deformed and crushed so as to be inverted and thereby project toward the hood ridge reinforce portion 1200, and further deformed because the inverted portion of the fender 1100 is brought into collision with the hood ridge reinforce portion 1200.

Figure 1A:
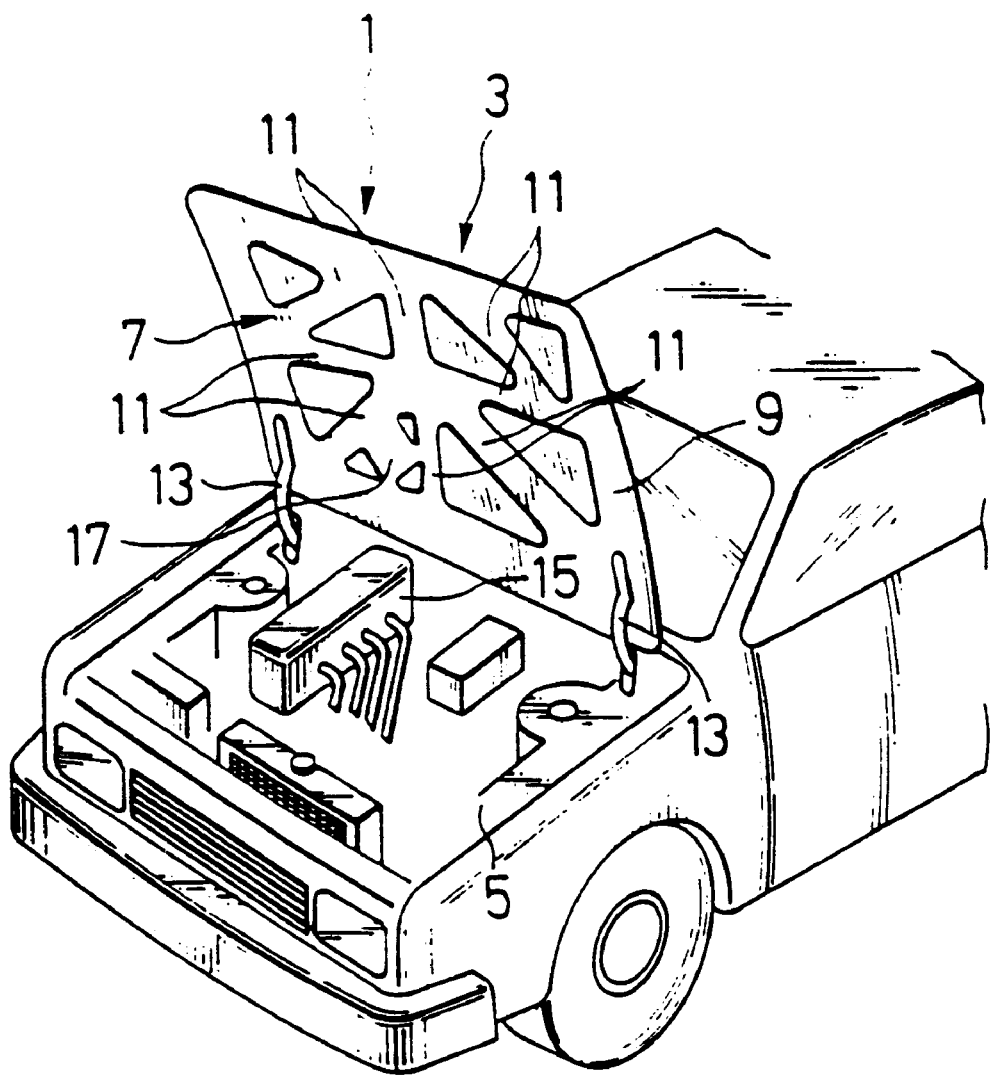
FIG. 1A is a perspective view showing a conventional hood structure for an automotive vehicle.
Figure 1B:
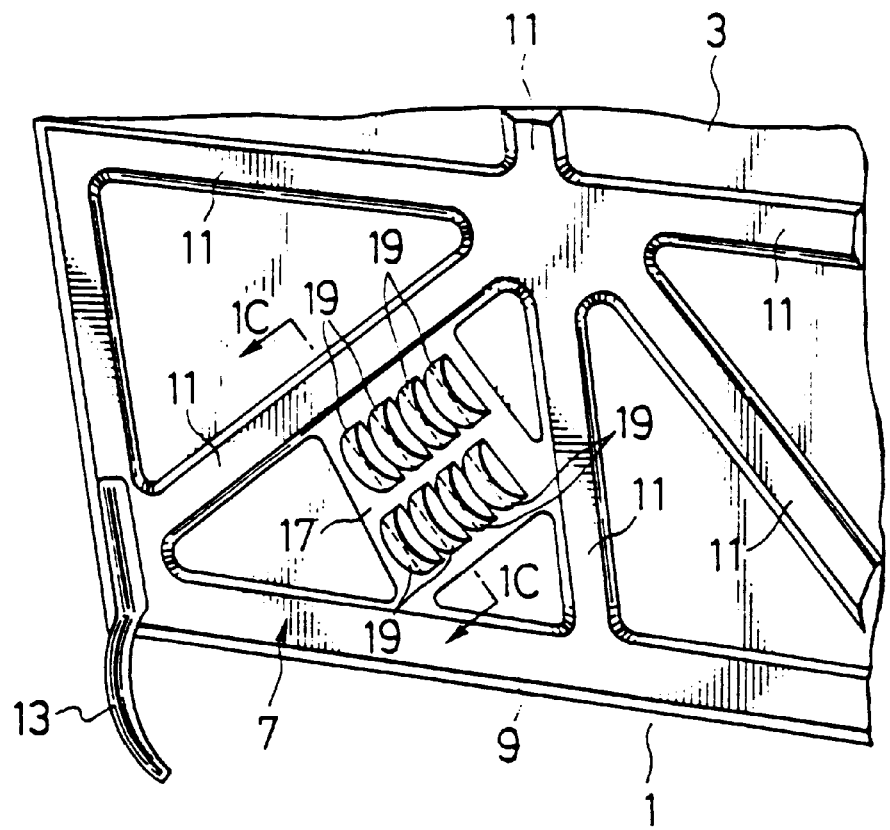
FIG. 1B is an enlarged perspective view showing only the essential portion of the hood shown in FIG. 1A.
Figure 1C:
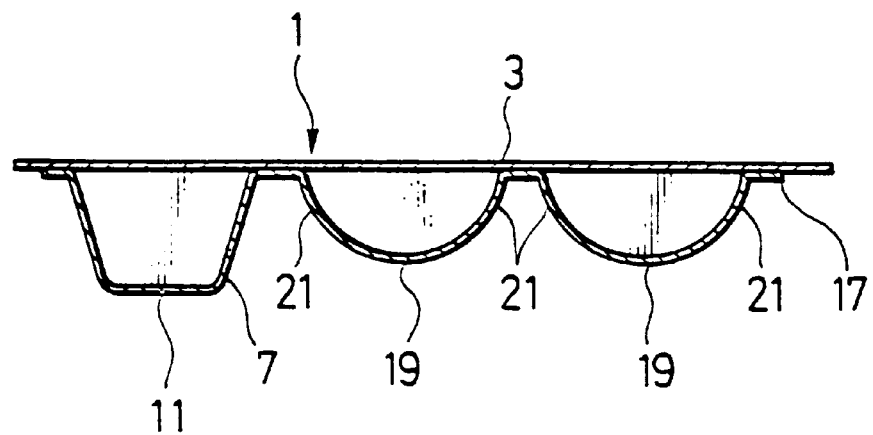
FIG. 1C is a cross-sectional view taken along the line 1C—1C shown in FIG. 1B.
Figure 2:
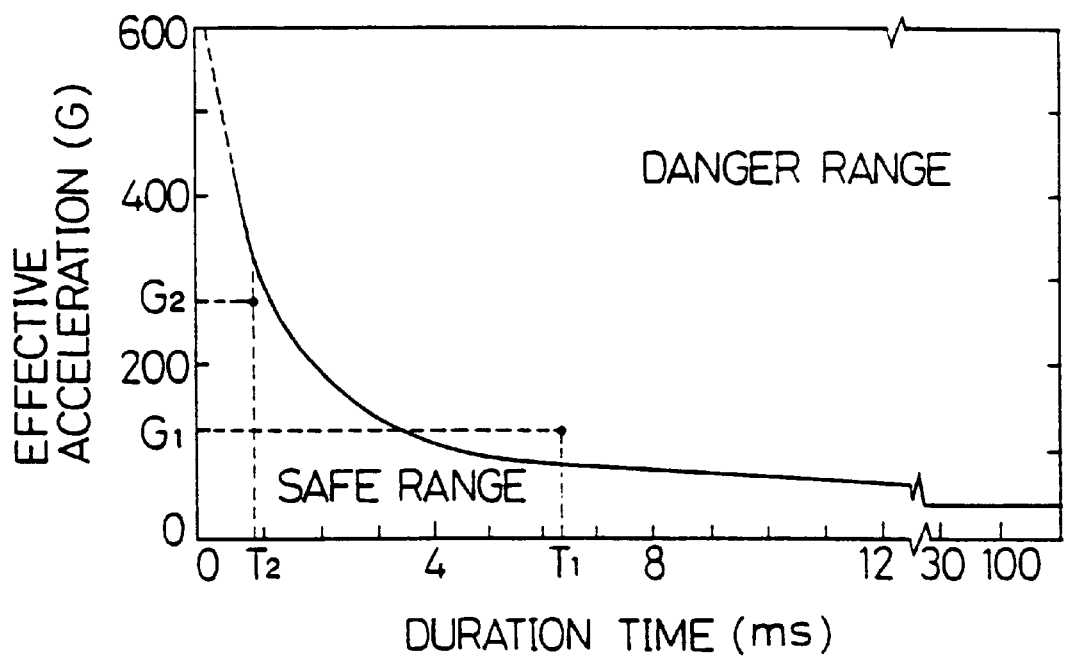
FIG. 2 is a graphical representation showing a safety region and a dangerous region on the basis of the relationship between the effective acceleration and the duration time of various impacts.

As described above, in the comparison fender structure, an appropriate crush mode of the fender 1100 is determined on the basis of the stepped portion FA formed in the vertical wall 1101. However, even if the impact energy does absorbed as described above, it is not necessarily relax the head impact characteristics of the fender 1100 for the reason as already explained with reference to FIG. 2.

Accordingly, the ninth embodiment provides a fender structure which can absorb an impact energy sufficiently by effectively reducing the HIC value even at a short deformation stroke in order to reduce the head impact characteristics.

Figure 54:
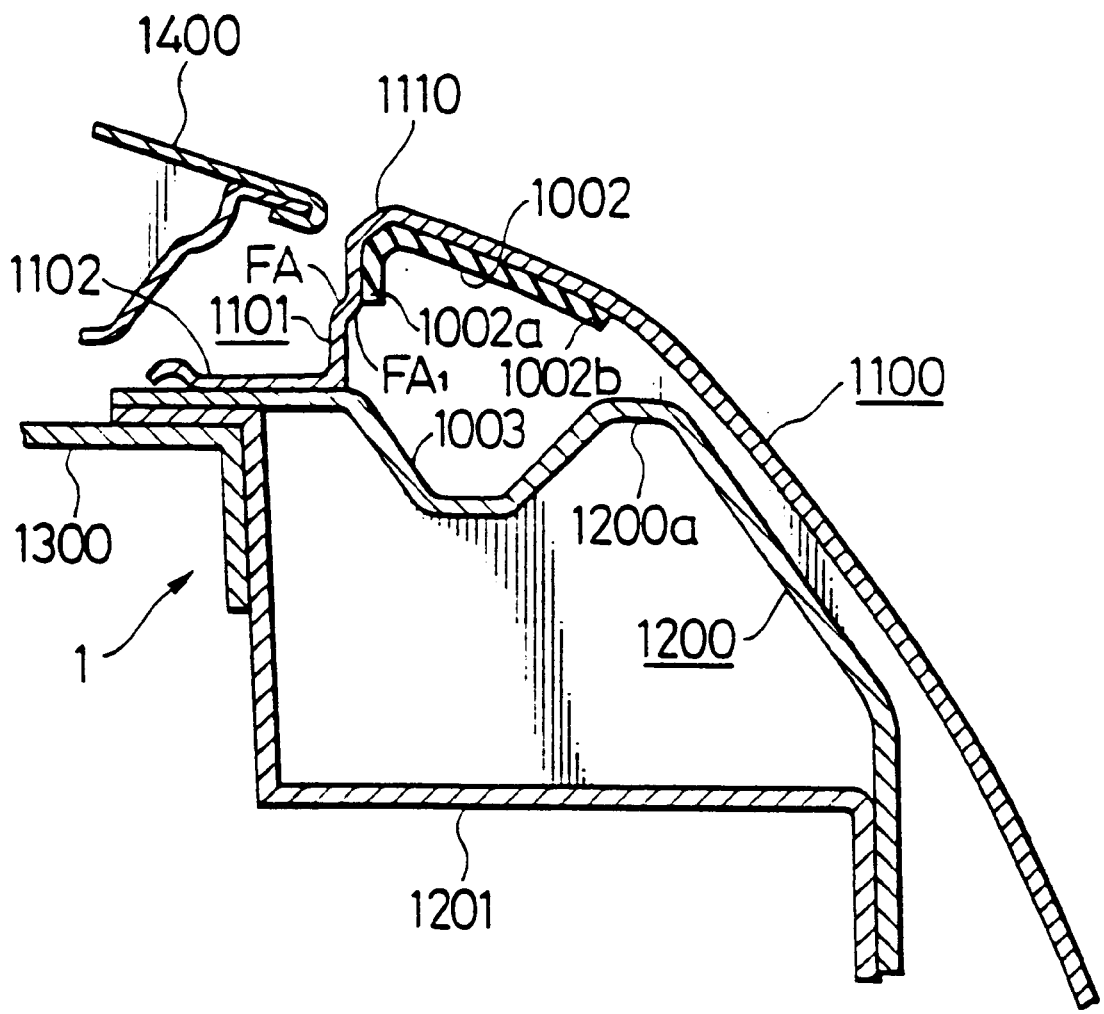
FIG. 54 is a cross-sectional view showing an ninth embodiment of the structure according to the present invention, which is also taken along the line 53—53 in FIG. 52.
Figure 55:
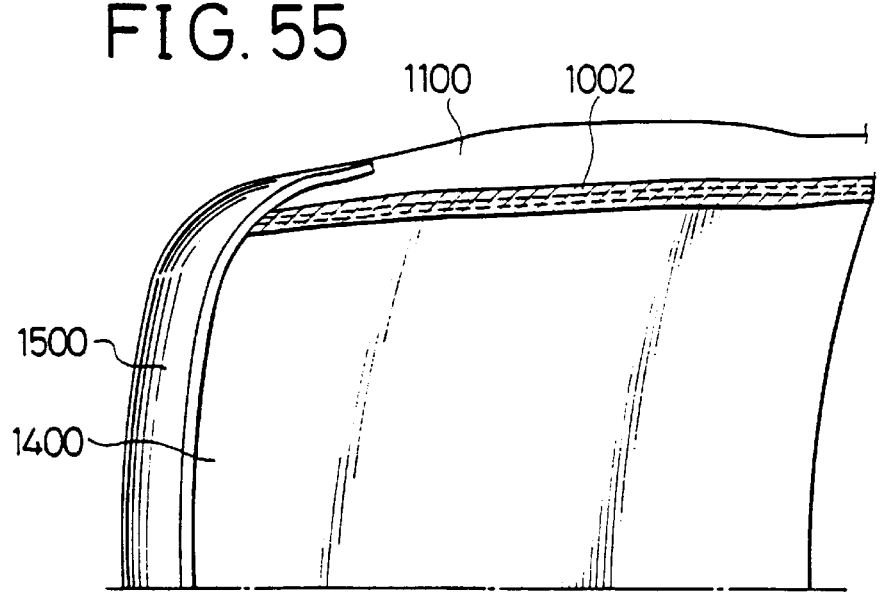
FIG. 55 is a half plan view showing the fender structure shown in FIG. 53.

FIGS. 54 and 55 show a fender structure according to the present embodiment. FIG. 54 is similar to a cross-sectional view taken along the line 53—53 shown in FIG. 52. Further, FIG. 55 is a plan view showing the fender 1100 and the hood 1400, in which a bumper 1500 is also shown.

The feature of this ninth embodiment is to provide a synthetic resin layer 1002 on the inner surface of the stepped portion FA of the vertical wall 1101 of the fender 1100 and to provide a recessed portion 1003 in the flat portion 1200a of the hood ridge reinforce portion 1200. The structure other than the above is basically the same as with the case of the comparison structure as shown in FIG. 53, so that the same reference numerals have been retained for the similar parts which have the same functions.

In a fender structure 1001 of this embodiment, the vertical wall 1101 is formed on the upper edge portion of the fender 1100, and the upper project portion 1110 is formed on the upper side of the vertical wall 1101, in the same way as is comparison. However, the synthetic resin layer 1002 is additionally deposited (attached under melted condition) onto the stepped portion FA of the vertical wall 1101 of the fender 1100 in such a way as to extend all over the length of the fender 1100 in the front and rear direction. In addition, the recessed portion 1003 is formed in the flat portion 1200a of the hood ridge reinforce portion 1200 at such a position as to correspond to the synthetic resin layer 1002.

In more detail, the synthetic resin layer 1002 is deposited onto the inner surface of the fender 1100 in such a way that one end 1002a thereof extends from the top corner of the upper project portion 1110 to an upper stepped portion FA1 of the stepped portion FA and further the other end 1002b thereof extends from the same top corner of the upper project portion 1110 somewhat downward along the fender 1100 so as to cover the flat surface portion 1200a of the hood ridge reinforce portion 1200 from above, in FIG. 54. Further, the recessed portion 1003 is formed all over the length of the flat surface portion 1200a of the hood ridge reinforce portion 1200 so as to correspond to the position of the synthetic resin layer 1002. Further, it is preferable to form the recessed portion 1003 to such a width and a depth that the upper project portion 1110 of the fender 1100 can be accommodated when deformed into crush.

The fender structure of this embodiment is so constructed that an impact waveform Ca approximate to the ideal impact waveform Cm can be obtained in the impact test and thereby the HIC value can be reduced even at a small stroke.

Figure 56:
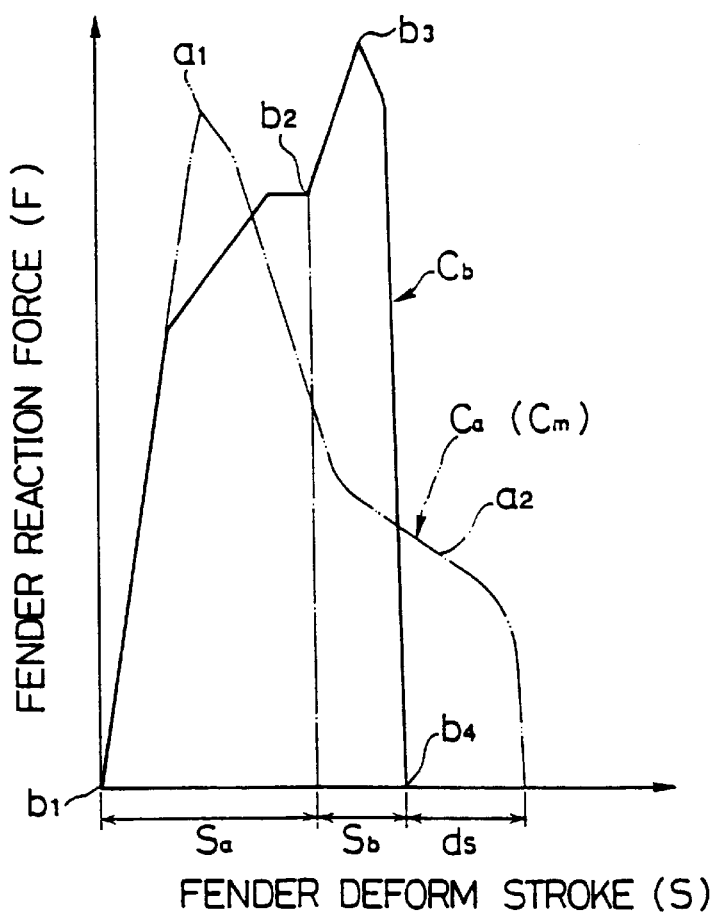
FIG. 56 is a graphical representation showing the basic impact energy absorption waveform cb and the improved impact energy absorption waveform Ca (Cm) of the fender structure of the ninth embodiment.

In FIG. 56, the impact waveform Ca (Cm) of this embodiment is shown by the dot-dot-dashed line in FIG. 56, and the basic (non-improved) impact waveform Cb is shown by the solid line.

In the impact test, a gravity center of an impactor FM is brought into collision with the upper project portion 1110 of the fender 1100 of the comparison fender structure as shown in FIGS. 57A to 59A, and the acceleration and the stroke (movement distance) of the impactor FM are measured. The measured the acceleration and the stroke of the impactor FM correspond to the average reaction force F and the deformation stroke S shown in FIG. 56, so that the basic impact waveform Cb as shown in FIG. 56 can be obtained by the impact test.

The basic impact waveform Cb will be explained hereinbelow in further detail in accordance with the impact steps by the impactor FM and the deformation of the fender 1100 with reference to FIGS. 57A to 59B.

Figure 57A:
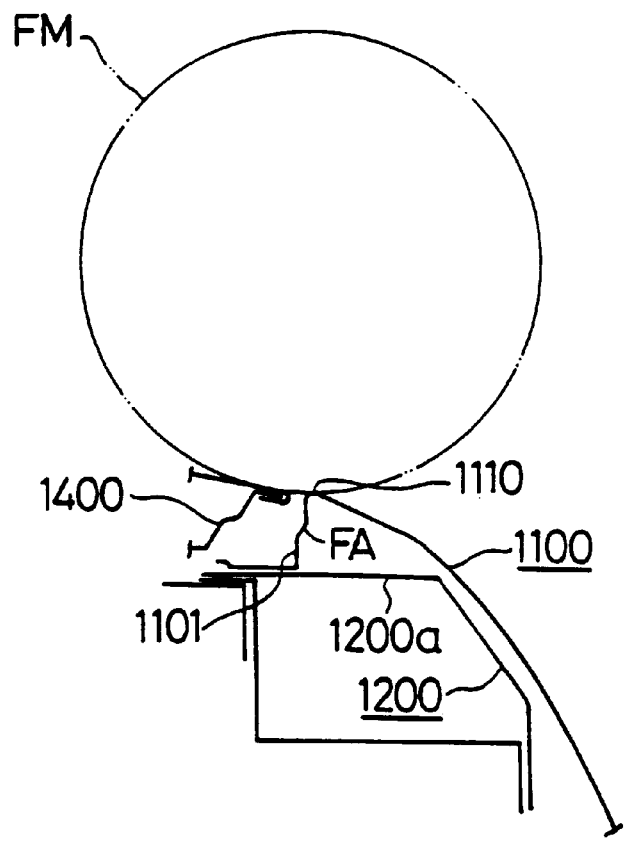
FIG. 57A is an illustration for assistance in explaining an impact step of the fender structure in the impact test for obtaining the basic impact energy absorption waveform.
Figure 57B:
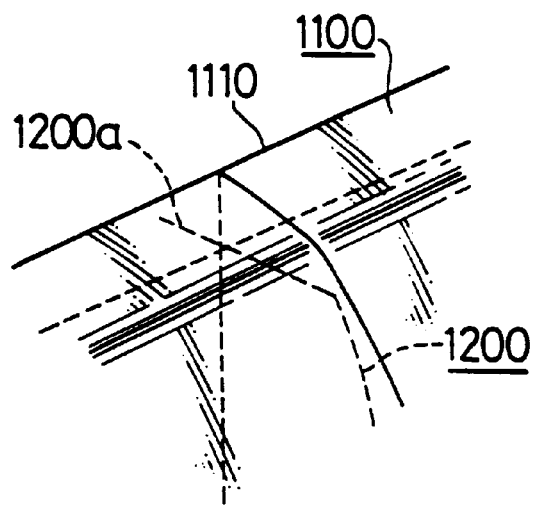
FIG. 57B is an illustration for assistance in explaining a deformation state of the fender structure in the same impact test.

Under the condition that the impactor FM is in contact with the upper project portion 1110 of the fender 1100, as shown in FIGS. 57A and 57B, the upper project portion 1110 is not yet deformed, so that the basic waveform b is such that the average reaction force F and the stroke S are both zero at point b1.

Figure 58A:
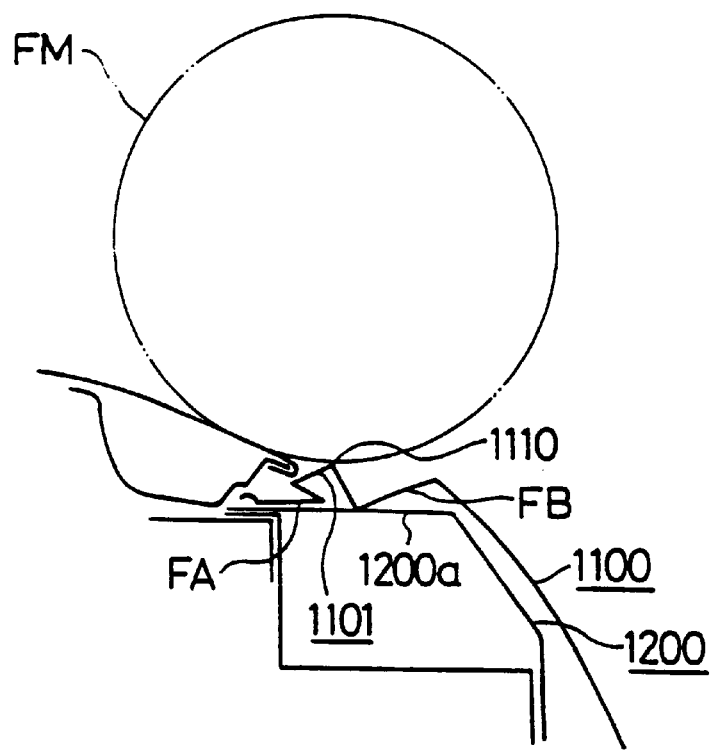
FIG. 58A is an illustration for assistance in explaining another impact step of the fender structure in the impact test for obtaining the basic impact energy absorption waveform.
Figure 58B:
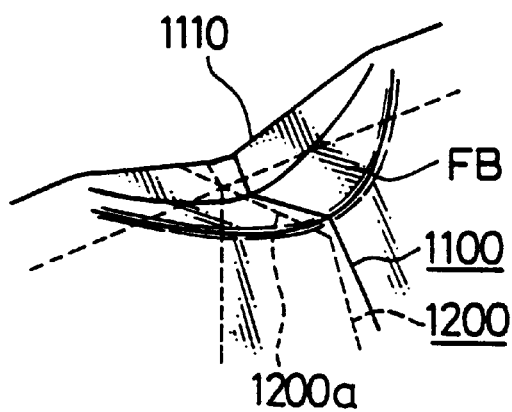
FIG. 58B is an illustration for assistance in explaining another deformation state of the fender structure in the same impact test.
Figure 59A:
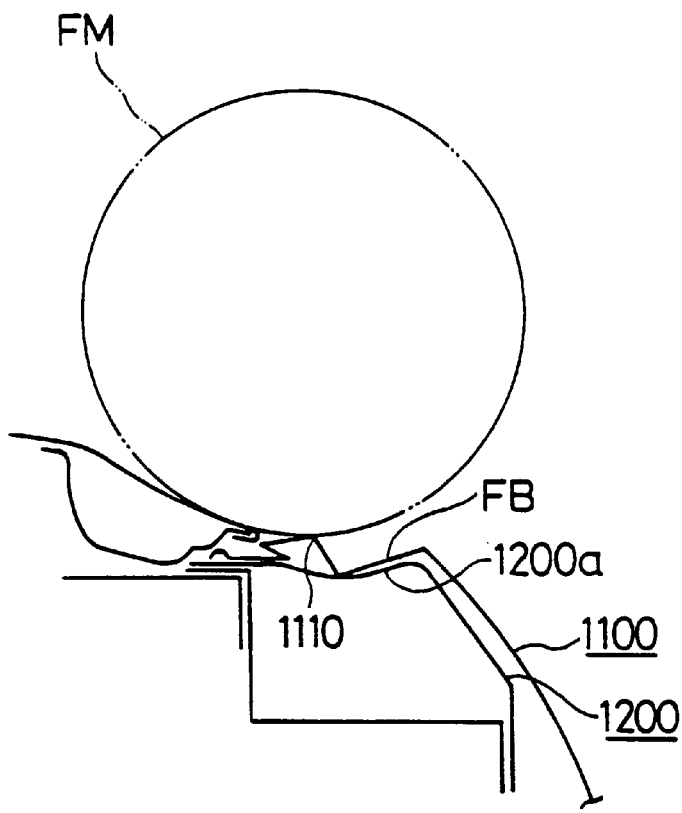
FIG. 59A is an illustration for assistance in explaining the other impact step of the fender structure in the impact test for obtaining the basic impact energy absorption waveform.
Figure 59B:
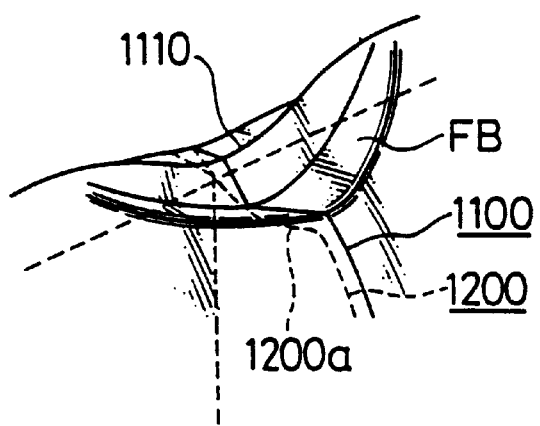
FIG. 59B is an illustration for assistance in explaining the other deformation state of the fender structure in the same impact test.

However, when the impactor FM is brought into collision with the upper project portion 1110 of the fender 1100, as shown in FIGS. 58A and 58B, the upper project portion 1110 begins to be deformed in such a way as to be inversion-deformed (upside down), that is, as to project toward the flat surface portion 1200a of the hood ridge reinforce portion 1200, so that the end of the inverted portion FB reaches the flat surface portion 1200a. This initial deformation step is shown by Sa in FIG. 56. When the end of the inverted portion FB reaches the flat surface portion 1200a, the basic waveform Cb reaches a point b2. During this initial deformation Sa of a first half, since the fender 1100 is deformed easily due to the presence of the stepped portion FA, the average reaction force F is relatively high.

When the upper project portion 1110 of the fender 1100 is further deformed, as shown in FIGS, 59A and 59B, the flat surface portion 1200a of the hood ridge reinforce portion 1200 is deformed into a concave shape by the end of the inverted portion FB of the fender 1100. This deformation step of a second half is shown by Sb in FIG. 56. Further, the point at which the end of the inverted portion FB beings to deform the flat surface portion 1200a of the hood ridge reinforce portion 1200 is shown by point b3, and the final deformation point is shown by point b4 in FIG. 56. In this deformation step Sb of the second half, since the upper project portion 1110 is deformed with the deformed bottom in contact with the flat surface portion 1200a, the average reaction force F of the fender 1100 reaches the maximum value at the point b3 at which the flat portion 1200a begins to be deformed, but decreases abruptly after point b3 down to final the deformation point b4. The basic waveform Cb can be obtained as described above.

In the case of the basic structure, the amount of absorbed impact energy corresponds to the area partitioned by the basic impact waveform Cb and the stroke S (abscissa).

On the other hand, in the ideal impact waveform Cm obtained by the calculation of the HIC derivation formulae (1) and (2), although the amount of absorbed impact energy is equal to that of the basic structure, the HIC value is low.

In the impact waveform Ca, as shown by the dot-dot-dashed line in FIG. 56, the average reaction force F of the fender is high at the peak a1 at the initial deformation Sa, as compared with that b2 of the basic impact waveform Cb, but low with the shoulder portion a2 at the deformation Sb. In addition, the deformation stroke of the fender of the ideal impact waveform Cm is longer by dS than that of the basic impact waveform b.

This ideal impact waveform Cm indicates how to design the basic structure of the fender so that the head impact characteristics can be reduced even at a small stroke of the fender. Therefore, the fender structure of this embodiment is constructed on the basis of this design concept.

As already explained, in order to approximate the basic impact waveform Cb to the ideal impact waveform Cm, in this embodiment, the synthetic resin layer 1002 is additionally provided to increase the average reaction force F in the initial deformation Sa, and additionally the recessed portion 1003 is formed to decrease the average reaction force F in the succeeding deformation Sb and further to increase the deformation stroke S in the succeeding deformation Sb.

The impact waveform Ca approximate to the ideal impact waveform Cm of this embodiment will be explained hereinbelow in further detail in accordance with the impact step of the impactor FM and the deformation of the fender 1100 with reference to FIGS. 60A to 62B.

Figure 60A:
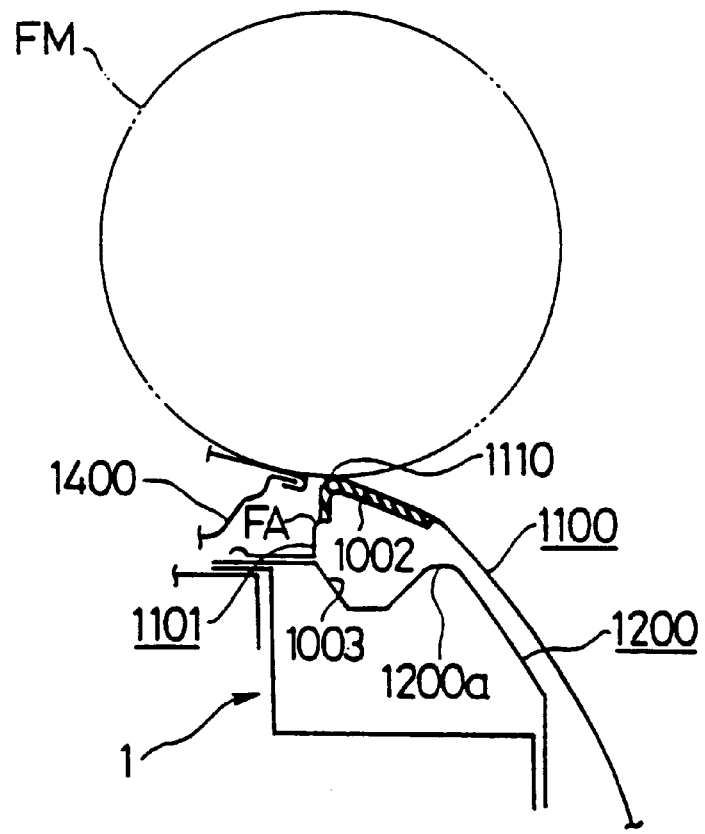
FIG. 60A is an illustration for assistance in explaining an impact step of the fender structure in the impact test for obtaining the improved impact energy absorption waveform.
Figure 60B:
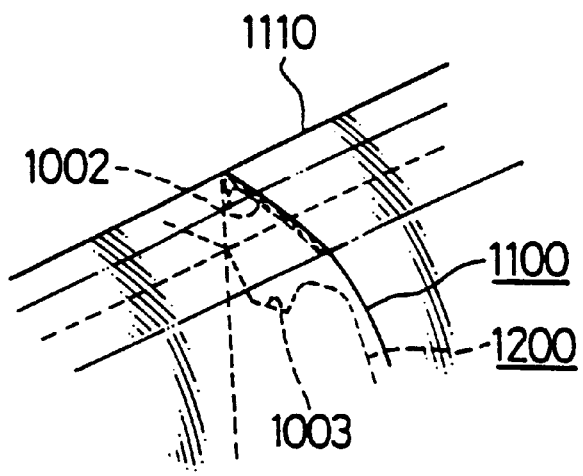
FIG. 60B is an illustration for assistance in explaining a deformation state of the fender structure in the same impact test.

Under the condition that the impactor FM is in contact with the upper project portion 1110 of the fender 1100, as shown in FIGS. 60A and 60B, the upper project portion 1110 is not yet deformed, so that the impact waveform Ca is such that the average reaction force F and the stroke S are both zero at point b1.

Figure 61A:
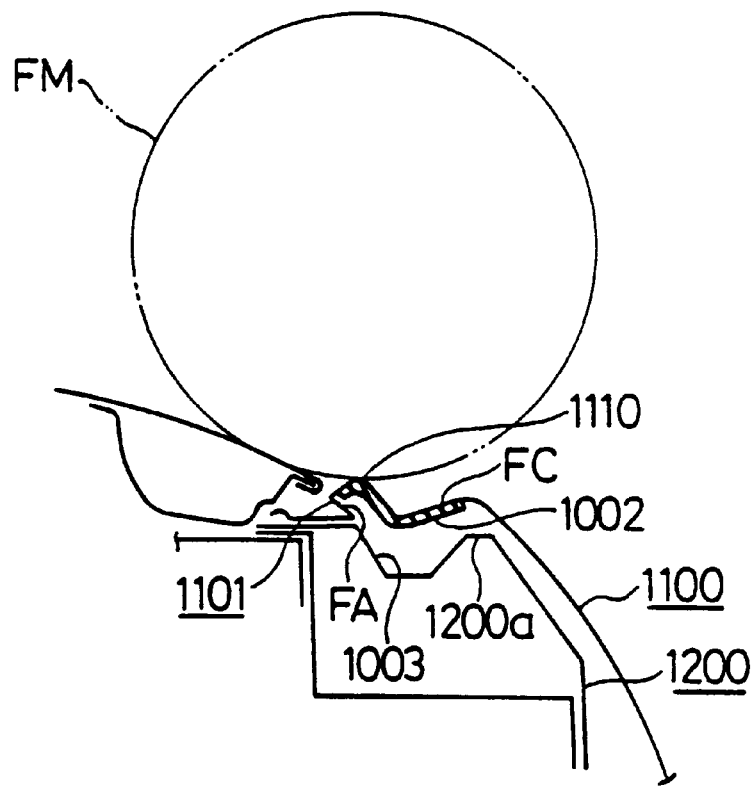
FIG. 61A is an illustration for assistance in explaining another impact step of the fender structure in the impact test for obtaining the improved impact energy absorption waveform.
Figure 61B:
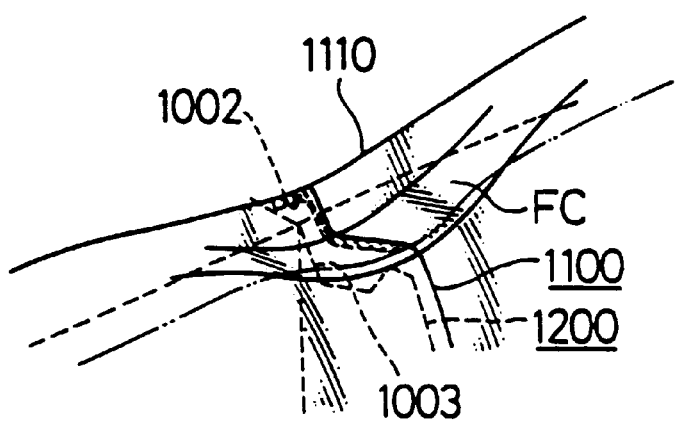
FIG. 61B is an illustration for assistance in explaining another deformation state of the fender structure in the same impact test.

However, when the impactor FM is brought into collision with the upper project portion 1110 of the fender 1100, as shown in FIGS. 61A and 61B, the upper project portion 1110 begins to be deformed in such a way as to be inversion-deformed (upside down), that is, to project toward the flat surface portion 1200a of the hood ridge reinforce portion 1200, so that the end of the inverted portion FB reaches the flat surface portion 1200a. In this deformation step, since the synthetic resin layer 1002 is additionally deposited on the stepped portion FC of the upper project portion 1110, a high average reaction force F can be obtained, as compared with the basic structure, without changing the basic crush mode, so that it is possible to obtain a peak approximate to the peak a1 of the ideal impact waveform Cm.

Figure 62A:
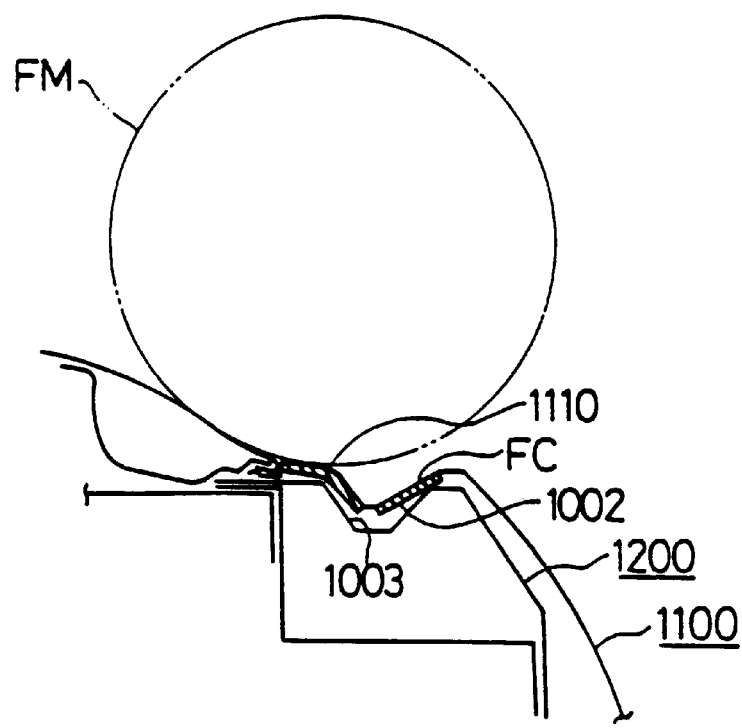
FIG. 62A is an illustration for assistance in explaining the other impact step of the fender structure in the impact test for obtaining the improved impact energy absorption waveform.
Figure 62B:
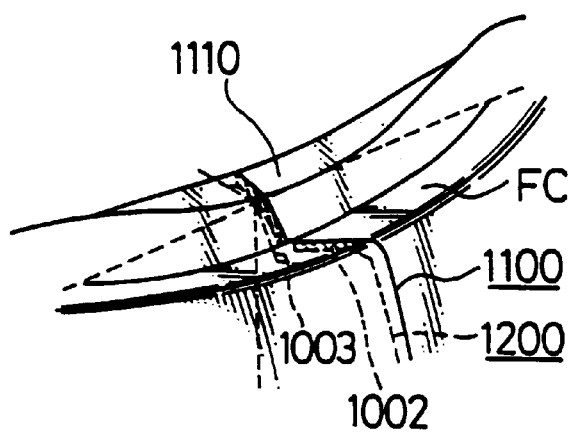
FIG. 62B is an illustration for assistance in explaining the other deformation state of the fender structure in the same impact test.

The upper project portion 1110 of the fender 1100 is further deformed, as shown in FIGS. 62A and 62B. In this case, however, since the recessed portion 1002 is formed in the flat surface portion 1200a of the hood ridge reinforce portion 1200, the inverted portion FC is deformed into the recessed portion 1200a. Under these conditions, since the bottom of the upper project portion 1110 is not brought into contact with the hood ridge reinforce portion 1200, it is possible to reduce the average reaction force F, as compared with that of the basic structure. In addition, the deformation stroke S can be increased as compared with that of the basic structure. Accordingly, at the succeeding deformation Sb, the shoulder portion a2 can be generated and further the deformation stroke can be increased by dS, so that it is possible to obtain the impact waveform Ca approximate to the ideal waveform Cm.

Figure 63:
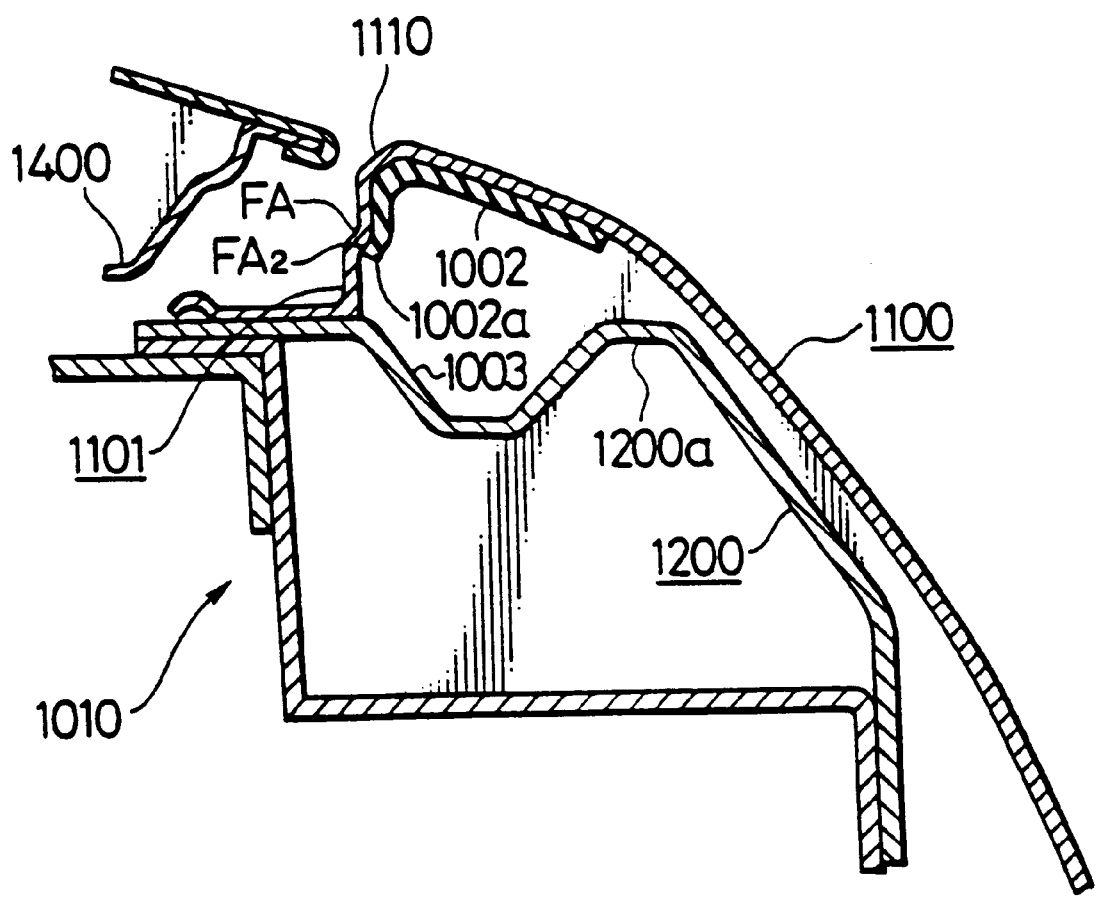
FIG. 63 is a cross-sectional view showing a modification of the ninth embodiment of the fender structure according to the present invention, taken along the line 53—53 in FIG. 52.

A modification of the ninth embodiment of the present invention will be described hereinbelow with reference to FIG. 63. In the ninth embodiment shown in FIG. 54, the synthetic resin layer 1002 is deposited onto the inner surface of the fender 1100 in such a way that one end 1002a thereof extends from the top corner of the upper project portion 1110 to an upper stepped portion FA1 of the stepped portion FA and further the other end 1002b thereof extends from the same top corner of the upper project portion 1110 somewhat downward along the fender 1100 so as to cover the flat surface portion 1200a of the hood ridge reinforce portion 1200 from above, in FIG. 54. In this modification, however, the synthetic resin layer 1002 is deposited onto the inner surface of the fender 1100 in such a way that the whole stepped portion FA can be covered with the resin layer 1002. That is, one end 1002a of the resin layer 1002 extends from the top corner of the upper project portion 1110 to a lower stepped portion FA2 of the stepped portion FA and further the other end 1002b thereof extends from the same top corner of the upper project portion 1110 somewhat downward along the fender 1100 so as to cover the flat surface portion 1200a of the hood ridge reinforce portion 1200 from above, in FIG. 63. The fender structure other than above is the same as with the ninth embodiment shown in FIG. 54.

In this embodiment, it is possible to further increase the reaction force at the initial deformation so that the impact waveform Ca can be more approximated to the ideal impact waveform Cm.

Further, it is also preferable to change the thickness of the synthetic resin layer 1002 in such a way as to be determined thin on the front side of the vehicle body but thick on the rear side thereof. In general, when a head impact of a walker (e.g., child) is applied to the front side of the vehicle, the impact force is relatively small. On the other hand, when a head impact of a walker (e.g., grown-up) is applied to the rear side of the vehicle, the impact force is relatively large. Therefore, when the thickness of the resin layer 1002 is adjusted gradually, the average reaction force can be increases according to the magnitude of the head impact applied to the fender.

As described above, in the hood structure according to the present invention, when the hood is moved by a predetermined stroke, since the impact absorb body begins to interfere with the impact interfere body (engine or the strut towers), the impact absorb body is deformed into crush, so that a desired secondary reaction force can be generated required for the ideal impact energy absorption waveform Cm. Accordingly, it is possible to absorb the impact energy under ideal absorption conditions, with the result that the HIC value (the head impact characteristics) can be reduced at the small possible stroke of the hood.

Further, in the fender structure according to the present invention, when the fender is moved by a predetermined stroke, since the impact absorb body (resin layer) begins to be deformed, a desired secondary reaction force can be generated required for the ideal impact energy absorption waveform Cm. Accordingly, it is possible to absorb the impact energy under ideal absorption conditions, with the result that the HIC value (the head impact characteristics) can be reduced at the small possible stroke of the hood.

What is claimed is:

1. A fender structure for absorbing an impact applied to a fender of an automotive vehicle, the fender structure comprising:

a fender panel having a sloped wall portion and a vertical wall portion with a stepped portion, the vertical wall portion and the sloped wall portion joining and forming an upper projected portion;

an impact absorber disposed at least at the upper projected portion, which impact absorber absorbs the impact applied to the fender structure; and a hood ridge reinforcement spaced substantially vertically below the upper projected portion for abutting the upper projected portion with the impact absorber, the hood ridge reinforcement having a recessed portion dimensioned to accommodate the upper projected portion during a collision, wherein the impact absorber and the recessed portion are configured to absorb impact energy to reduce head injury to a pedestran.

2. The fender structure of claim 1, wherein the impact absorber is a synthetic resin layer deposited onto an inner surface of the stepped portion of the vertical wall portion and the upper projected portion.

3. The fender structure of claim 2 wherein the synthetic resin layer covers approximately one half of the vertical wall portion.

4. The fender structure of claim 2 wherein the synthetic resin layer subfantially covers the stepped portion of the vertical wall portion.

5. The fender structure of claim 2 wherein the synthetic resin layer has a varying thickness and is arranged with a thicker portion on a rear side of the vehicle than on a front side of the vehicle.

6. The fender structure of claim 1 wherein the impact absorber is a synthetic resin layer having a length corresponding to that of the recessed portion so that the upper projected portion with the synthetic resin layer is received in the recessed portion during a collision.

* * * * *